(12) United States Patent
Kenny et al.

(10) Patent No.: US 8,464,781 B2
(45) Date of Patent: Jun. 18, 2013

(54) COOLING SYSTEMS INCORPORATING HEAT EXCHANGERS AND THERMOELECTRIC LAYERS

(75) Inventors: Thomas W. Kenny, San Carlos, CA (US); Mark Munch, Los Altos Hills, CA (US); Peng Zhou, Albany, CA (US); James Gill Shook, Santa Cruz, CA (US); Kenneth Goodson, Portola Valley, CA (US); Dave Corbin, Los Altos, CA (US); Mark McMaster, Menlo Park, CA (US); James Lovette, San Francisco, CA (US)

(73) Assignee: Cooligy Inc., Mountain View, CA (US)

( * ) Notice: Subject to any disclaimer, the term of this patent is extended or adjusted under 35 U.S.C. 154(b) by 1463 days.

(21) Appl. No.: 11/582,657

(22) Filed: Oct. 17, 2006

(65) Prior Publication Data

US 2007/0034356 A1 Feb. 15, 2007

Related U.S. Application Data

(63) Continuation-in-part of application No. 10/698,179, filed on Oct. 30, 2003, which is a continuation-in-part of application No. 10/680,584, filed on Oct. 6, 2003, now Pat. No. 7,000,684, which is a continuation-in-part of application No. 10/439,635, filed on May 16, 2003, now Pat. No. 6,988,534.

(60) Provisional application No. 60/423,009, filed on Nov. 1, 2002, provisional application No. 60/442,383, filed on Jan. 24, 2003, provisional application No. 60/455,729, filed on Mar. 17, 2003.

(51) Int. Cl.
*F28F 7/00* (2006.01)
*F28D 15/00* (2006.01)
*H05K 7/20* (2006.01)
*F25B 21/02* (2006.01)

(52) U.S. Cl.
USPC .................... 165/80.4; 165/104.33; 361/699; 361/701; 361/702; 361/704; 62/3.2

(58) Field of Classification Search
USPC 165/80.4, 185, 104.33; 361/688–704; 62/3.1, 62/3.2, 3.3
See application file for complete search history.

(56) References Cited

U.S. PATENT DOCUMENTS

| 596,062 A | 12/1897 | Firey |
|---|---|---|
| 2,039,593 A | 5/1936 | Hubbuch et al. |

(Continued)

FOREIGN PATENT DOCUMENTS

| DE | 3314069 A | 11/1986 |
|---|---|---|
| DE | 3927755 A1 | 2/1991 |

(Continued)

OTHER PUBLICATIONS

Office Action, U.S. Appl. No. 10/698,179, filed Oct. 30, 2003, 21 pages.

(Continued)

*Primary Examiner* — Ljiljana Ciric
(74) *Attorney, Agent, or Firm* — Haverstock & Owens LLP

(57) ABSTRACT

A system for cooling a heat source includes a fluid heat exchanger, a pump, a thermoelectric device and a heat rejector. The thermoelectric device includes a cooling portion and a heating portion. The heat rejector is configured to be in thermal contact with at least a portion of the heating portion of the thermoelectric device. The pump is coupled with the fluid heat exchanger and configured to pass a fluid therethrough. The thermoelectric device is configured along with the heat exchanger in the cooling system.

38 Claims, 30 Drawing Sheets

U.S. PATENT DOCUMENTS

| | | | |
|---|---|---|---|
| 2,087,521 A | 7/1937 | Mazzola | |
| 2,956,642 A | 10/1960 | Chaplin et al. | |
| 3,220,254 A | 11/1965 | Halbech | |
| 3,361,195 A | 1/1968 | Meyerhoff et al. | |
| 3,514,967 A | 6/1970 | Vander Molen | |
| 3,524,497 A | 8/1970 | Chu et al. | 165/80 |
| 3,771,219 A | 11/1973 | Tuzi et al. | 29/583 |
| 3,800,510 A | 4/1974 | Lamond | |
| 3,817,321 A | 6/1974 | von Cube et al. | 165/105 |
| 3,852,806 A | 12/1974 | Corman et al. | 357/82 |
| 3,904,262 A | 9/1975 | Cutchaw | 339/17 |
| 3,948,316 A | 4/1976 | Souriau | 165/105 |
| 3,993,123 A | 11/1976 | Chu et al. | 165/80 |
| 4,021,867 A | 5/1977 | Maxwell, Jr. | |
| 4,037,889 A | 7/1977 | Piatt | |
| 4,109,707 A | 8/1978 | Wilson et al. | 165/46 |
| 4,203,488 A | 5/1980 | Johnson et al. | 165/80 |
| 4,211,208 A | 7/1980 | Lindner | |
| 4,235,285 A | 11/1980 | Johnson et al. | 165/80 |
| 4,262,975 A | 4/1981 | Heshmat et al. | |
| 4,296,455 A | 10/1981 | Leaycraft et al. | 361/383 |
| 4,312,012 A | 1/1982 | Freiser et al. | 357/82 |
| 4,332,291 A | 6/1982 | Mulock-Bentley | |
| 4,345,267 A | 8/1982 | Corman et al. | 357/81 |
| 4,392,362 A | 7/1983 | Little | |
| 4,395,947 A | 8/1983 | Despot | |
| 4,409,079 A | 10/1983 | Miyazaki et al. | |
| 4,416,324 A | 11/1983 | Sutoh et al. | |
| 4,450,472 A | 5/1984 | Tuckerman et al. | 357/82 |
| 4,467,861 A | 8/1984 | Kiseev et al. | 165/104.22 |
| 4,474,172 A | 10/1984 | Burke | 126/449 |
| 4,485,429 A | 11/1984 | Mittal | 361/386 |
| 4,497,875 A | 2/1985 | Arakawa et al. | |
| 4,504,850 A | 3/1985 | Pollard et al. | |
| 4,516,632 A | 5/1985 | Swift et al. | 165/167 |
| 4,540,115 A | 9/1985 | Hawrylo | 228/123 |
| 4,561,040 A | 12/1985 | Eastman et al. | 361/385 |
| 4,567,505 A | 1/1986 | Pease et al. | 357/81 |
| 4,568,431 A | 2/1986 | Polan et al. | 204/13 |
| 4,573,067 A | 2/1986 | Tuckerman et al. | 357/82 |
| 4,574,876 A | 3/1986 | Aid | 165/46 |
| 4,687,167 A | 8/1987 | Skalka et al. | |
| 4,693,307 A | 9/1987 | Scarselletta | |
| 4,698,661 A | 10/1987 | Bessonneau et al. | 357/74 |
| 4,716,494 A | 12/1987 | Bright et al. | 361/386 |
| 4,758,926 A | 7/1988 | Herrell et al. | 361/385 |
| 4,759,403 A | 7/1988 | Flint et al. | |
| 4,793,405 A | 12/1988 | Diggelmann et al. | 165/104.33 |
| 4,866,570 A | 9/1989 | Porter | 361/382 |
| 4,868,712 A | 9/1989 | Woodman | 361/388 |
| 4,884,331 A | 12/1989 | Hinshaw | 29/558 |
| 4,894,709 A | 1/1990 | Phillips et al. | 357/82 |
| 4,896,719 A | 1/1990 | O'Neill et al. | 165/170 |
| 4,903,761 A | 2/1990 | Cima | 165/104.25 |
| 4,908,112 A | 3/1990 | Pace | 204/299 |
| 4,938,280 A | 7/1990 | Clark | 165/80.4 |
| 5,009,760 A | 4/1991 | Zare et al. | 204/183.3 |
| 5,016,090 A | 5/1991 | Galyon et al. | 357/82 |
| 5,016,138 A | 5/1991 | Woodman | 361/381 |
| 5,016,707 A | 5/1991 | Nguyen | |
| 5,027,611 A | 7/1991 | Doi et al. | |
| 5,036,676 A | 8/1991 | Dudley | |
| 5,043,797 A | 8/1991 | Lopes | 357/82 |
| 5,057,908 A | 10/1991 | Weber | 357/81 |
| 5,070,040 A | 12/1991 | Pankove | 437/209 |
| 5,083,194 A | 1/1992 | Bartilson | 357/81 |
| 5,088,005 A | 2/1992 | Ciaccio | 361/385 |
| 5,099,311 A | 3/1992 | Bonde et al. | 357/82 |
| 5,099,910 A | 3/1992 | Walpole et al. | 165/80.4 |
| 5,125,451 A | 6/1992 | Matthews | 165/80.4 |
| 5,131,233 A | 7/1992 | Cray et al. | 62/64 |
| 5,161,089 A | 11/1992 | Chu et al. | 361/385 |
| 5,199,487 A | 4/1993 | DiFrancesco et al. | 165/168 |
| 5,203,401 A | 4/1993 | Hamburgen et al. | 165/80.4 |
| 5,218,515 A | 6/1993 | Bernhardt | 361/385 |
| 5,228,502 A | 7/1993 | Chu et al. | 165/80.4 |
| 5,232,047 A | 8/1993 | Matthews | 165/168 |
| 5,239,200 A | 8/1993 | Messina et al. | 257/714 |
| 5,239,443 A | 8/1993 | Fahey et al. | 361/689 |
| 5,247,800 A | 9/1993 | Mruzek et al. | 62/51.1 |
| 5,263,251 A | 11/1993 | Matthews | 29/840.036 |
| 5,265,670 A | 11/1993 | Zingher | 165/80.4 |
| 5,269,372 A | 12/1993 | Chu et al. | 165/80.4 |
| 5,274,920 A | 1/1994 | Matthews | 29/890.039 |
| 5,275,237 A | 1/1994 | Rolfson et al. | 265/80.5 |
| 5,294,834 A | 3/1994 | Fatemi et al. | 257/745 |
| 5,299,635 A | 4/1994 | Abraham | |
| 5,308,429 A | 5/1994 | Bradley | 156/306.6 |
| 5,309,319 A | 5/1994 | Messina | 361/699 |
| 5,310,440 A | 5/1994 | Zingher | 156/345 |
| 5,316,077 A | 5/1994 | Reichard | 165/104.28 |
| 5,317,805 A | 6/1994 | Hoopman et al. | 29/890.03 |
| 5,325,265 A | 6/1994 | Turlik et al. | 361/702 |
| 5,346,000 A | 9/1994 | Schlitt | 165/104.26 |
| 5,354,415 A | 10/1994 | Fushii et al. | |
| 5,365,400 A | 11/1994 | Ashiwake et al. | 361/752 |
| 5,380,956 A | 1/1995 | Loo et al. | 174/252 |
| 5,383,340 A | 1/1995 | Larson et al. | 62/259 |
| 5,388,635 A | 2/1995 | Gruber et al. | 165/80.4 |
| 5,397,919 A | 3/1995 | Tata et al. | 257/717 |
| 5,421,943 A | 6/1995 | Tam et al. | 156/273.9 |
| 5,427,174 A | 6/1995 | Lomolino, Sr. et al. | 165/0.1 |
| 5,436,793 A | 7/1995 | Sanwo et al. | 361/689 |
| 5,459,099 A | 10/1995 | Hsu | 437/180 |
| 5,488,835 A | 2/1996 | Howenstine et al. | |
| 5,490,117 A | 2/1996 | Oda et al. | 365/226 |
| 5,508,234 A | 4/1996 | Dusablon, Sr. et al. | 437/228 |
| 5,514,832 A | 5/1996 | Dusablon, Sr. et al. | 174/15.1 |
| 5,514,906 A | 5/1996 | Love et al. | 257/712 |
| 5,520,244 A | 5/1996 | Mundinger et al. | 165/104.33 |
| 5,526,875 A | 6/1996 | Lin | 165/80.3 |
| 5,534,328 A | 7/1996 | Ashmead et al. | |
| 5,544,696 A | 8/1996 | Leland | 165/80.4 |
| 5,548,605 A | 8/1996 | Benett et al. | 372/36 |
| 5,575,929 A | 11/1996 | Yu et al. | 216/10 |
| 5,583,317 A | 12/1996 | Mennucci et al. | |
| 5,585,069 A | 12/1996 | Zanzucchi et al. | 422/100 |
| 5,590,242 A | 12/1996 | Juang et al. | 395/2.54 |
| 5,622,221 A | 4/1997 | Genga, Jr. et al. | |
| 5,641,400 A | 6/1997 | Kaltenbach et al. | 210/198.2 |
| 5,647,429 A | 7/1997 | Oktay et al. | |
| 5,672,980 A | 9/1997 | Charlton et al. | |
| 5,675,473 A | 10/1997 | McDunn et al. | 361/699 |
| 5,676,198 A | 10/1997 | Schneider et al. | |
| 5,692,558 A | 12/1997 | Hamilton et al. | 165/80.4 |
| 5,696,405 A | 12/1997 | Weld | 257/714 |
| 5,718,628 A | 2/1998 | Nakazato et al. | |
| 5,726,495 A | 3/1998 | Aihara et al. | 257/722 |
| 5,727,618 A | 3/1998 | Mundinger et al. | 165/80.4 |
| 5,731,954 A * | 3/1998 | Cheon | 165/104.33 |
| 5,740,013 A | 4/1998 | Roesner et al. | 361/697 |
| 5,757,070 A | 5/1998 | Fritz | |
| 5,761,037 A | 6/1998 | Anderson et al. | 361/700 |
| 5,763,951 A | 6/1998 | Hamilton et al. | 257/714 |
| 5,768,104 A | 6/1998 | Salmonson et al. | 361/704 |
| 5,774,779 A | 6/1998 | Tuchinskiy | 419/2 |
| 5,800,690 A | 9/1998 | Chow et al. | 204/451 |
| 5,801,442 A | 9/1998 | Hamilton et al. | 257/714 |
| 5,811,062 A | 9/1998 | Wegeng et al. | 422/129 |
| 5,829,514 A | 11/1998 | Smith et al. | 165/78 |
| 5,830,806 A | 11/1998 | Hudson et al. | |
| 5,835,345 A | 11/1998 | Staskus et al. | 361/699 |
| 5,847,452 A | 12/1998 | Tantoush | |
| 5,858,188 A | 1/1999 | Soane et al. | 204/454 |
| 5,862,038 A | 1/1999 | Suzuki et al. | |
| 5,863,708 A | 1/1999 | Zanzucchi et al. | 430/320 |
| 5,870,823 A | 2/1999 | Bezama et al. | 29/848 |
| 5,874,795 A | 2/1999 | Sakamoto | 310/156 |
| 5,880,524 A | 3/1999 | Xie | 257/404 |
| 5,886,870 A | 3/1999 | Omori | 361/704 |
| 5,887,557 A | 3/1999 | Battlogg | |
| 5,896,869 A | 4/1999 | Maniscalco et al. | |
| 5,898,572 A | 4/1999 | Schennib et al. | |
| 5,909,057 A | 6/1999 | McCormick et al. | 257/704 |
| 5,918,469 A | 7/1999 | Cardella | 62/3.7 |
| 5,921,087 A | 7/1999 | Bhatia et al. | 62/3.2 |
| 5,927,390 A | 7/1999 | Lehman | 165/122 |

| | | | | | | |
|---|---|---|---|---|---|---|
| 5,936,192 A | 8/1999 | Tauchi ............... 136/203 | 6,795,312 B2 | 9/2004 | Narakino et al. ......... 361/687 |
| 5,937,557 A | 8/1999 | Bowker et al. ......... 42/70.1 | 6,796,372 B2 | 9/2004 | Bear |
| 5,945,217 A | 8/1999 | Hanrahan ............. 428/389 | 6,807,056 B2 | 10/2004 | Kondo et al. |
| 5,950,721 A | 9/1999 | Bock et al. | 6,819,563 B1 | 11/2004 | Chu et al. |
| 5,953,701 A | 9/1999 | Neti et al. ............. 704/254 | 6,829,142 B2 | 12/2004 | Belady et al. ......... 361/687 |
| 5,960,384 A | 9/1999 | Brash ................... 704/9 | 6,836,131 B2 | 12/2004 | Cader et al. ........... 324/760 |
| 5,963,887 A | 10/1999 | Giorgio | 6,863,117 B2 | 3/2005 | Valenzuela |
| 5,964,092 A | 10/1999 | Tozuka et al. ............ 62/3.7 | 6,865,081 B2 | 3/2005 | Meyer et al. ........... 361/699 |
| 5,965,001 A | 10/1999 | Chow et al. ............. 204/600 | 6,881,039 B2 | 4/2005 | Corbin et al. |
| 5,978,220 A | 11/1999 | Frey et al. ............. 361/699 | 6,882,543 B2 | 4/2005 | Kenny, Jr. et al. |
| 5,983,997 A | 11/1999 | Hou ..................... 165/144 | 6,896,612 B1 | 5/2005 | Novotny |
| 5,993,750 A | 11/1999 | Ghosh et al. ............ 422/191 | 6,903,929 B2 | 6/2005 | Prasher et al. ......... 361/699 |
| 5,997,713 A | 12/1999 | Beetz et al. ............ 205/124 | 6,914,779 B2 | 7/2005 | Askeland et al. |
| 5,998,240 A | 12/1999 | Hamilton et al. ......... 438/122 | 6,924,981 B2 | 8/2005 | Chu et al. |
| 6,007,309 A | 12/1999 | Hartley ................ 417/322 | 6,934,154 B2 | 8/2005 | Prasher et al. ......... 361/699 |
| 6,012,902 A | 1/2000 | Parce | 6,940,298 B2 | 9/2005 | Gutfeldt et al. |
| 6,014,312 A | 1/2000 | Schulz-Harder et al. ..... 361/699 | 6,942,018 B2 | 9/2005 | Goodson et al. |
| 6,019,165 A | 2/2000 | Batchelder ............. 165/80.3 | 6,945,324 B2 | 9/2005 | Weng |
| 6,057,597 A | 5/2000 | Farnworth et al. ......... 257/710 | 6,950,303 B2 | 9/2005 | Neho et al. |
| 6,069,791 A | 5/2000 | Goo et al. | 6,955,212 B1 | 10/2005 | Hsieh |
| 6,084,178 A | 7/2000 | Cromwell ............... 174/35 | 6,967,842 B2 | 11/2005 | Aoki et al. |
| 6,086,330 A | 7/2000 | Press et al. ............ 416/223 | 6,972,485 B2 | 12/2005 | Kong et al. ........... 257/704 |
| 6,105,373 A | 8/2000 | Watanabe et al. .......... 62/3.7 | 6,973,801 B1 | 12/2005 | Campbell et al. |
| 6,119,729 A | 9/2000 | Oberholzer et al. | 6,986,382 B2 | 1/2006 | Upadhya et al. |
| 6,166,907 A | 12/2000 | Chien | 6,988,534 B2 | 1/2006 | Kenny et al. |
| 6,227,287 B1 | 5/2001 | Tanaka et al. ............ 165/80.4 | 6,988,535 B2 | 1/2006 | Upadhya et al. |
| 6,234,240 B1 | 5/2001 | Cheon | 6,988,546 B1 * | 1/2006 | Ohki ................... 62/3.2 |
| 6,238,538 B1 | 5/2001 | Parce et al. | 6,992,891 B2 | 1/2006 | Mallik et al. ........... 361/704 |
| 6,253,835 B1 | 7/2001 | Chu et al. ............. 165/80.4 | 6,994,151 B2 | 2/2006 | Zhou et al. |
| 6,269,864 B1 | 8/2001 | Kabadi | 7,009,843 B2 | 3/2006 | Lee et al. ............. 361/704 |
| 6,272,012 B1 | 8/2001 | Medin et al. ........... 361/690 | 7,017,654 B2 | 3/2006 | Kenny et al. |
| 6,282,093 B1 | 8/2001 | Goodwin | 7,019,972 B2 | 3/2006 | Kenny, Jr. et al. |
| 6,293,333 B1 | 9/2001 | Ponnappan et al. | 7,021,369 B2 | 4/2006 | Werner et al. |
| 6,324,075 B1 | 11/2001 | Unrein et al. ........... 361/816 | 7,044,196 B2 | 5/2006 | Shook et al. |
| 6,351,384 B1 | 2/2002 | Daikoku et al. ........... 361/704 | 7,050,308 B2 | 5/2006 | Kenny, Jr. et al. |
| 6,360,814 B1 | 3/2002 | Tanaka et al. ............ 165/104.33 | 7,051,802 B2 | 5/2006 | Baer et al. |
| 6,362,958 B1 | 3/2002 | Yu et al. | 7,061,104 B2 | 6/2006 | Kenny, Jr. et al. |
| 6,366,462 B1 | 4/2002 | Chu et al. ............. 361/699 | 7,077,634 B2 | 7/2006 | Munch et al. |
| 6,381,846 B2 | 5/2002 | Insley et al. ........... 29/890.39 | 7,090,001 B2 | 8/2006 | Zhou et al. |
| 6,385,044 B1 | 5/2002 | Colbert et al. ........... 361/700 | 7,104,312 B2 | 9/2006 | Goodson et al. |
| 6,396,706 B1 | 5/2002 | Wohlfarth ............. 361/760 | 7,120,021 B2 | 10/2006 | Hamman ................ 361/699 |
| 6,397,932 B1 | 6/2002 | Calaman et al. | 7,154,749 B2 | 12/2006 | Stefanoski et al. ......... 361/695 |
| 6,431,260 B1 | 8/2002 | Agonafer et al. | 7,156,159 B2 | 1/2007 | Lovette et al. |
| 6,449,162 B1 | 9/2002 | Corbin, Jr. et al. ......... 361/719 | 7,178,512 B1 | 2/2007 | Merten |
| 6,457,515 B1 | 10/2002 | Vafai et al. ............. 165/80.4 | 7,184,269 B2 | 2/2007 | Campbell et al. ......... 361/700 |
| 6,459,581 B1 | 10/2002 | Newton et al. ........... 361/700 | 7,188,662 B2 | 3/2007 | Brewer et al. |
| 6,469,893 B1 | 10/2002 | Frutschy et al. | 7,190,583 B1 | 3/2007 | Fendley et al. |
| 6,478,258 B1 | 11/2002 | Yee .................... 244/163 | 7,201,012 B2 | 4/2007 | Munch et al. |
| 6,492,018 B1 | 12/2002 | Guddal | 7,201,214 B2 | 4/2007 | Munch et al. |
| 6,493,221 B2 | 12/2002 | Harrison et al. | 7,218,523 B2 * | 5/2007 | Hamman ................. 62/3.2 |
| 6,519,148 B2 | 2/2003 | Nakagawa et al. | 7,221,858 B2 | 5/2007 | Ku |
| 6,519,151 B2 | 2/2003 | Chu et al. ............. 361/699 | 7,243,704 B2 | 7/2007 | Tustaniwskyi et al. ........ 165/80 |
| 6,527,835 B1 | 3/2003 | Manginell et al. ......... 96/102 | 7,254,957 B2 | 8/2007 | Weber et al. ........... 62/259.2 |
| 6,533,840 B2 | 3/2003 | Martin et al. | 7,278,269 B2 * | 10/2007 | Pham et al. ............. 62/3.2 |
| 6,536,510 B2 | 3/2003 | Khrustalev et al. ........ 165/104.33 | 7,278,549 B2 | 10/2007 | Munch et al. |
| 6,536,516 B2 | 3/2003 | Davies et al. ........... 165/170 | 7,293,423 B2 | 11/2007 | Upadhya et al. |
| 6,562,662 B2 | 5/2003 | Shishido et al. ......... 438/125 | 7,295,444 B1 | 11/2007 | Wang |
| 6,574,597 B1 | 6/2003 | Mohri et al. ........... 704/251 | 7,301,773 B2 | 11/2007 | Brewer et al. |
| 6,578,626 B1 | 6/2003 | Calaman et al. .......... 165/80.4 | 7,310,953 B2 * | 12/2007 | Pham et al. ............. 62/3.2 |
| 6,596,229 B2 | 7/2003 | Lin et al. | 7,325,588 B2 | 2/2008 | Malone et al. |
| 6,606,251 B1 | 8/2003 | Kenny, Jr. et al. | 7,342,789 B2 | 3/2008 | Hall et al. |
| 6,626,236 B1 | 9/2003 | Bandoh et al. ........... 165/206 | 7,344,363 B2 | 3/2008 | Munch et al. |
| 6,639,799 B2 | 10/2003 | Prasher et al. | 7,359,197 B2 | 4/2008 | Stefanoski et al. |
| 6,643,132 B2 | 11/2003 | Faneuf et al. ........... 361/700 | 7,385,810 B2 | 6/2008 | Chu et al. |
| 6,651,452 B2 | 11/2003 | Lecke et al. | 7,398,821 B2 | 7/2008 | Rainer et al. |
| 6,657,121 B2 | 12/2003 | Garner ................. 174/16.3 | 7,402,029 B2 | 7/2008 | Munch et al. |
| 6,657,860 B2 | 12/2003 | Matsui et al. | 7,430,118 B1 | 9/2008 | Noteboom et al. |
| 6,675,875 B1 | 1/2004 | Vafai et al. ............. 165/80.4 | 7,434,412 B1 | 10/2008 | Miyahira |
| 6,678,168 B2 | 1/2004 | Kenny, Jr. et al. | 7,449,122 B2 | 11/2008 | Corbin et al. |
| 6,679,315 B2 | 1/2004 | Cosley et al. ........... 165/80.4 | 7,455,103 B2 | 11/2008 | Sato et al. |
| 6,680,044 B1 | 1/2004 | Tonkovich et al. ........ 423/652 | 7,462,852 B2 | 12/2008 | Appleby et al. |
| 6,700,785 B2 | 3/2004 | Berry et al. ............ 361/726 | 7,509,995 B2 | 3/2009 | Bhatti et al. |
| 6,718,781 B2 | 4/2004 | Freund et al. ............ 62/199 | 7,539,020 B2 | 5/2009 | Chow et al. |
| 6,729,383 B1 | 5/2004 | Cannell et al. ........... 165/80.3 | 7,591,302 B1 | 9/2009 | Lenehan et al. |
| 6,757,169 B2 | 6/2004 | Kondo et al. | 7,633,752 B2 * | 12/2009 | Prasher ................ 361/688 |
| 6,763,880 B1 | 7/2004 | Shih .................. 165/80.4 | 7,666,215 B2 | 2/2010 | Callister et al. |
| 6,775,137 B2 | 8/2004 | Chu et al. | 7,686,069 B2 * | 3/2010 | Parish et al. ........... 361/700 |
| 6,787,052 B1 | 9/2004 | Vaganov | 7,715,194 B2 * | 5/2010 | Brewer et al. .......... 361/699 |
| 6,787,899 B2 | 9/2004 | Rinella et al. ........... 257/712 | 7,782,616 B1 | 8/2010 | Myers et al. |

| | | | |
|---|---|---|---|
| 8,209,989 B2 * | 7/2012 | Chaparro Monferrer et al. | 62/3.2 |
| 8,248,801 B2 * | 8/2012 | Campbell et al. | 361/701 |
| 8,254,422 B2 | 8/2012 | Datta et al. | |
| 2001/0042616 A1 | 11/2001 | Baer | |
| 2002/0011330 A1 | 1/2002 | Insley et al. | |
| 2002/0031948 A1 | 3/2002 | Yasufuku et al. | 439/625 |
| 2002/0039279 A1 | 4/2002 | Ishikawa et al. | |
| 2002/0079095 A1 | 6/2002 | Davies et al. | |
| 2002/0080578 A1 | 6/2002 | Xie | |
| 2002/0134543 A1 | 9/2002 | Estes et al. | 165/277 |
| 2002/0152761 A1 | 10/2002 | Patel et al. | 62/259.2 |
| 2002/0160245 A1 | 10/2002 | Genc | 429/26 |
| 2003/0056368 A1 | 3/2003 | Nyqvist | |
| 2003/0077474 A1 | 4/2003 | Rabinkin et al. | |
| 2003/0097846 A1 | 5/2003 | Novotny et al. | 62/3.7 |
| 2003/0128508 A1 | 7/2003 | Faneuf et al. | |
| 2003/0205363 A1 | 11/2003 | Chu et al. | |
| 2004/0008483 A1 | 1/2004 | Cheon | |
| 2004/0012927 A1 | 1/2004 | Lee et al. | |
| 2004/0050231 A1 | 3/2004 | Chu et al. | 83/574 |
| 2004/0052049 A1 | 3/2004 | Wu et al. | 361/699 |
| 2004/0057211 A1 | 3/2004 | Kondo et al. | 361/696 |
| 2004/0099410 A1 | 5/2004 | Ghosh | 165/185 |
| 2004/0105234 A1 | 6/2004 | Messina et al. | |
| 2004/0112585 A1 | 6/2004 | Goodson et al. | 165/299 |
| 2004/0188059 A1 | 9/2004 | Todd, Jr. et al. | |
| 2004/0188076 A1 | 9/2004 | Lee | 165/174 |
| 2004/0206477 A1 | 10/2004 | Kenny et al. | 165/80.4 |
| 2004/0216863 A1 | 11/2004 | Hu | |
| 2004/0221604 A1 | 11/2004 | Ota et al. | 62/259.2 |
| 2004/0228091 A1 | 11/2004 | Miyairi | |
| 2005/0024832 A1 | 2/2005 | Lee et al. | |
| 2005/0041393 A1 | 2/2005 | Tustaniwskyi et al. | |
| 2005/0061013 A1 | 3/2005 | Bond | |
| 2005/0068728 A1 | 3/2005 | Chu et al. | |
| 2005/0082666 A1 | 4/2005 | Lee et al. | 257/728 |
| 2005/0083657 A1 | 4/2005 | Hamman | 361/699 |
| 2005/0117298 A1 | 6/2005 | Koga et al. | 361/699 |
| 2005/0133200 A1 | 6/2005 | Malone et al. | 165/80.4 |
| 2005/0174737 A1 | 8/2005 | Meir | |
| 2005/0231914 A1 | 10/2005 | Mikubo et al. | 361/699 |
| 2005/0243516 A1 | 11/2005 | Stefanoski et al. | |
| 2005/0247433 A1 | 11/2005 | Corrado et al. | 165/80.4 |
| 2005/0257532 A1 | 11/2005 | Ikeda et al. | 62/3.7 |
| 2005/0259393 A1 | 11/2005 | Vinson et al. | 361/690 |
| 2006/0037739 A1 | 2/2006 | Utsunomiya | 165/104.33 |
| 2006/0060333 A1 | 3/2006 | Chordia et al. | 165/104.33 |
| 2006/0076122 A1 | 4/2006 | Huang et al. | |
| 2006/0120039 A1 | 6/2006 | Yuval | |
| 2006/0133039 A1 | 6/2006 | Belady | 361/699 |
| 2006/0137870 A1 | 6/2006 | Ohhashi et al. | |
| 2006/0139882 A1 | 6/2006 | Mikubo et al. | 361/699 |
| 2006/0161311 A1 | 7/2006 | Vinson et al. | 700/300 |
| 2006/0171113 A1 | 8/2006 | Wu | |
| 2006/0187639 A1 | 8/2006 | Carswell | 361/699 |
| 2006/0219388 A1 | 10/2006 | Terakado et al. | |
| 2006/0232945 A1 | 10/2006 | Chu et al. | |
| 2006/0237166 A1 | 10/2006 | Otey et al. | |
| 2006/0245987 A1 | 11/2006 | Schmidt | |
| 2007/0006460 A1 | 1/2007 | Kim | |
| 2007/0039719 A1 | 2/2007 | Eriksen | |
| 2007/0042514 A1 | 2/2007 | Wu et al. | |
| 2007/0053161 A1 | 3/2007 | Giardina et al. | |
| 2007/0084585 A1 | 4/2007 | Takagi et al. | |
| 2007/0098143 A1 | 5/2007 | Thankgamani et al. | |
| 2007/0109739 A1 | 5/2007 | Stefanoski | |
| 2007/0115634 A1 | 5/2007 | Laing | 361/699 |
| 2007/0152352 A1 | 7/2007 | McKinnell et al. | |
| 2007/0201210 A1 | 8/2007 | Chow et al. | |
| 2007/0211428 A1 | 9/2007 | Doll | |
| 2007/0227708 A1 | 10/2007 | Hom et al. | |
| 2007/0235167 A1 | 10/2007 | Brewer et al. | |
| 2007/0267181 A1 | 11/2007 | Lin et al. | |
| 2007/0297136 A1 | 12/2007 | Konshak | |
| 2008/0013283 A1 | 1/2008 | Gilbert et al. | 361/715 |
| 2008/0018212 A1 | 1/2008 | Spearing et al. | |
| 2008/0024992 A1 | 1/2008 | Pflueger | |
| 2008/0055845 A1 | 3/2008 | Murakami et al. | |
| 2008/0110963 A1 | 5/2008 | Lin et al. | |
| 2008/0205003 A1 | 8/2008 | Belady | |
| 2008/0285228 A1 | 11/2008 | Koch et al. | |
| 2009/0159241 A1 | 6/2009 | Lipp et al. | |
| 2009/0183520 A1 | 7/2009 | Yukimoto | |
| 2009/0225513 A1 | 9/2009 | Correa et al. | |
| 2009/0262495 A1 | 10/2009 | Neudorfer | |
| 2010/0132640 A1 | 6/2010 | Methley et al. | |
| 2011/0073292 A1 | 3/2011 | Datta et al. | |
| 2012/0210730 A1 * | 8/2012 | Pruett et al. | 62/3.2 |
| 2012/0210731 A1 * | 8/2012 | Campbell et al. | 62/3.2 |
| 2012/0211204 A1 * | 8/2012 | Agonafer et al. | 165/104.33 |
| 2012/0240882 A1 * | 9/2012 | Gao et al. | 62/3.2 |

FOREIGN PATENT DOCUMENTS

| | | |
|---|---|---|
| DE | 42 42 841 A1 | 11/1997 |
| DE | 19628548 A1 | 1/1998 |
| DE | 29717480 U1 | 2/1998 |
| DE | 197 15 001 A1 | 12/1998 |
| DE | 69413012 T2 | 3/1999 |
| DE | 69511875 T2 | 3/2000 |
| DE | 3-540-67777-1 | 1/2001 |
| DE | 10141525 A1 | 3/2003 |
| DE | 10319367 A1 | 11/2004 |
| DE | 102004042154 A1 | 3/2006 |
| EP | 0 520 173 A2 | 12/1992 |
| EP | 0720720 B1 | 1/1998 |
| EP | 0845728 A2 | 3/1998 |
| EP | 1 003 006 A1 | 5/2000 |
| EP | 1 153 690 A1 | 11/2001 |
| EP | 1 154 476 A1 | 11/2001 |
| EP | 1 520 993 A2 | 6/2005 |
| JP | 60046056 | 12/1985 |
| JP | 3070197 A | 3/1991 |
| JP | 5304383 | 11/1993 |
| JP | 9298380 | 11/1997 |
| JP | 10099592 | 4/1998 |
| JP | 10223811 | 8/1998 |
| JP | 2001326311 | 11/2001 |
| JP | 2004363308 A | 12/2004 |
| TW | 183247 | 5/1992 |
| TW | 49131 | 6/2002 |
| TW | 495062 | 7/2002 |
| TW | 0502102 B | 9/2002 |
| TW | 510490 | 11/2002 |
| TW | 0306614 Y | 2/2007 |
| WO | 2005080901 A1 | 9/2005 |
| WO | 2007006590 A2 | 1/2007 |

OTHER PUBLICATIONS

Office Action mailed on Jun. 11, 2009, U.S. Appl. No. 10/698,179, pp. 1-17.
Yogendra Joshi, "Heat out of small packages", Dec. 2001, Mechanical Engineering, pp. 56-58.
A. Rostami et al., "Liquid Flow and Heat Transfer in Microchannels: A Review", 2000, Heat and Technology, vol. 18, No. 2, pp. 59-68.
Lian Zhang et al., "Measurements and Modeling of Two-Phase Flow in Microchannels with Nearly Constant Heat Flux Boundary Conditions", Journal of Microelectromechanical Systems, vol. 11, No. 1, Feb. 2002, pp. 12-19.
Muhammad Mustafizur Rahman, "Measurements of Heat Transfer in Microchannel Heat Sinks", Int. Comm. Heat Mass Transfer, vol. 27, No. 4, May 2000, pp. 495-506.
Issam Mudawar et al., "Enhancement of Critical Heat Flux from High Power Microelectronic Heat Sources in a Flow Channel", Journal of Electronic Packaging, Sep. 1990, vol. 112, pp. 241-248.
Nelson Kuan, "Experimental Evaluation of Micro Heat Exchangers Fabricated in Silicon", 1996, HTD-vol. 331, National Heat Transfer Conference, vol. 9, pp. 131-136.
E. W. Kreutz et al., "Simulation of micro-channel heat sinks for optoelectronic microsystems", Microelectronics Journal 31(2000), pp. 787-790.
J. C. Y. Koh et al., "Heat Transfer of Microstructures for Integrated Circuits", 1986, Int. Comm. Heat Mass Transfer, vol. 13, pp. 89-98.
Snezana Konecni et al., "Convection Cooling of Microelectronic Chips", 1992, InterSociety Conference on Thermal Phenomena, pp. 138-144.

X.F. Peng et al., "Convective heat transfer and flow friction for water flow in microchannel structures", 1996, Int. J. Heat Mass Transfer, vol. 39, No. 12, pp. 2599-2608, printed in Great Britain.

X.F. Peng et al., "Cooling Characteristics with Microchanneled Structures", 1994, Enhanced Heat Transfer, vol. 1, No. 4, pp. 315-326, printed in the United States of America.

"Cold Plate for Thermal Conduction Module with Inlet for Cooling Water Near Highest Power Chips", IBM Technical Disclosure Bulletin, vol. 30, No. 5, Oct. 1987, p. 413.

"Chip Cooling Device", IBM Technical Disclosure Bulletin, vol. 30, No. 9, Feb. 1988, pp. 435-436.

T.M. Adams et al., "An experimental investigation of single-phase forced convection in microchannels", 1997, Int. J. Heat Mass Transfer, vol. 41, Nos. 6-7, pp. 851-857, Printed in Great Britain.

Linan Jiang et al., "Closed-Loop Electroosmotic Microchannel Cooling System for VLSI Circuits", Mechanical Engineering Dept. Stanford University, pp. 1-27.

Chris Bourne, "Cool Chips plc Receives Nanotech Manufacturing Patent", Jul. 31, 2002, pp. 1-2.

Office action dated Oct. 6, 2010, U.S. Appl. No. 11/731,484, filed Mar. 30, 2007, 64 pages.

Office action dated Aug. 2, 2010, U.S. Appl. No. 10/882,132, filed Jun. 29, 2004, 14 pages.

Office action mailed on Apr. 12, 2010, U.S. Appl. No. 10/698,179, filed Oct. 30, 2003, 25 pages.

Office action, mail date: Jan. 13, 2011, U.S. Appl. No. 10/698,179, filed Oct. 30, 2003, 28 pages.

Office Action dated Dec. 9, 2011, U.S. Appl. No. 12/151,243, filed May 2, 2008, 10 pages.

Office action dated Jan. 9, 2012, U.S. Appl. No. 12/381,332, filed Mar. 10, 2009, 14 pages.

Office action dated May 12, 2011, U.S. Appl. No. 10/698,179, filed Oct. 30, 2003, 31 pages.

Office action dated Feb. 28, 2012, U.S. Appl. No. 10/882,132, filed Jun. 29, 2004, 15 pages.

Office action for U.S. Appl. No. 10/882,132, filed Jun. 29, 2004, 14 pages.

Office action for U.S. Appl. No. 12/228,053, filed Aug. 7, 2008, 21 pages.

Office action dated Sep. 27, 2012, U.S. Appl. No. 12/571,265, filed Sep. 30, 2009, 11 pages.

* cited by examiner

COOLING SYSTEMS INCORPORATING HEAT EXCHANGERS AND THERMOELECTRIC LAYERS

RELATED APPLICATIONS

This patent application is a continuation in part of U.S. patent application Ser. No. 10/698,179 filed Oct. 30, 2003, and entitled "METHOD AND APPARATUS FOR EFFICIENT VERTICAL FLUID DELIVERY FOR COOLING A HEAT PRODUCING DEVICE", hereby incorporated by reference, which is a continuation in part of U.S. patent application Ser. No. 10/680,584, filed Oct. 6, 2003 now U.S. Pat. No. 7,000,684, and entitled, "METHOD AND APPARATUS FOR EFFICIENT VERTICAL FLUID DELIVERY FOR COOLING A HEAT PRODUCING DEVICE", hereby incorporated by reference, which is a continuation in part of U.S. patent application Ser. No. 10/439,635, filed May 16, 2003 now U.S. Pat. No. 6,988,534 and entitled, "METHOD AND APPARATUS FOR FLEXIBLE FLUID DELIVERY FOR COOLING DESIRED HOT SPOTS IN A HEAT PRODUCING DEVICE", hereby incorporated by reference, which claims priority under 35 U.S.C. 119 (e) of the now abandoned U.S. Provisional Patent Application Ser. No. 60/423,009, filed Nov. 1, 2002 and entitled, "METHODS FOR FLEXIBLE FLUID DELIVERY AND HOTSPOT COOLING BY MICROCHANNEL HEAT SINKS", hereby incorporated by reference, as well as now abandoned U.S. Provisional Patent Application Ser. No. 60/442,383, filed Jan. 24, 2003 and entitled, "OPTIMIZED PLATE FIN HEAT EXCHANGER FOR CPU COOLING", which is also hereby incorporated by reference and co-pending U.S. Provisional Patent Application Ser. No. 60/455,729, filed Mar. 17, 2003 and entitled, "MICROCHANNEL HEAT EXCHANGER APPARATUS WITH POROUS CONFIGURATION AND METHOD OF MANUFACTURING THEREOF", which is hereby incorporated by reference. The U.S. patent application Ser. No. 10/439,635, filed May 16, 2003 and entitled, "METHOD AND APPARATUS FOR FLEXIBLE FLUID DELIVERY FOR COOLING DESIRED HOT SPOTS IN A HEAT PRODUCING DEVICE" also claims priority under 35 U.S.C. 119 (e) of the now abandoned U.S. Provisional Patent Application, Ser. No. 60/423,009, filed Nov. 1, 2002 and entitled, "METHODS FOR FLEXIBLE FLUID DELIVERY AND HOTSPOT COOLING BY MICROCHANNEL HEAT SINKS", hereby incorporated by reference, as well as co-pending U.S. Provisional Patent Application Ser. No. 60/442,383, filed Jan. 24, 2003 and entitled, "OPTIMIZED PLATE FIN HEAT EXCHANGER FOR CPU COOLING", hereby incorporated by reference, and co-pending U.S. Provisional Patent Application, Ser. No. 60/455,729, filed Mar. 17, 2003 and entitled, "MICROCHANNEL HEAT EXCHANGER APPARATUS WITH POROUS CONFIGURATION AND METHOD OF MANUFACTURING THEREOF", which is hereby incorporated by reference.

FIELD OF THE INVENTION

The invention relates to a method and apparatus for cooling a heat producing device in general, and specifically, to a method and apparatus for efficient vertical fluid delivery in cooling an electronic device with minimal pressure drop within the heat exchanger, and to such apparatus incorporating one or more thermoelectric devices.

BACKGROUND OF THE INVENTION

Since their introduction in the early 1980's, microchannel heat sinks have shown much potential for high heat-flux cooling applications and have been used in the industry. However, existing microchannels include conventional parallel channel arrangements which are not well suited for cooling heat producing devices which have spatially-varying heat loads. Such heat producing devices have areas which produce more heat than others. These hotter areas are hereby designated as "hot spots" whereas the areas of the heat source which do not produce as much heat are hereby termed, "warm spots".

FIGS. 1A and 1B illustrate a side view and top view of a prior art heat exchanger 10 which is coupled to an electronic device 99, such as a microprocessor via a thermal interface material 98. As shown in FIGS. 1A and 1B, fluid generally flows from a single inlet port 12 and flows along the bottom surface 11 in between the parallel microchannels 14, as shown by the arrows, and exits through the outlet port 16. Although the heat exchanger 10 cools the electronic device 99, the fluid flows from the inlet port 12 to the outlet port 16 in a uniform manner. In other words, the fluid flows substantially uniformly along the entire bottom surface 11 of the heat exchanger 10 and does not supply more fluid to areas in the bottom surface 11 which correspond with hot spots in the device 99. In addition, the temperature of liquid flowing from the inlet generally increases as it flows along the bottom surface 11 of the heat exchanger. Therefore, regions of the heat source 99 which are downstream or near the outlet port 16 are not supplied with cool fluid, but actually warmer fluid or two-phase fluid which has already been heated upstream. In effect, the heated fluid actually propagates the heat across the entire bottom surface 11 of the heat exchanger and region of the heat source 99, whereby fluid near the outlet port 16 is so hot that it becomes ineffective in cooling the heat source 99. This increase in heat causes two-phase flow instabilities in which the boiling of fluid along the bottom surface 11 forces fluid away from the areas where the most heat is generated. In addition, the heat exchanger 10 having only one inlet 12 and one outlet 16 forces fluid to travel along the long parallel microchannels 14 in the bottom surface 11 for the entire length of the heat exchanger 10, thereby creating a large pressure drop due to the length the fluid must travel. The large pressure drop formed in the heat exchanger 10 makes pumping fluid to the heat exchanger 10 difficult and augments the instabilities.

FIG. 1C illustrates a side view diagram of a prior art multi-level heat exchanger 20. Fluid enters the multi-level heat exchanger 20 through the port 22 and travels downward through multiple jets 28 in the middle layer 26 to the bottom surface 27 and out port 24. In addition, the fluid traveling along the jets 28 does not uniformly flow down to the bottom surface 27. In addition, the heat exchanger in FIG. 1C exhibits the same problems discussed above with regard to the heat exchanger 10 in FIGS. 1A and 1B.

What is needed is a heat exchanger which is configured to achieve a small pressure drop between the inlet and outlet fluid ports while efficiently cooling the heat source. What is needed is a microchannel heat exchanger which is configured to achieve proper temperature uniformity in the heat source. What is also needed is a heat exchanger which is configured to achieve proper temperature uniformity in light of hot spots in the heat source.

SUMMARY OF THE INVENTION

In a further aspect, the invention describes a system for cooling a heat source. The system comprises a fluid heat exchanger, a pump, coupled with the fluid heat exchanger and configured to pass a fluid therethrough, a thermoelectric device having a cooling portion and a heating portion and configured so that at least a portion of the cooling portion is in thermal contact with the fluid heat exchanger to cool the fluid heat exchanger, and a heat rejector configured to be in thermal contact with at least a portion of the heating portion of the thermoelectric device.

According to the present invention, many possible constructions of the thermoelectric device, the heat rejector and the fluid heat exchanger are contemplated. Without prejudice the following device configurations are specifically contemplated: those wherein the thermoelectric device and the fluid heat exchanger are integrally formed; those wherein the thermoelectric device and the fluid heat exchanger are modularly formed and coupled with one another; those wherein the thermoelectric device and the heat rejector are integrally formed: those wherein the thermoelectric device and the heat rejector are modularly formed and coupled with one another; and those wherein the thermoelectric device, the heat rejector, and the fluid heat exchanger are integrally formed.

Further, several possible configurations of the fluid heat exchanger, the heat rejector and the thermoelectric device are contemplated, including those wherein the thermoelectric device is positioned so the fluid heat exchanger is between it and the electronic device, when the system is configured to cool the heat source; and those wherein the thermoelectric device is positioned between the fluid heat exchanger and the heat rejector.

In another aspect, the present invention contemplates a device wherein the heat exchanger comprises a manifold region for fluid delivery and a microscaled region. The microscaled region comprises microchannels, micropillars, microlattice, or a microporous region. The pump used in the present invention is preferably an electromechanical pump, but may be any type of pump, including an ionic pump. Please note that the present invention, is not limited by the above-mentioned specifically contemplated embodiments, but is only bound by the scope of the appended claims.

Also within the present invention, a system for cooling an electronic device is presented. The device includes a fluid heat exchanger, a pump, a first thermoelectric device, a heat rejector, and a second thermoelectric device. The pump is coupled with the fluid heat exchanger and configured to pass a fluid therethrough. Each of the thermoelectric devices have a cooling portion and a heating portion. The first thermoelectric device is configured so that at least a portion of the cooling portion is in thermal contact with the fluid heat exchanger to cool the fluid heat exchanger and at least a portion of the heating portion is in contact with the heat rejector. The second thermoelectric device is configured so that at least a portion of the heating portion is in thermal contact with the fluid heat exchanger to heat the fluid heat exchanger and so that at least a portion of the cooling portion is in contact with the electronic device to cool the electronic device.

According to the present invention, many possible constructions of the thermoelectric device, the heat rejector and the fluid heat exchanger are contemplated. Without prejudice the following system configurations are specifically contemplated: those wherein the first thermoelectric device and the fluid heat exchanger are integrally formed: those wherein the first thermoelectric device and the fluid heat exchanger are modularly formed and coupled with one another; those wherein the second thermoelectric device and the fluid heat exchanger are integrally formed; those wherein the second thermoelectric device and the fluid heat exchanger are modularly formed and coupled with one another; those wherein the first thermoelectric device and the heat rejector are integrally formed; those wherein the first thermoelectric device and the heat rejector are modularly formed and coupled with one another; and those wherein the first thermoelectric device, the second thermoelectric device, the heat rejector, and the fluid heat exchanger are integrally formed.

Further, several possible configurations of the fluid heat exchanger, the heat rejector and the thermoelectric device are contemplated, including those wherein the thermoelectric device is positioned so it is between the fluid heat exchanger and the electronic device, when the system is configured to cool an electronic device; and those wherein the fluid heat exchanger is positioned between the thermoelectric device and the heat rejector.

In another aspect, the present invention contemplates a system wherein the heat exchanger comprises a manifold region for fluid delivery and a microscaled region. The microscaled region comprises microchannels, micropillars, microlattice, or a microporous region. The pump used in the present invention is preferably an electromechanical pump, but may be any type of pump, including an ionic pump. Please note that the present invention, is not limited by the above-mentioned specifically contemplated embodiments, but is only bound by the scope of the appended claims.

The present invention also presents a system for cooling an electronic device. The system comprises a fluid heat exchanger, a fluid conduit structure, coupled with the fluid heat exchanger, a pump, a heat rejector, and a thermoelectric device. The pump is coupled with the fluid conduit structure and configured to pass a fluid therethrough and further through the fluid heat exchanger. Both the heat rejector and the thermoelectric device are coupled with the fluid conduit structure and thermally coupled with the fluid contained therein.

According to the present invention, many possible constructions of the thermoelectric device, the heat rejector and the fluid heat exchanger are contemplated. Without prejudice the following system configurations are specifically contemplated: those wherein the thermoelectric device and the conduit structure are integrally formed; and those wherein the thermoelectric device and the conduit structure are modularly formed and coupled with one another.

In the system of the present invention, preferably the heat exchanger comprises a manifold region for fluid delivery and a microscaled region. The microscaled region comprises microchannels, micropillars, microlattice, or a microporous region. The pump used in the present invention is preferably an electromechanical pump, but may be any type of pump, including an ionic pump. Please note that the present invention, is not limited by the above-mentioned specifically contemplated embodiments, but is only bound by the scope of the appended claims.

In a further aspect the present invention presents a microprocessor cooling system. The microprocessor cooling system comprises a fluid heat exchanger, a thermoelectric device, a heat rejector, and a pump configured to pass fluid through the fluid heat exchanger. The fluid heat exchanger is thermally couplable with a microprocessor, the thermoelectric device is thermally coupled with the fluid heat exchanger and therefore also thermally couplable with the microprocessor. The heat rejector is thermally coupled with both the fluid heat exchanger and with the thermoelectric device.

According to the present invention, many possible constructions of the thermoelectric device, the heat rejector and the fluid heat exchanger are contemplated. Without prejudice the following system configurations are specifically contemplated: those wherein the fluid heat exchanger, the heat rejector and the thermoelectric device are integrally formed: and those wherein the fluid heat exchanger, the heat rejector and the thermoelectric device are modularly formed and coupled with one another.

In the system of the present invention, preferably the heat exchanger comprises a manifold region for fluid delivery and a microscaled region. The microscaled region comprises microchannels, micropillars, microlattice, or a microporous region. The pump used in the present invention is preferably an electromechanical pump, but may be any type of pump, including an ionic pump. Please note that the present invention, is not limited by the above-mentioned specifically contemplated embodiments, but is only bound by the scope of the appended claims.

Other features and advantages of the present invention will become apparent after reviewing the detailed description of the preferred and alternative embodiments set forth below.

DETAILED DESCRIPTION OF THE PRESENT INVENTION

Generally, the heat exchanger captures thermal energy generated from a heat source by passing fluid through selective areas of the interface layer which is preferably coupled to the heat source. In particular, the fluid is directed to specific areas in the interface layer to cool the hot spots and areas around the hot spots to generally create temperature uniformity across the heat source while maintaining a small pressure drop within the heat exchanger. As discussed in the different embodiments below, the heat exchanger utilizes a plurality of apertures, channels and/or fingers in the manifold layer as well as conduits in the intermediate layer to direct and circulate fluid to and from selected hot spot areas in the interface layer. Alternatively, the heat exchanger includes several ports which are specifically disposed in predetermined locations to directly deliver fluid to and remove fluid from the hot spots to effectively cool the heat source.

It is apparent to one skilled in the art that although the microchannel heat exchanger of the present invention is described and discussed in relation to cooling hot spot locations in a device, the heat exchanger is alternatively used for heating a cold spot location in a device. It should also be noted that although the present invention is preferably described as a microchannel heat exchanger, the present invention can be used in other applications and is not limited to the discussion herein.

Figure 2A:
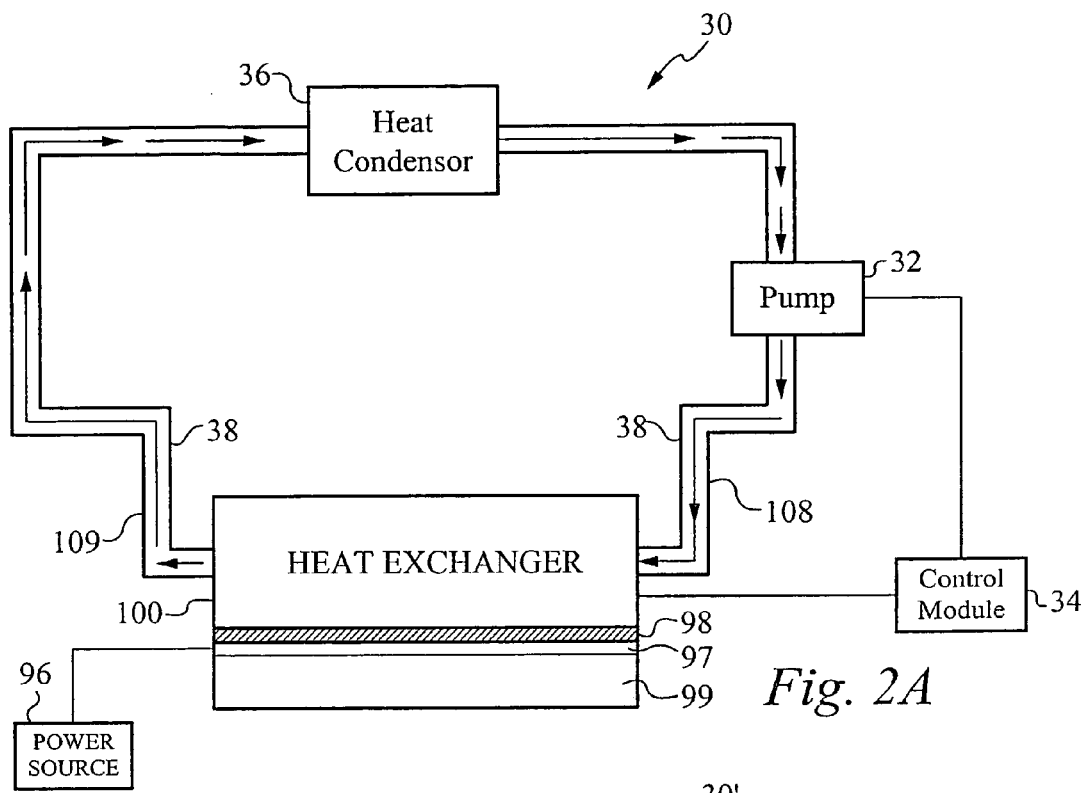
FIG. 2A illustrates a schematic diagram of a closed loop cooling system incorporating a preferred embodiment of the flexible fluid delivery microchannel heat exchanger of the present invention.
Figure 2B:
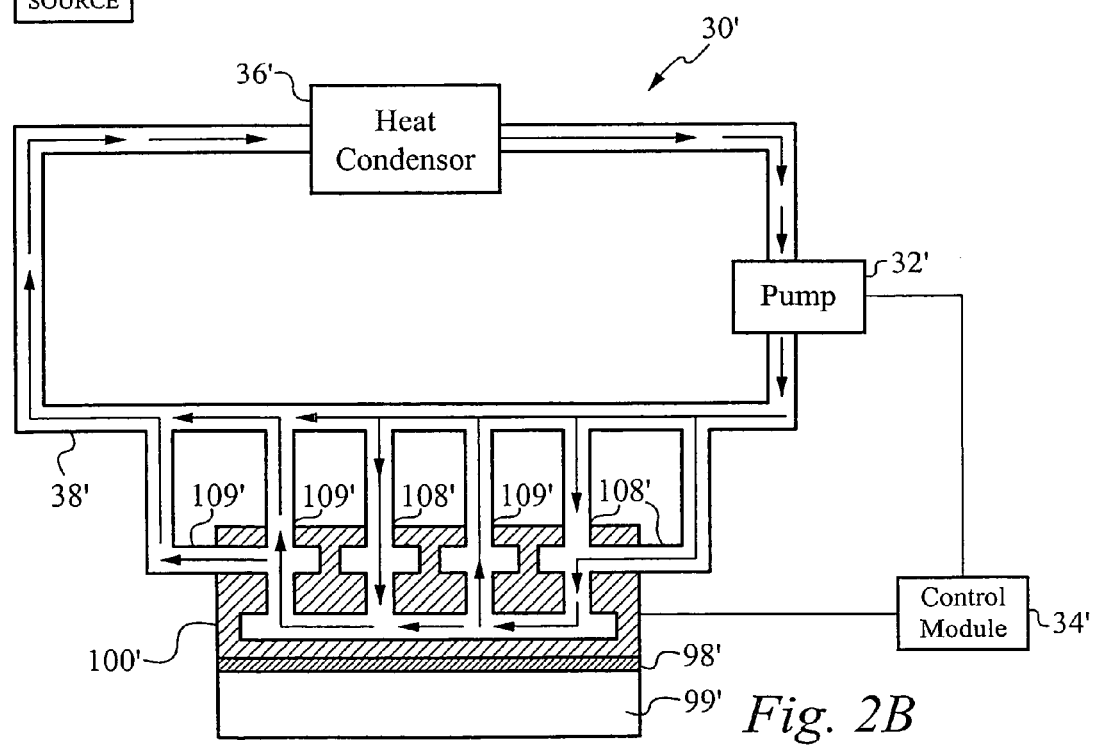
FIG. 2B illustrates a schematic diagram of a closed loop cooling system incorporating an alternative embodiment of a flexible fluid delivery microchannel heat exchanger of the present invention.

FIG. 2A illustrates a schematic diagram of a closed loop hermetically sealed cooling system 30 which includes an alternative flexible fluid delivery microchannel heat exchanger 100 in accordance with the present invention. In addition, FIG. 2B illustrates a schematic diagram of a closed loop cooling system 30 which includes an alternative flexible fluid delivery microchannel heat exchanger 100 with multiple ports 108, 109 in accordance with the present invention. It should be noted that the system alternatively incorporates other heat exchanger embodiments herein and is not limited to the alternative heat exchanger 100.

As shown in FIG. 2A, the fluid ports 108, 109 are coupled to fluid lines 38 which are coupled to a pump 32 and heat condensor 30. The pump 32 pumps and circulates fluid within the closed loop 30. In one alternative, one fluid port 108 is used to supply fluid to the heat exchanger 100. In addition, one fluid port 109 is used to remove fluid from the heat exchanger 100. In one embodiment, a uniform, constant amount of fluid flow enters and exits the heat exchanger 100 via the respective fluid ports 108, 109. Alternatively, different amounts of fluid flow enter and exit through the inlet and outlet port(s) 108, 109 at a given time. Alternatively, as shown in FIG. 2B, one pump provides fluid to several designated inlet ports 108. Alternatively, multiple pumps (not shown), provide fluid to their respective inlet and outlet ports 108, 109. In addition, the dynamic sensing and control module 34 is alternatively employed in the system to variate and dynamically control the amount and flow rate of fluid entering and exiting the preferred or alternative heat exchanger in response to varying hot spots or changes in the amount of heat in a hot spot location as well as the locations of the hot spots.

Figure 3A:
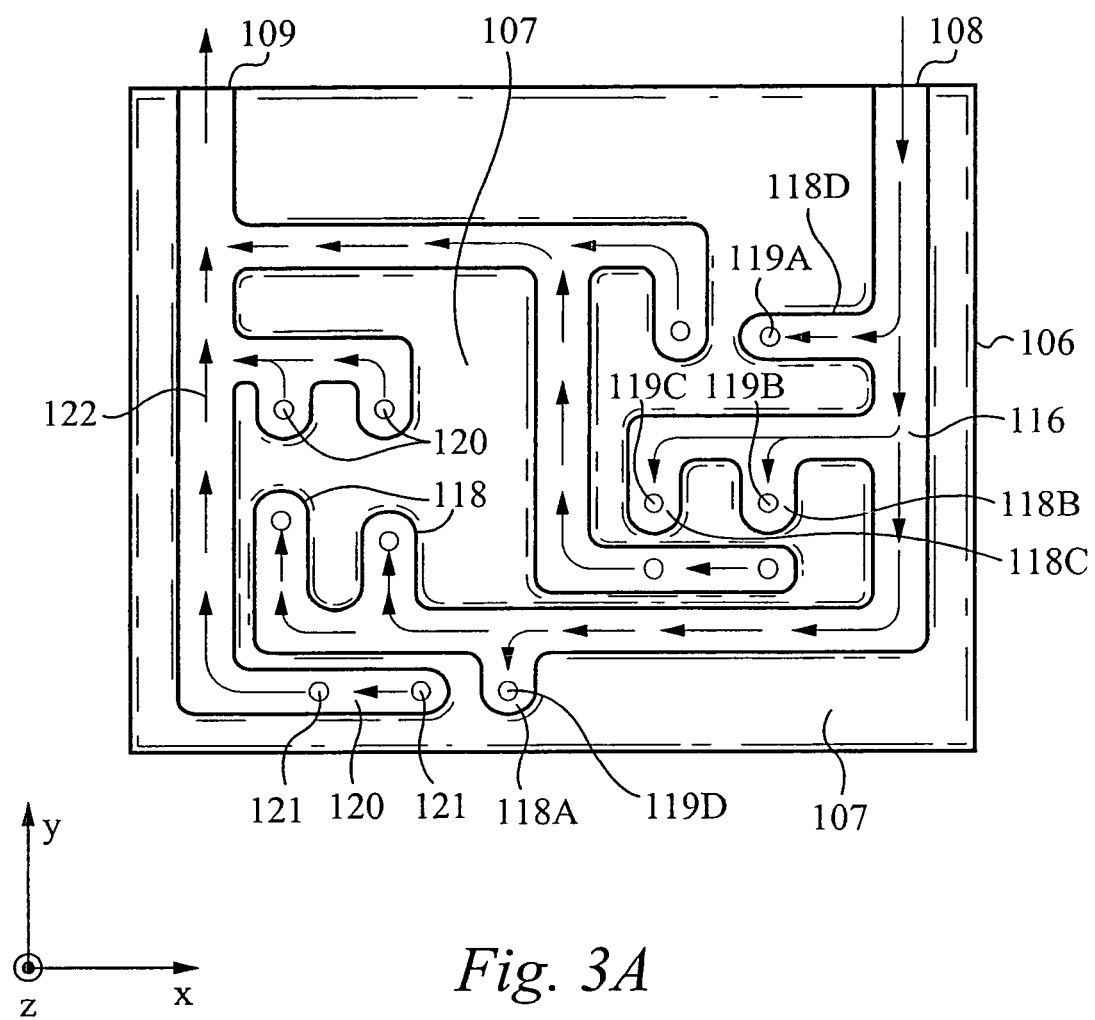
FIG. 3A illustrates a top view of the alternative manifold layer of the heat exchanger in accordance with the present invention.
Figure 3B:
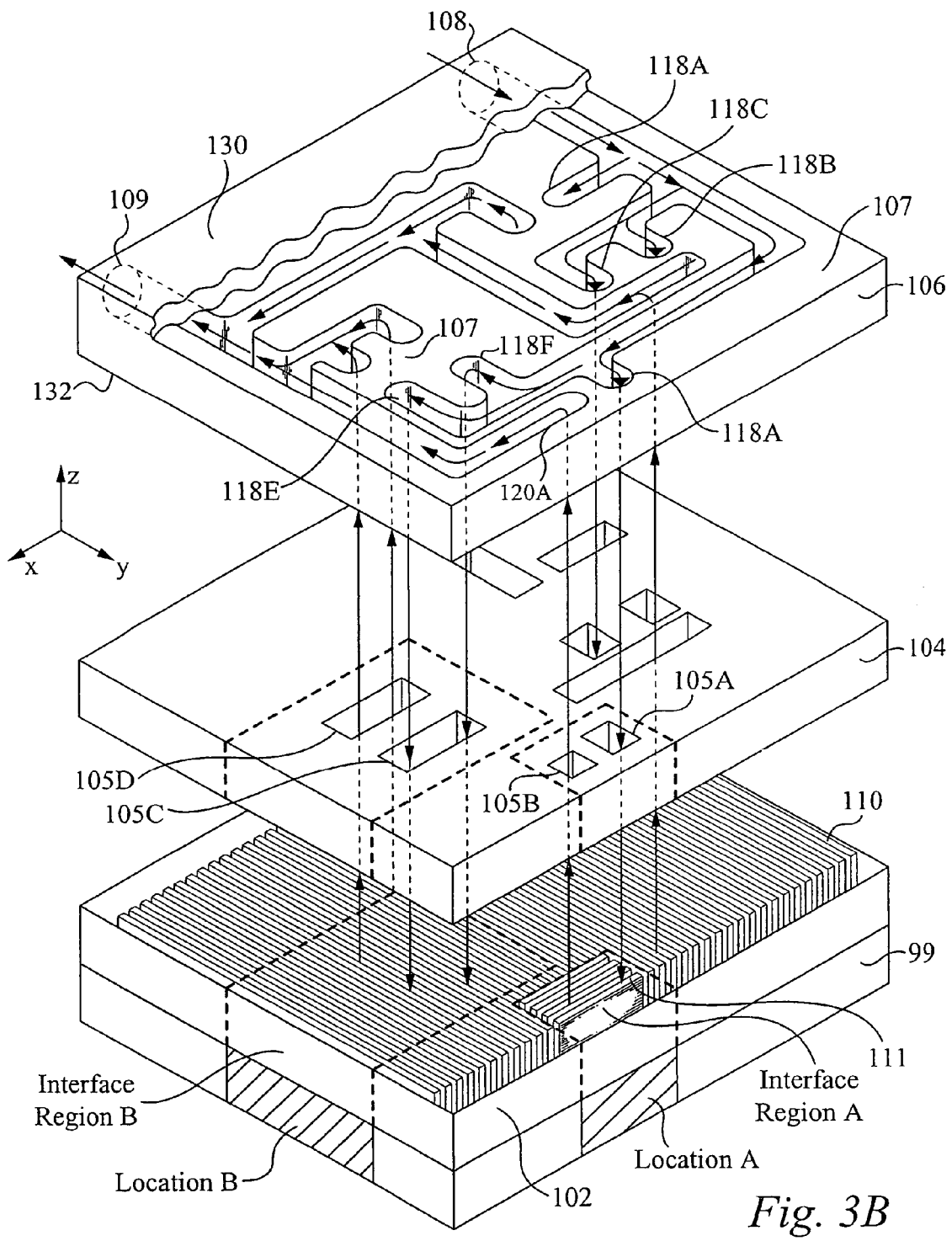
FIG. 3B illustrates an exploded view of the alternative heat exchanger with the alternative manifold layer in accordance with the present invention.

FIG. 3B illustrates an exploded view of the alternative three tier heat exchanger 100 with the alternative manifold layer in accordance with the present invention. The alternative embodiment, as shown in FIG. 3B, is a three level heat exchanger 100 which includes an interface layer 102, at least one intermediate layer 104 and at least one manifold layer 106. Alternatively, as discussed below, the heat exchanger 100 is a two level apparatus which includes the interface layer 102 and the manifold layer 106. As shown in FIGS. 2A and 2B, the heat exchanger 100 is coupled to a heat source 99, such as an electronic device, including, but not limited to a microchip and integrated circuit, whereby a thermal interface material 98 is preferably disposed between the heat source 99 and the heat exchanger 100. Alternatively, the heat exchanger 100 is directly coupled to the surface of the heat source 99. It is also apparent to one skilled in the art that the heat exchanger 100 is alternatively integrally formed into the heat source 99, whereby the heat exchanger 100 and the heat source 99 are formed as one piece. Thus, the interface layer 102 is integrally disposed with the heat source 99 and is formed as one piece with the heat source. In addition, a thermoelectric device 97 is preferably configured in between the thermal interface material 98 and the heat source 99. More detail of the thermoelectric device 97 is discussed below.

It is preferred that the microchannel heat exchanger of the present invention is configured to be directly or indirectly in contact with the heat source 99 which is rectangular in shape, as shown in the figures. However, it is apparent to one skilled in the art that the heat exchanger 100 can have any other shape conforming with the shape of the heat source 99. For example, the heat exchanger of the present invention can be configured to have an outer semicircular shape which allows the heat exchanger (not shown) to be in direct or indirect contact with a corresponding semicircular shaped heat source (not shown). In addition, it is preferred that the heat exchanger is slightly larger in dimension than the heat source within the range of and including 0.5-5.0 millimeters.

FIG. 3A illustrates a top view of the alternate manifold layer 106 of the present invention. In particular, as shown in FIG. 3B, the manifold layer 106 includes four sides as well as a top surface 130 and a bottom surface 132. However, the top surface 130 is removed in FIG. 3A to adequately illustrate and describe the workings of the manifold layer 106. As shown in FIG. 3A, the manifold layer 106 has a series of channels or passages 116, 118, 120, 122 as well as ports 108, 109 formed therein. The fingers 118, 120 extend completely through the body of the manifold layer 106 in the Z-direction as shown in FIG. 3B. Alternatively, the fingers 118 and 120 extend partially through the manifold layer 106 in the Z-direction and have apertures as shown in FIG. 3A. In addition, passages 116 and 122 extend partially through the manifold layer 106. The remaining areas between the inlet and outlet passages 116, 120, designated as 107, extend from the top surface 130 to the bottom surface 132 and form the body of the manifold layer 106.

As shown in FIG. 3A, the fluid enters manifold layer 106 via the inlet port 108 and flows along the inlet channel 116 to several fingers 118 which branch out from the channel 116 in several directions in the X and/or Y directions to apply fluid to selected regions in the interface layer 102. The fingers 118 are arranged in different predetermined directions to deliver fluid to the locations in the interface layer 102 corresponding to the areas at or near the hot spots in the heat source. These locations in the interface layer 102 are hereinafter referred to as interface hot spot regions. The fingers are configured to cool stationary as well as temporally varying interface hot spot regions. As shown in FIG. 3A, the channels 116, 122 and fingers 118, 120 are disposed in the X and/or Y directions in the manifold layer 106. Thus, the various directions of the channels 116, 122 and fingers 118, 120 allow delivery of fluid to cool hot spots in the heat source 99 and/or minimize pressure drop within the heat exchanger 100. Alternatively, channels 116, 122 and fingers 118, 120 are periodically disposed in the manifold layer 106 and exhibit a pattern, as in the example shown in FIGS. 4 and 5.

The arrangement as well as the dimensions of the fingers 118, 120 are determined in light of the hot spots in the heat source 99 that are desired to be cooled. The locations of the hot spots as well as the amount of heat produced near or at each hot spot are used to configure the manifold layer 106 such that the fingers 118, 120 are placed above or proximal to the interface hot spot regions in the interface layer 102. The manifold layer 106 allows one phase and/or two-phase fluid to circulate to the interface layer 102 without allowing a substantial pressure drop from occurring within the heat exchanger 100 and the system 30 (FIG. 2A). The fluid delivery to the interface hot spot regions creates a uniform temperature at the interface hot spot region as well as areas in the heat source adjacent to the interface hot spot regions.

The dimensions as well as the number of channels 116 and fingers 118 depend on a number of factors. In one embodiment, the inlet and outlet fingers 118, 120 have the same width dimensions. Alternatively, the inlet and outlet fingers 118, 120 have different width dimensions. The width dimensions of the fingers 118, 120 are within the range of and including 0.25-0.50 millimeters. In one embodiment, the inlet and outlet fingers 118, 120 have the same length and depth dimensions. Alternatively, the inlet and outlet fingers 118, 120 have different length and depth dimensions. In another embodiment, the inlet and outlet fingers 118, 120 have varying width dimensions along the length of the fingers. The length dimensions of the inlet and outlet fingers 118, 120 are within the range of and including 0.5 millimeters to three times the size of the heat source length. In addition, the fingers 118, 120 have a height or depth dimension within the range and including 0.25-0.50 millimeters. In addition, less than 10 or more than 30 fingers per centimeter are alternatively disposed in the manifold layer 106. However, it is apparent to one skilled in the art that between 10 and 30 fingers per centimeter in the manifold layer is also contemplated.

It is contemplated within the present invention to tailor the geometries of the fingers 118, 120 and channels 116, 122 to be in non-periodic arrangement to aid in optimizing hot spot cooling of the heat source. In order to achieve a uniform temperature across the heat source 99, the spatial distribution of the heat transfer to the fluid is matched with the spatial distribution of the heat generation. As the fluid flows along the interface layer through the microchannels 110, its temperature increases and as it begins to transform to vapor under two-phase conditions. Thus, the fluid undergoes a significant expansion which results in a large increase in velocity. Generally, the efficiency of the heat transfer from the interface layer to the fluid is improved for high velocity flow. Therefore, it is possible to tailor the efficiency of the heat transfer to the fluid by adjusting the cross-sectional dimensions of the fluid delivery and removal fingers 118, 120 and channels 116, 122 in the heat exchanger 100.

For example, a particular finger can be designed for a heat source where there is higher heat generation near the inlet. In addition, it may be advantageous to design a larger cross section for the regions of the fingers 118, 120 and channels 116, 122 where a mixture of fluid and vapor is expected. Although not shown, a finger can be designed to start out with a small cross sectional area at the inlet to cause high velocity flow of fluid. The particular finger or channel can also be configured to expand to a larger cross-section at a downstream outlet to cause a lower velocity flow. This design of the finger or channel allows the heat exchanger to minimize pressure drop and optimize hot spot cooling in areas where the fluid increases in volume, acceleration and velocity due to transformation from liquid to vapor in two-phase flow.

In addition, the fingers 118, 120 and channels 116, 122 can be designed to widen and then narrow again along their length to increase the velocity of the fluid at different places in the microchannel heat exchanger 100. Alternatively, it is appropriate to vary the finger and channel dimensions from large to small and back again many times over in order to tailor the heat transfer efficiency to the expected heat dissipation distribution across the heat source 99. It should be noted that the above discussion of the varying dimensions of the fingers and channels also apply to the other embodiments discussed and is not limited to this embodiment.

Alternatively, as shown in FIG. 3A, the manifold layer 106 includes one or more apertures 119 in the inlet fingers 118. In the three tier heat exchanger 100, the fluid flowing along the fingers 118 flows down the apertures 119 to the intermediate layer 104. Alternatively, in the two-tier heat exchanger 100, the fluid flowing along the fingers 118 flows down the apertures 119 directly to the interface layer 102. In addition, as shown in FIG. 3A. the manifold layer 106 includes apertures 121 in the outlet fingers 120. In the three tier heat exchanger 100, the fluid flowing from the intermediate layer 104 flows up the apertures 121 into the outlet fingers 120. Alternatively, in the two-tier heat exchanger 100, the fluid flowing from the interface layer 102 flows directly up the apertures 121 into the outlet fingers 120.

In the alternative embodiment, the inlet and outlet fingers 118, 120 are open channels which do not have apertures. The bottom surface 103 of the manifold layer 106 abuts against the top surface of the intermediate layer 104 in the three tier exchanger 100 or abuts against the interface layer 102 in the two tier exchanger. Thus, in the three-tier heat exchanger 100, fluid flows freely to and from the intermediate layer 104 and the manifold layer 106. The fluid is directed to and from the appropriate interface hot spot region by conduits 105 the intermediate layer 104. It is apparent to one skilled in the art that the conduits 105 are directly aligned with the fingers, as described below or positioned elsewhere in the three tier system.

Although FIG. 3B shows the alternative three tier heat exchanger 100 with the alternative manifold layer, the heat exchanger 100 is alternatively a two layer structure which includes the manifold layer 106 and the interface layer 102, whereby fluid passes directly between the manifold layer 106 and interface layer 102 without passing through the interface layer 104. It is apparent to one skilled in the art that the configuration of the manifold, intermediate and interface layers are shown for exemplary purposes and is thereby not limited to the configuration shown.

As shown in FIG. 3B, the intermediate layer 104 includes a plurality of conduits 105 which extend therethrough. The inflow conduits 105 direct fluid entering from the manifold layer 106 to the designated interface hot spot regions in the interface layer 102. Similarly, the apertures 105 also channel fluid flow from the interface layer 102 to the exit fluid port(s) 109. Thus, the intermediate layer 104 also provides fluid delivery from the interface layer 102 to the exit fluid port 109 where the exit fluid port 108 is in communication with the manifold layer 106.

The conduits 105 are positioned in the interface layer 104 in a predetermined pattern based on a number of factors including, but not limited to, the locations of the interface hot spot regions, the amount of fluid flow needed in the interface hot spot region to adequately cool the heat source 99 and the temperature of the fluid. The conduits have a width dimension of 100 microns, although other width dimensions are contemplated up to several millimeters. In addition, the conduits 105 have other dimensions dependent on at least the above mentioned factors. It is apparent to one skilled in the art that each conduit 105 in the intermediate layer 104 has the same shape and/or dimension, although it is not necessary. For instance, like the fingers described above, the conduits alternatively have a varying length and/or width dimension. Additionally, the conduits 105 have a constant depth or height dimension through the intermediate layer 104. Alternatively, the conduits 105 have a varying depth dimension, such as a trapezoidal or a nozzle-shape, through the intermediate layer 104. Although the horizontal shape of the conduits 105 are shown to be rectangular in FIG. 2C, the conduits 105 alternatively have any other shape including, but not limited to, circular (FIG. 3A), curved, elliptical. Alternatively, one or more of the conduits 105 are shaped and contour with a portion of or all of the finger or fingers above.

The intermediate layer 104 is horizontally positioned within the heat exchanger 100 with the conduits 105 positioned vertically. Alternatively, the intermediate layer 104 is positioned in any other direction within the heat exchanger 100 including, but not limited to, diagonal and curved forms. Alternatively, the conduits 105 are positioned within the intermediate layer 104 in a horizontally, diagonally, curved or any other direction. In addition, the intermediate layer 104 extends horizontally along the entire length of the heat exchanger 100, whereby the intermediate layer 104 completely separates the interface layer 102 from the manifold layer 106 to force the fluid to be channeled through the conduits 105. Alternatively, a portion of the heat exchanger 100 does not include the intermediate layer 104 between the manifold layer 106 and the interface layer 102, whereby fluid is free to flow therebetween. Further, the intermediate layer 104 alternatively extends vertically between the manifold layer 106 and the interface layer 102 to form separate, distinct intermediate layer regions. Alternatively, the intermediate layer 104 does not fully extend from the manifold layer 106 to interface layer 102.

Figure 10A:
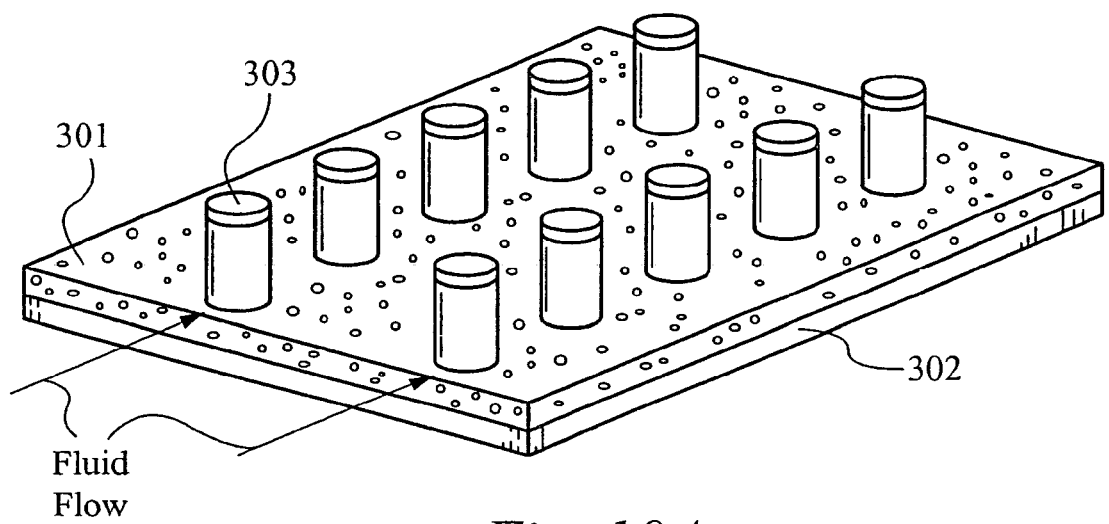
FIGS. 10A-10E illustrate a perspective view of the interface layer having different micro-pin arrays in accordance with the present invention.

FIG. 10A illustrates a perspective view of one embodiment of the interface layer 302 in accordance with the present invention. As shown in FIG. 10A, the interface layer 302 includes a series of pillars 303 which extend upwards from the bottom surface 301 of the interface layer 302. In addition, FIG. 10A illustrates a microporous structure 301 disposed on the bottom surface of the interface layer 302. It is apparent that the interface layer 302 can include only the microporous structure 301 as well as a combination of the microporous structure with any other interface layer feature (e.g. microchannels, pillars, etc.). More details regarding the microporous structure are discussed below.

As will be discussed in more detail below, the fluid travels down to the interface layer 302 via a series of inlet apertures, whereby the fluid then exits from the interface layer 302 via a series of outlet apertures which are spaced an optimal distance to the inlet apertures. In other words, the fluid travels away from each inlet aperture toward the closest outlet aperture. In one embodiment, each inlet aperture is surrounded by outlet apertures. Thus, fluid entering the interface layer 302 will flow in the direction toward the surrounding outlet apertures. Accordingly, the pillars 303 in the interface layer 302 accommodate sufficient heat transfer to the fluid as well as allow the fluid to experience the lease amount of pressure drop while flowing from the inlet apertures to the outlet apertures.

Figure 10B:
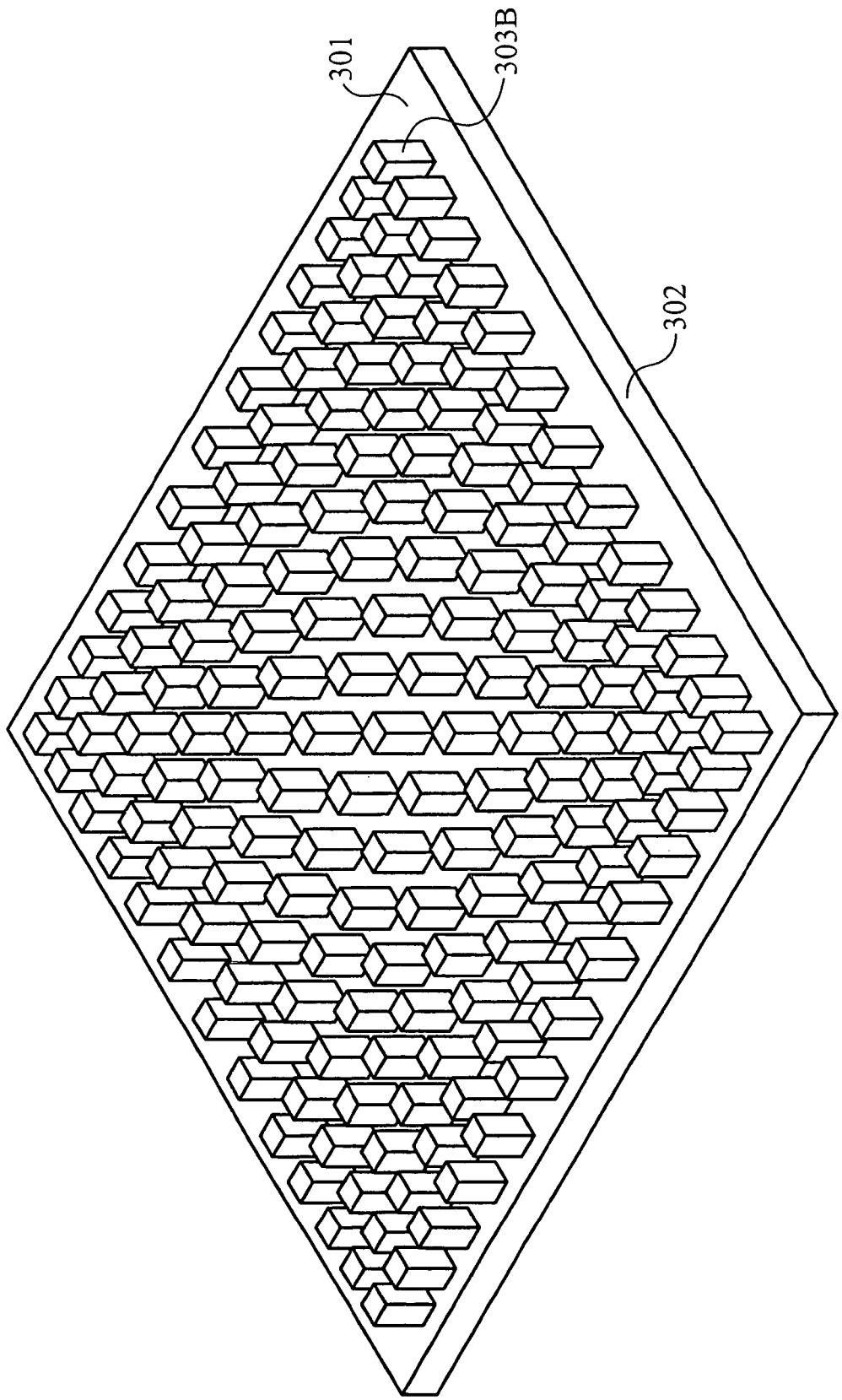

The interface layer 302 alternatively includes a dense array of tall, narrow pillars 303 which extend perpendicular from the bottom surface 301 are in contact with the bottom surface of the manifold layer. Alternatively, the pillars 303 are not in contact with the bottom surface of the manifold layer. In addition, at least one of the pillars 303 alternatively extend at an angle with respect to the bottom surface 301 of the interface layer 302. The pillars 303 are also equidistantly spaced from one another along the interface layer 302 such that the heat transfer capabilities of the interface layer 302 are uniform across its bottom surface 301. Alternatively, the pillars 303 are spaced apart non-equidistantly as shown in FIG. 10B, in which the pillars 303 in the middle of the interface layer 302 are spaced further apart than the pillars 303 at the edges. The pillars 303 are spaced apart depending on the dimensions of the heat source 99, and the flow resistance to the fluid as well as the size and locations of the hot spots and the heat flux density from the heat source 99. For instance, a lower density of pillars 303 will offer less resistance to the flow, but will also offer less surface area for heat transfer from the interface layer 302 to the fluid. It should be noted that the configuration of the non-periodically spaced pillars 303 shown in the embodiment in FIG. 10B are not limited thereto and are configured in any other arrangement depending on the conditions of the heat source as well as the desired operation of the cooling system 30 (FIG. 2A).

Figure 10C:
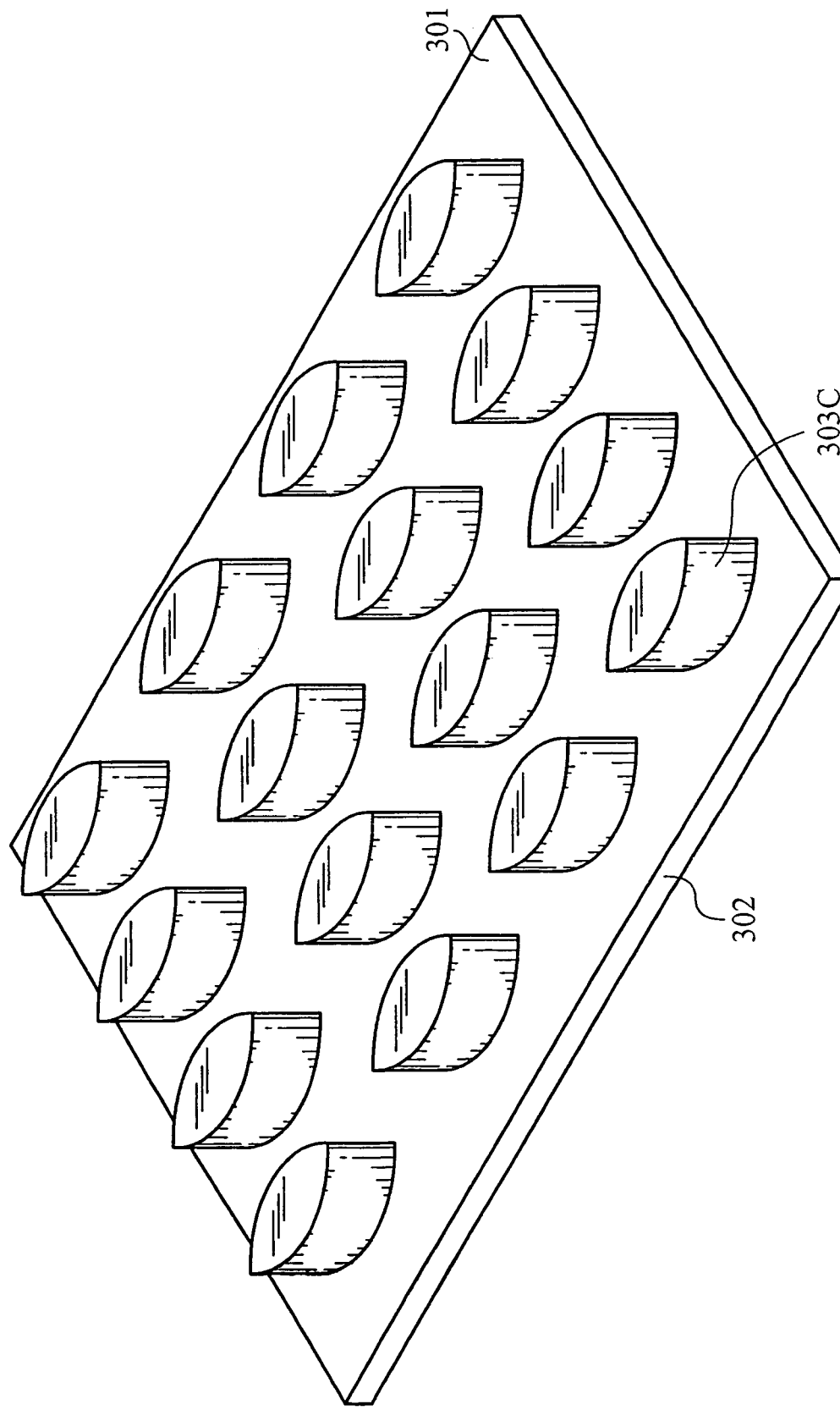
Figure 10D:
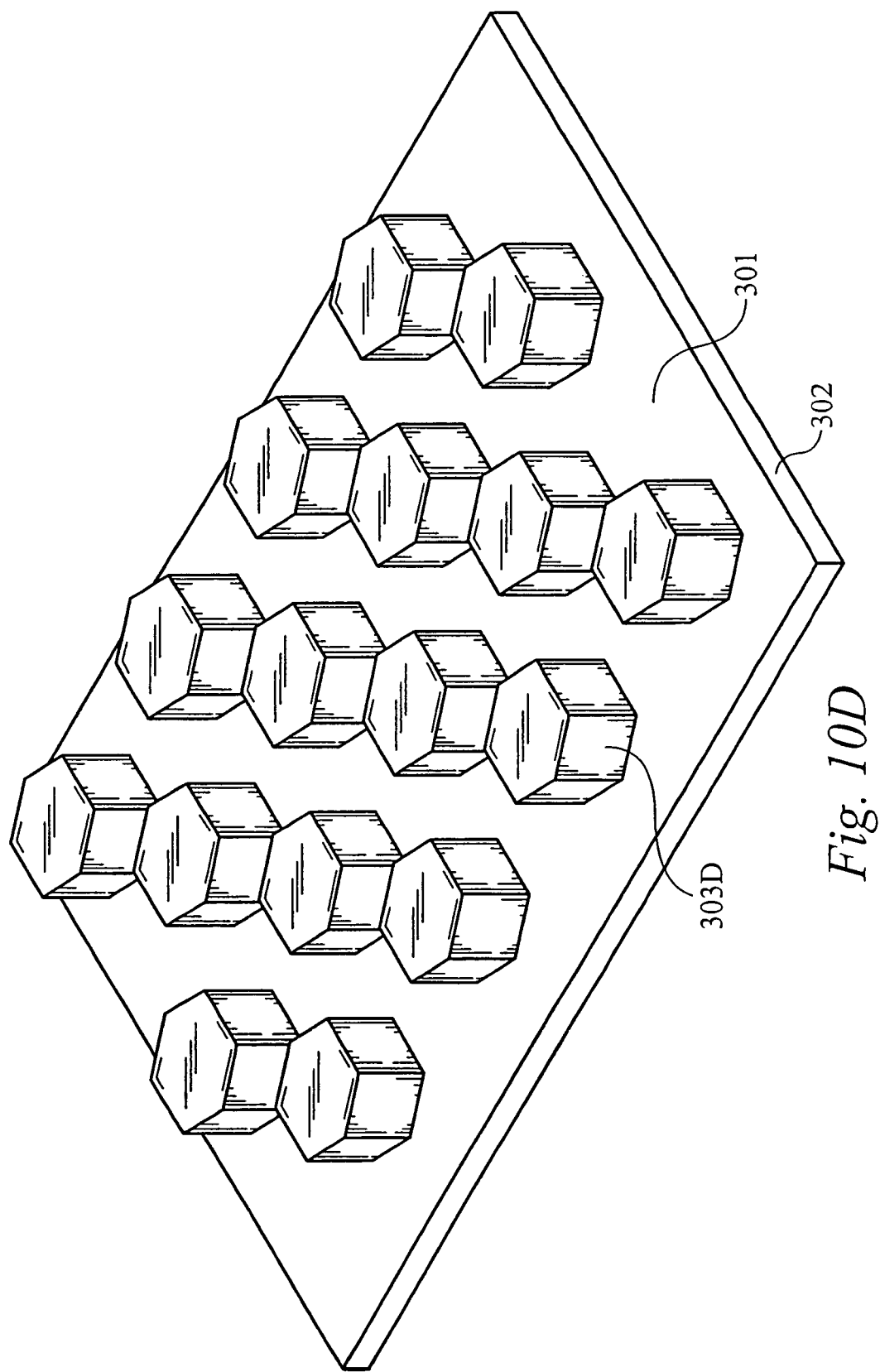

In addition, the pillars 303 are circular cylinders as shown in FIG. 10A to allow the fluid to flow from the inlet apertures to the outlet apertures with least amount of resistance. However, the pillars 303 alternatively have shapes including, but not limited to squared 303B (FIG. 10B), diamond, elliptical 303C (FIG. 10C), hexagonal 303D (FIG. 10D) or any other shape. In addition, the interface layer 302 alternatively has a combination of differently shaped pillars along the bottom surface 301.

Figure 10E:
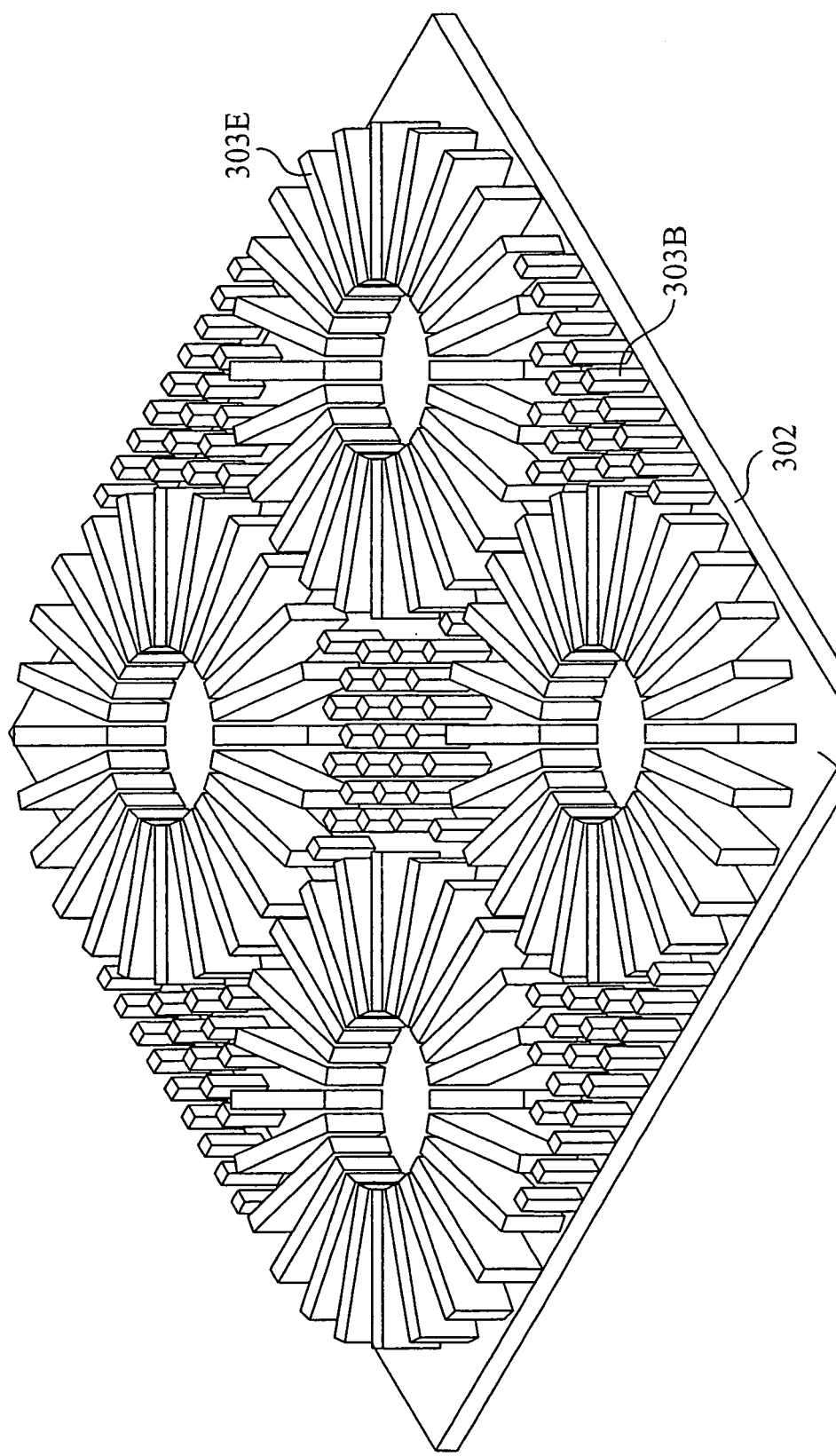

For instance, as shown in FIG. 10E, the interface layer 302 includes several sets of rectangular fins 303E which are radially disposed with respect to one another in their respective set. In addition, the interface layer 302 includes several pillars 303B disposed in between the sets of rectangular fins 303E. In one embodiment, the open circular areas within the radially arranged rectangular fins 303E are placed below each inlet aperture, whereby the fins 303E assist in guiding the flow to the outlet apertures. Thus, the radially distributed fins 303E assist in minimizing the pressure drop while allowing nearly uniform distribution of cooling fluid throughout the interface layer 302. Depending on the size and relative placement of the inlet and outlet apertures, there are many possible configurations of the pillars and/or fins, and the selection of the optimal arrangement of the interface layer 302 depends on whether the fluid undergoes single-phase flow or two-phase flow conditions. It is apparent to one skilled in the art that the various pin 303 configurations can be incorporated with any of the embodiments and variations thereof discussed herein.

Figure 12A:
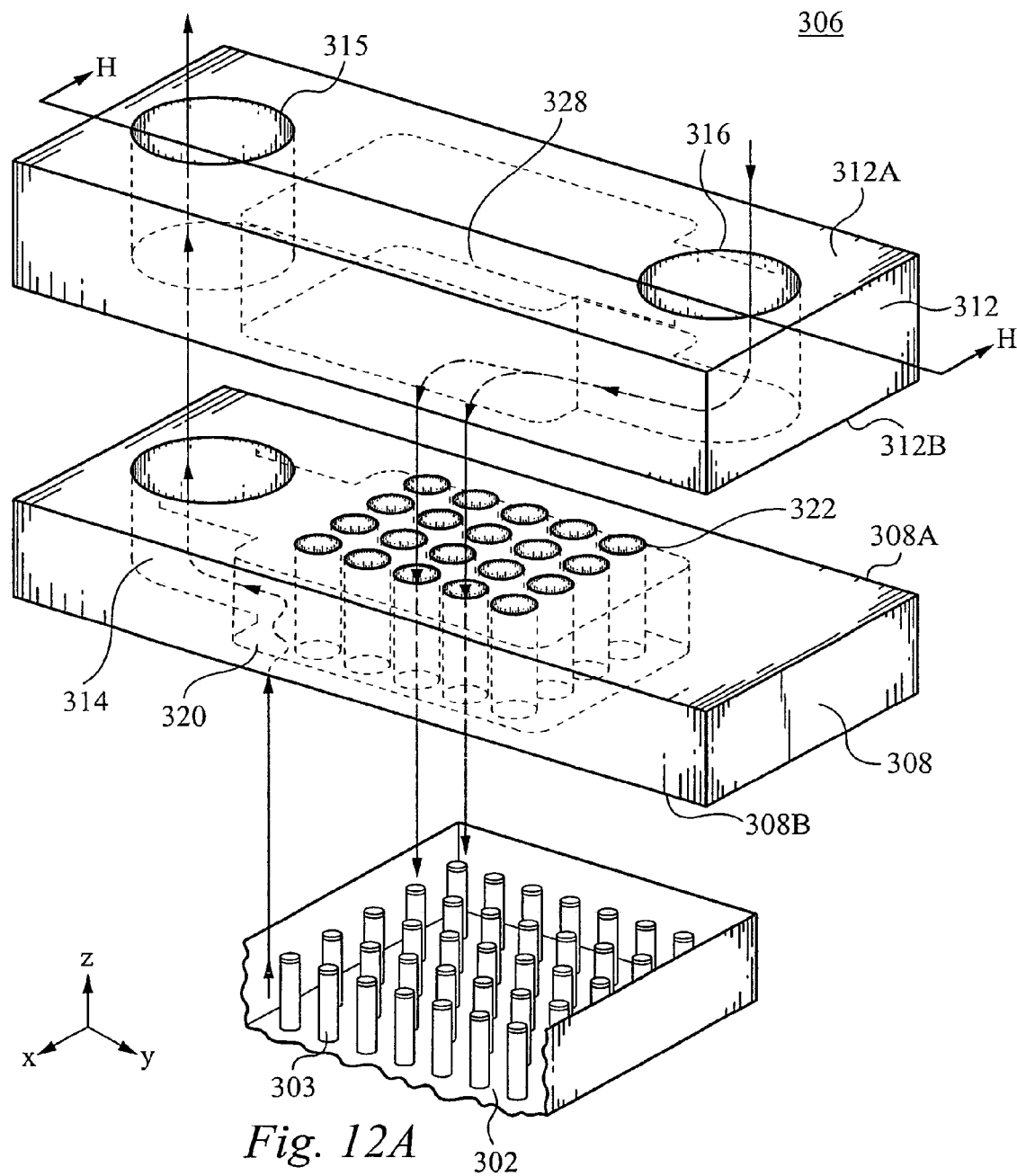
FIG. 12A illustrates an exploded view of an alternative heat exchanger in accordance with the present invention.

It is preferred that the heat exchanger 100 of the present invention is larger in width than the heat source 99. In the case where the heat exchanger 100 is larger than the heat source 99, an overhang dimension exists. The overhang dimension is the farthest distance between one outer wall of the heat source 99 and the interior fluid channel wall of the heat exchanger 100, such as the inner wall of the inlet port 316 (FIG. 12A). In the preferred embodiment, the overhang dimension is within the range of and including 0 to 5 millimeters for single phase and 0 to 15 millimeters for two phase fluid. In addition, the interface layer 302 of the present invention preferably has a thickness dimension within the range of and including 0.3 to 0.7 millimeters for single phase fluid and 0.3 to 1.0 millimeters for two phase fluid.

In the embodiment of the heat exchanger which utilizes a microporous structure 301 disposed upon the interface layer 302, the microporous structure 301 has an average pore size within the range of and including 10 to 200 microns for single phase as well as two phase fluid. In addition, the microporous structure 301 has a porosity within the range and including 50 to 80 percent for single phase as well as two phase fluid. The height of the microporous structure 301 is within the range of and including 0.25 to 2.00 millimeters for single phase as well as two phase fluid.

In the embodiment which utilizes pillars and/or microchannels along the interface layer 302, the interface layer 302 of the present invention has a thickness dimension in the range of and including 0.3 to 0.7 millimeters for single phase fluid and 0.3 to 1.0 millimeters for two phase fluid. In addition, the area of at least one pillar is in the range of and including (10 micron)$^2$ and (100 micron)$^2$ for single phase as well as two phase fluid. In addition, the area of the separation distance between at least two of the pillars and/or microchannels is in the range of and including 10 microns to 150 microns for single phase as well as two phase fluid. The width dimension of the microchannels are in the range of and including 10 to 100 microns for single phase as well as two phase fluid. The height dimension of the microchannels and/or pillars is within the range of and including 50 to 800 microns for single phase fluid and 50 microns to 2 millimeters for two phase fluid. It is contemplated by one skilled in the art that other dimension are alternatively contemplated.

FIG. 3B illustrates a perspective view of another embodiment of the interface layer 102 in accordance with the present invention. As shown in FIG. 3B, the interface layer 102 includes a bottom surface 103 and a plurality of microchannel walls 110, whereby the area in between the microchannel walls 110 channels or directs fluid along a fluid flow path. The bottom surface 103 is flat and has a high thermal conductivity to allow sufficient heat transfer from the heat source 99. Alternatively, the bottom surface 103 includes troughs and/or crests designed to collect or repel fluid from a particular location. The microchannel walls 110 are configured in a parallel configuration, as shown in FIG. 3B, whereby fluid flows between the microchannel walls 110 along a fluid path.

It is apparent to one skilled in the art that the microchannel walls 110 are alternatively configured in any other appropriate configuration depending on the factors discussed above. For instance, the interface layer 102 alternatively has grooves in between sections of microchannel walls 110, as shown in FIG. 8C. In addition, the microchannel walls 110 have dimensions which minimize the pressure drop or differential within the interface layer 102. It is also apparent that any other features, besides microchannel walls 110 are also contemplated, including, but not limited to roughed surfaces and a micro-porous structure, such as sintered metal and silicon foam. However, for exemplary purposes, the parallel microchannel walls 110 shown in FIG. 3B is used to describe the interface layer 102 in the present invention. Alternatively, the microchannel walls 110 have non-parallel configurations.

The microchannel walls 110 allow the fluid to undergo thermal exchange along the selected hot spot locations of the interface hot spot region to cool the heat source 99 in that location. The microchannel walls 110 have a width dimension within the range of 10-100 microns and a height dimension within the range of 50 microns to two millimeters, depending on the power of the heat source 99. The microchannel walls 110 have a length dimension which ranges between 100 microns and several centimeters, depending on the dimensions of the heat source, as well as the size of the hot spots and the heat flux density from the heat source. Alternatively, any other microchannel wall dimensions are contemplated. The microchannel walls 110 are spaced apart by a separation dimension range of 50-500 microns, depending on the power of the heat source 99, although any other separation dimension range is contemplated.

Referring back to the assembly in FIG. 3B, the top surface of the manifold layer 106 is cut away to illustrate the channels 116, 122 and fingers 118, 120 within the body of the manifold layer 106. The locations in the heat source 99 that produce more heat are hereby designated as hot spots, whereby the locations in the heat source 99 which produce less heat are hereby designated as warm spots. As shown in FIG. 3B, the heat source 99 is shown to have a hot spot region, namely at location A, and a warm spot region, namely at location B. The areas of the interface layer 102 which abut the hot and warm spots are accordingly designated interface hot spot regions. As shown in FIG. 3B, the interface layer 102 includes interface hot spot region A, which is positioned above location A and interface hot spot region B, which is positioned above location B.

As shown in FIGS. 3A and 3B, fluid initially enters the heat exchanger 100 through one inlet port 108. The fluid then flows to one inlet channel 116. Alternatively, the heat exchanger 100 includes more than one inlet channel 116. As shown in FIGS. 3A and 3B, fluid flowing along the inlet channel 116 from the inlet port 108 initially branches out to finger 118D. In addition, the fluid which continues along the rest of the inlet channel 116 flows to individual fingers 118B and 118C and so on.

In FIG. 3B, fluid is supplied to interface hot spot region A by flowing to the finger 118A, whereby fluid flows down through finger 118A to the intermediate layer 104. The fluid then flows through the inlet conduit 105A, positioned below the finger 118A, to the interface layer 102, whereby the fluid undergoes thermal exchange with the heat source 99. As described, the microchannels in the interface layer 102 are configurable in any direction. Thus, the microchannels 111 in interface region A are positioned perpendicular to the rest of the microchannels 110 in the interface layer 102. Thus, the fluid from conduit 105A travels along the microchannels 111 as shown in FIG. 3B, although the fluid travel in other directions along the remaining areas of the interface layer 102. The heated liquid then travels upward through the conduit 105B to the outlet finger 120A.

Similarly, fluid flows down in the Z-direction through fingers 118E and 118F to the intermediate layer 104. The fluid then flows through the inlet conduit 105C down in the Z-direction to the interface layer 102. The heated fluid then travels upward in the Z-direction from the interface layer 102 through the outlet conduit 105D to the outlet fingers 120E and 120F. The heat exchanger 100 removes the heated fluid in the manifold layer 106 via the outlet fingers 120, whereby the outlet fingers 120 are in communication with the outlet channel 122. The outlet channel 122 allows fluid to flow out of the heat exchanger through one outlet port 109.

In one embodiment, the inflow and outflow conduits 105 are also positioned directly or nearly directly above the appropriate interface hot spot regions to directly apply fluid to hot spots in the heat source 99. In addition, each outlet finger 120 is configured to be positioned closest to a respective inlet finger 118 for a particular interface hot spot region to minimize pressure drop therebetween. Thus, fluid enters the interface layer 102 via the inlet finger 118A and travels the least amount of distance along the bottom surface 103 of the interface layer 102 before it exits the interface layer 102 to the outlet finger 120A. It is apparent that the amount of distance which the fluid travels along the bottom surface 103 adequately removes heat generated from the heat source 99 without generating an unnecessary amount of pressure drop. In addition, as shown in FIGS. 3A and 3B, the corners in the fingers 118, 120 are curved to reduce pressure drop of the fluid flowing along the fingers 118.

It is apparent to one skilled in the art that the configuration of the manifold layer 106 shown in FIGS. 3A and 3B is only for exemplary purposes. The configuration of the channels 116 and fingers 118 in the manifold layer 106 depend on a number of factors, including but not limited to, the locations of the interface hot spot regions, amount of flow to and from the interface hot spot regions as well as the amount of heat produced by the heat source in the interface hot spot regions. For instance, one possible configuration of the manifold layer 106 includes an interdigitated pattern of parallel inlet and outlet fingers that are alternatively arranged along the width of the manifold layer, as shown in FIGS. 4-7A and discussed below. Nonetheless, any other configuration of channels 116 and fingers 118 is contemplated.

Figure 4:
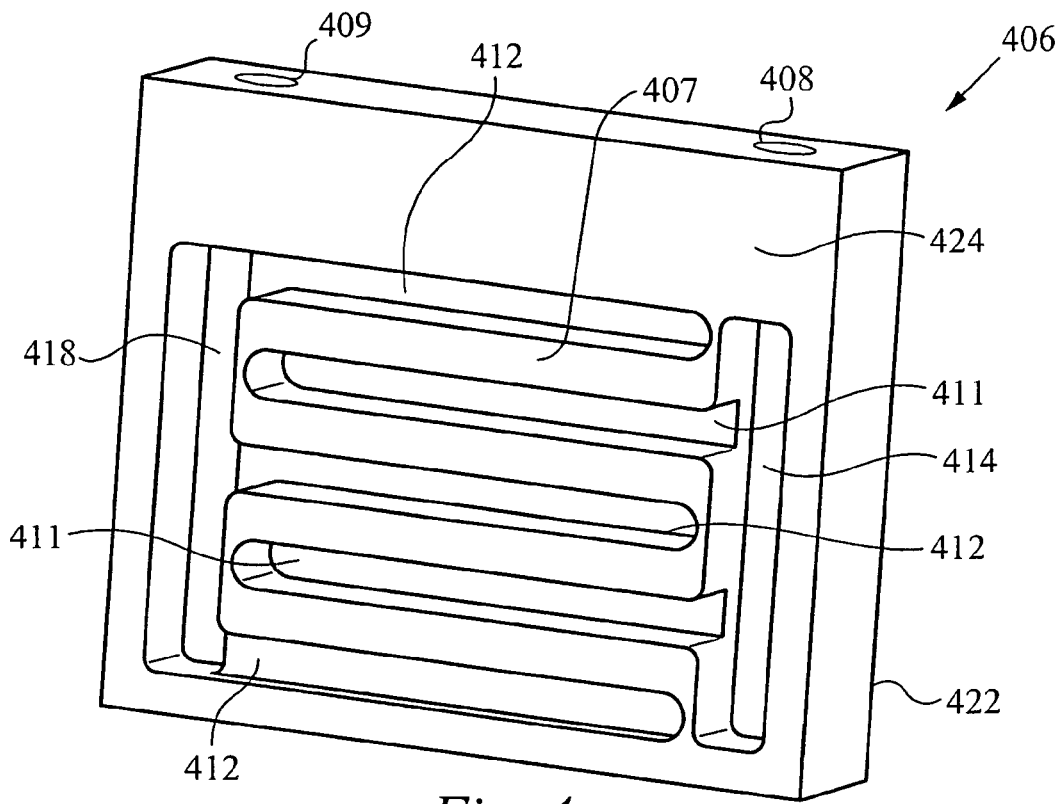
FIG. 4 illustrates a perspective view of the an interwoven manifold layer in accordance with the present invention.

FIG. 4 illustrates a perspective view of an alternative manifold layer 406 in accordance with the heat exchanger of the present invention. The manifold layer 406 in FIG. 4 includes a plurality of interwoven or inter-digitated parallel fluid fingers 411, 412 which allow one phase and/or two-phase fluid to circulate to the interface layer 402 without allowing a substantial pressure drop from occurring within the heat exchanger 400 and the system 30 (FIG. 2A). As shown in FIG. 8, the inlet fingers 411 are arranged alternately with the outlet fingers 412. However, it is contemplated by one skilled in the art that a certain number of inlet or outlet fingers can be arranged adjacent to one another and is thereby not limited to the alternating configuration shown in FIG. 4. In addition, the fingers are alternatively designed such that a parallel finger branches off from or is linked to another parallel finger. Thus, it is possible to have many more inlet fingers than outlet fingers and vice versa.

The inlet fingers or passages 411 supply the fluid entering the heat exchanger to the interface layer 402, and the outlet fingers or passages 412 remove the fluid from the interface layer 402 which then exits the heat exchanger 400. The shown configuration of the manifold layer 406 allows the fluid to enter the interface layer 402 and travel a very short distance in the interface layer 402 before it enters the outlet passage 412. The substantial decrease in the length that the fluid travels along the interface layer 402 substantially decreases the pressure drop in the heat exchanger 400 and the system 30 (FIG. 2A).

Figure 5:
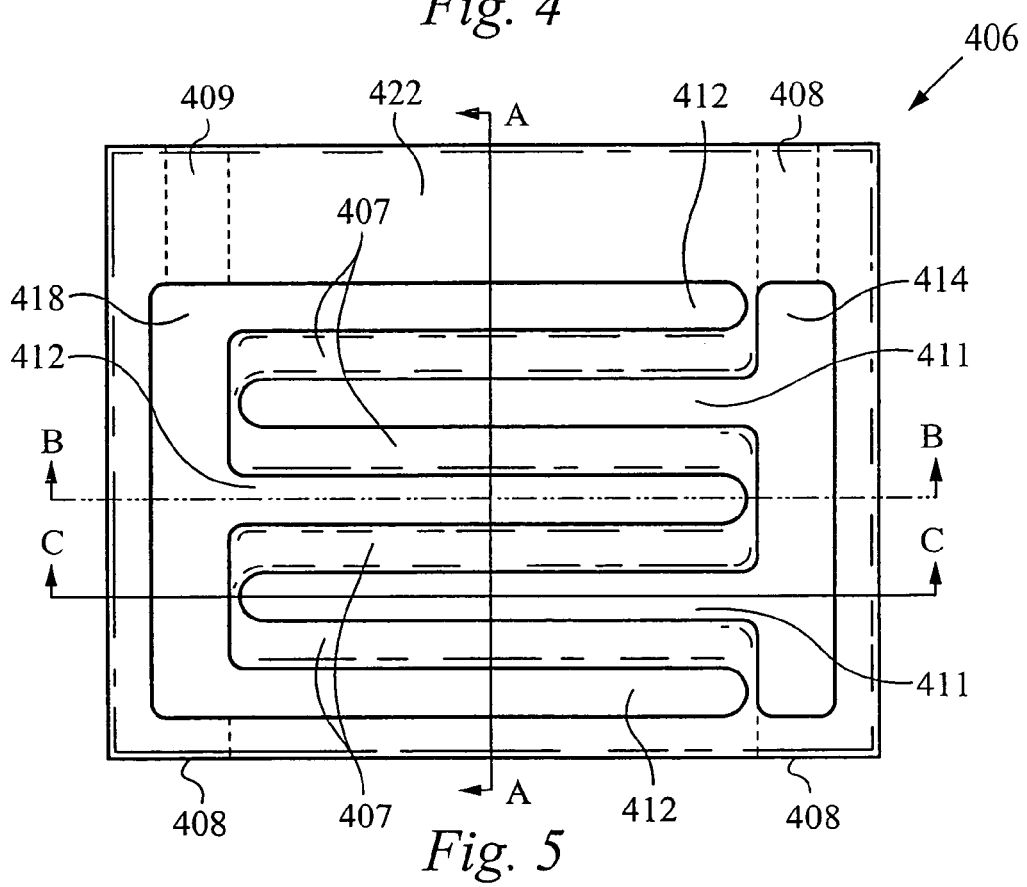
FIG. 5 illustrates a top view of the interwoven manifold layer with interface layer in accordance with the present invention.

As shown in FIGS. 4-5, the alternative manifold layer 406 includes a passage 414 which is in communication with two inlet passages 411 and provides fluid thereto. As shown in FIGS. 8-9 the manifold layer 406 includes three outlet passages 412 which are in communication with passage 418. The passages 414 in the manifold layer 406 have a flat bottom surface which channels the fluid to the fingers 411, 412. Alternatively, the passage 414 has a slight slope which aids in channeling the fluid to selected fluid passages 411. Alternatively, the inlet passage 414 includes one or more apertures in its bottom surface which allows a portion of the fluid to flow down to the interface layer 402. Similarly, the passage 418 in the manifold layer has a flat bottom surface which contains the fluid and channels the fluid to the port 408. Alternatively, the passage 418 has a slight slope which aids in channeling the fluid to selected outlet ports 408. In addition, the passages 414, 418 have a dimension width of approximately 2 millimeters, although any other width dimensions are alternatively contemplated.

The passages 414, 418 are in communication with ports 408, 409 whereby the ports are coupled to the fluid lines 38 in the system 30 (FIG. 2A). The manifold layer 406 includes horizontally configured fluid ports 408, 409. Alternatively, the manifold layer 406 includes vertically and/or diagonally configured fluid ports 408, 409, as discussed below, although not shown in FIG. 4-7. Alternatively, the manifold layer 406 does not include passage 414. Thus, fluid is directly supplied to the fingers 411 from the ports 408. Again, the manifold layer 411 alternatively does not include passage 418, whereby fluid in the fingers 412 directly flows out of the heat exchanger 400 through ports 408. It is apparent that although two ports 408 are shown in communication with the passages 414, 418, any other number of ports are alternatively utilized.

The inlet passages 411 have dimensions which allow fluid to travel to the interface layer without generating a large pressure drop along the passages 411 and the system 30 (FIG. 2A). The inlet passages 411 have a width dimension in the range of and including 0.25-5.00 millimeters, although any other width dimensions are alternatively contemplated. In addition, the inlet passages 411 have a length dimension in the range of and including 0.5 millimeters to three times the length of the heat source. Alternatively, other length dimensions are contemplated. In addition, as stated above, the inlet passages 411 extend down to or slightly above the height of the microchannels 410 such that the fluid is channeled directly to the microchannels 410. The inlet passages 411 have a height dimension in the range of and including 0.25-5.00 millimeters. It is apparent to one skilled in the art that the passages 411 do not extend down to the microchannels 410 and that any other height dimensions are alternatively contemplated. It is apparent to one skilled in the art that although the inlet passages 411 have the same dimensions, it is contemplated that the inlet passages 411 alternatively have different dimensions. In addition, the inlet passages 411 alternatively have varying widths, cross sectional dimensions and/or distances between adjacent fingers. In particular, the passage 411 has areas with a larger width or depths as well as areas with narrower widths and depths along its length. The varied dimensions allow more fluid to be delivered to predetermined interface hot spot regions in the interface layer 402 through wider portions while restricting flow to warm spot interface hot spot regions through the narrow portions.

In addition, the outlet passages 412 have dimensions which allow fluid to travel to the interface layer without generating a large pressure drop along the passages 412 as well as the system 30 (FIG. 2A). The outlet passages 412 have a width dimension in the range of and including 0.25-5.00 millimeters, although any other width dimensions are alternatively contemplated. In addition, the outlet passages 412 have a length dimension in the range of and including 0.5 millimeters to three times the length of the heat source. In addition, the outlet passages 412 extend down to the height of the microchannels 410 such that the fluid easily flows upward in the outlet passages 412 after horizontally flowing along the microchannels 410. The inlet passages 411 have a height dimension in the range of and including 0.25-5.00 millimeters, although any other height dimensions are alternatively contemplated. It is apparent to one skilled in the art that although outlet passages 412 have the same dimensions, it is contemplated that the outlet passages 412 alternatively have different dimensions. Again, the inlet passage 412 alternatively have varying widths, cross sectional dimensions and/or distances between adjacent fingers.

The inlet and outlet passages 411, 412 are segmented and distinct from one another, as shown in FIGS. 4 and 5, whereby fluid among the passages do not mix together. In particular, as shown in FIG. 8, two outlet passages are located along the outside edges of the manifold layer 406, and one outlet passage 412 is located in the middle of the manifold layer 406. In addition, two inlet passages 411 are configured on adjacent sides of the middle outlet passage 412. This particular configuration causes fluid entering the interface layer 402 to travel a short distance in the interface layer 402 before it flows out of the interface layer 402 through the outlet passage 412. However, it is apparent to one skilled in the art that the inlet passages and outlet passages are positioned in any other appropriate configuration and is thereby not limited to the configuration shown and described in the present disclosure. The number of inlet and outlet fingers 411, 412 are more than three within the manifold layer 406 but less than 10 per centimeter across the manifold layer 406. It is also apparent to one skilled in the art that any other number of inlet passages and outlet passages are used and thereby is not limited to the number shown and described in the present disclosure.

Figure 6A:
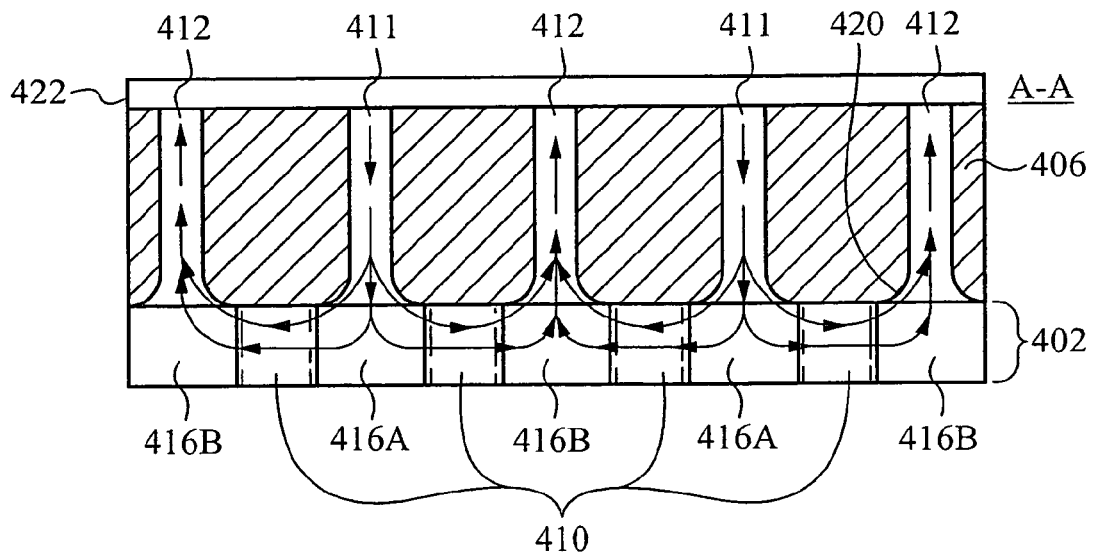
FIG. 6A illustrates a cross-sectional view of the interwoven manifold layer with interface layer of the present invention along lines A-A.
Figure 6B:
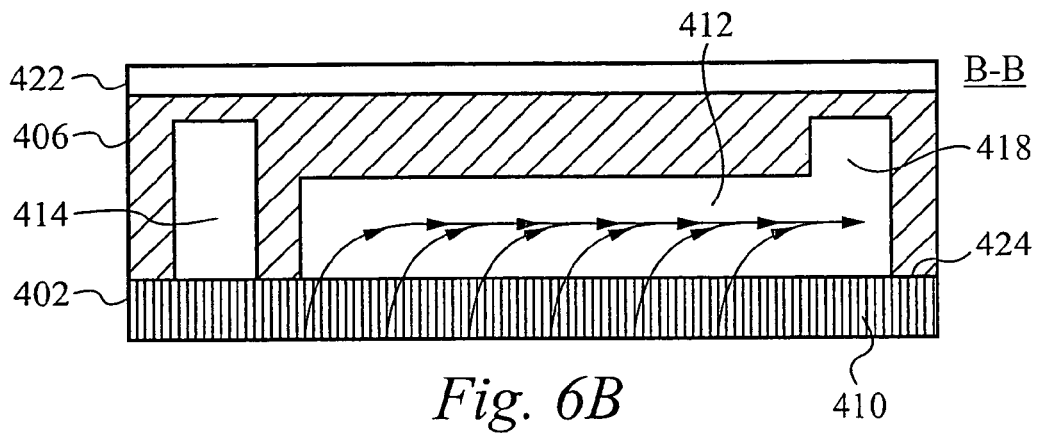
FIG. 6B illustrates a cross-sectional view of the interwoven manifold layer with interface layer of the present invention along lines B-B.
Figure 6C:
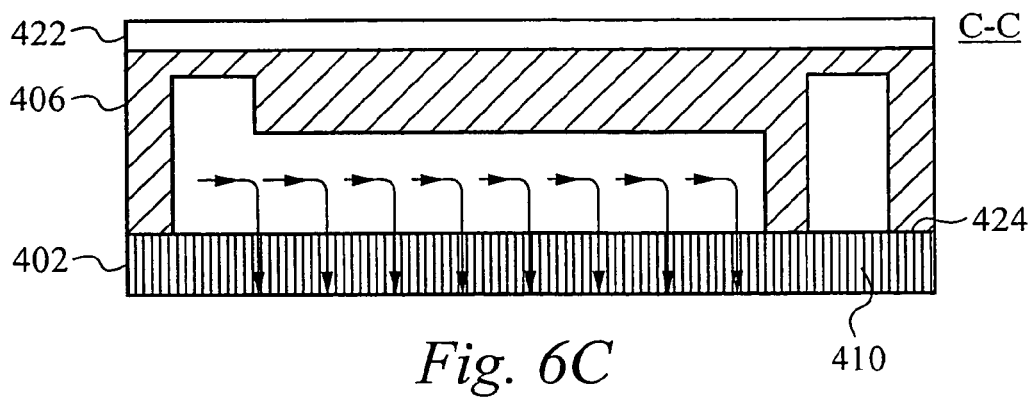
FIG. 6C illustrates a cross-sectional view of the interwoven manifold layer with interface layer of the present invention along lines C-C.
Figure 7A:
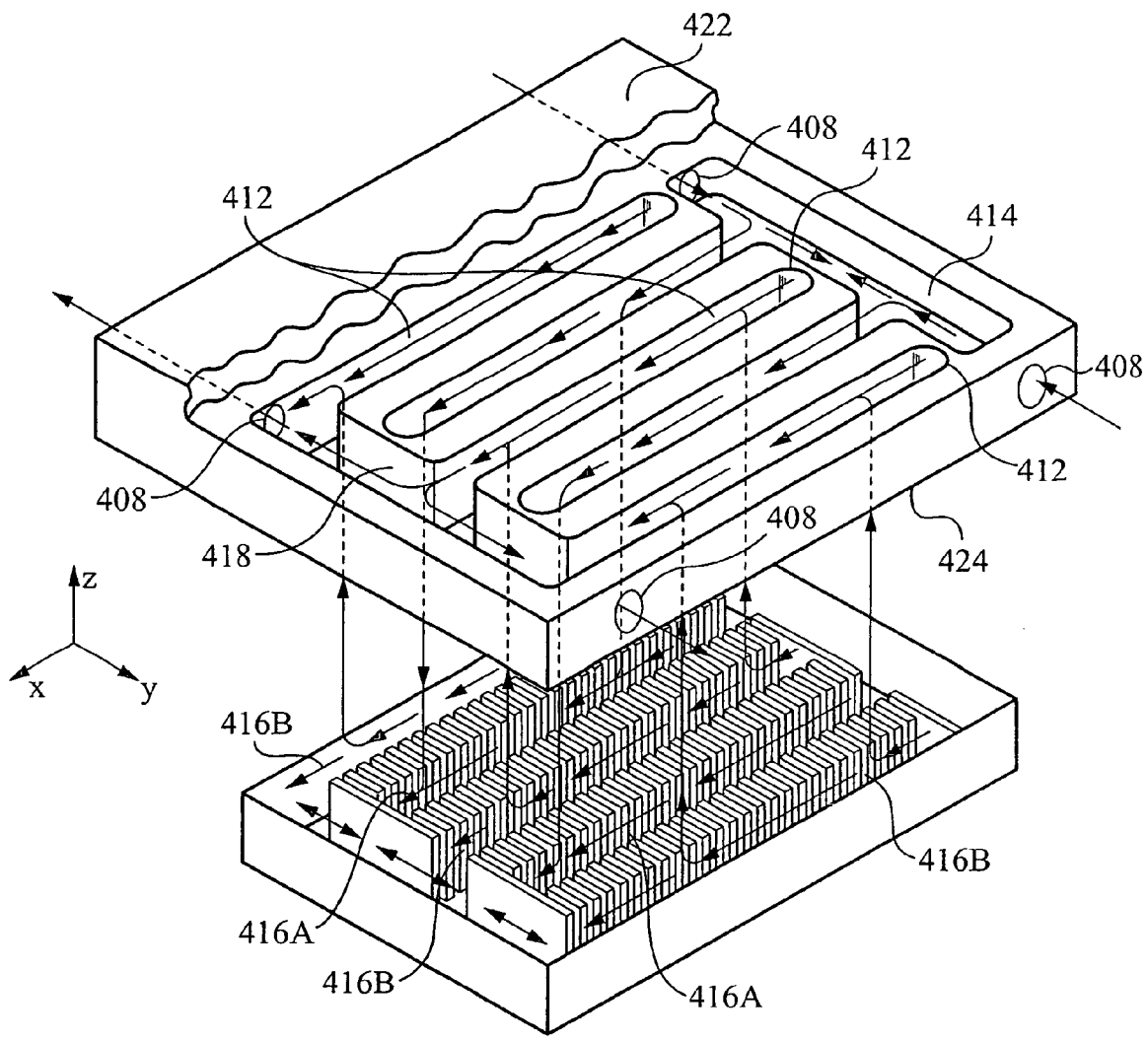
FIG. 7A illustrates an exploded view of the interwoven manifold layer with interface layer of the present invention.

The manifold layer 406 is coupled to the intermediate layer (not shown), whereby the intermediate layer (not shown) is coupled to the interface layer 402 to form a three-tier heat exchanger 400. The intermediate layer discussed herein is referred to above in the embodiment shown in FIG. 3B. The manifold layer 406 is alternatively coupled to the interface layer 402 and positioned above the interface layer 402 to form a two-tier heat exchanger 400, as shown in FIG. 7A. FIGS. 6A-6C illustrate cross-sectional schematics of the alternative manifold layer 406 coupled to the interface layer 402 in the two tier heat exchanger. Specifically, FIG. 6A illustrates the cross section of the heat exchanger 400 along line A-A in FIG. 5. In addition, FIG. 6B illustrates the cross section of the heat exchanger 400 along line B-B and FIG. 6C illustrates the cross section of the heat exchanger 400 along line C-C in FIG. 5. As stated above, the inlet and outlet passages 411, 412 extend from the top surface to the bottom surface of the manifold layer 406. When the manifold layer 406 and the interface layer 402 are coupled to one another, the inlet and outlet passages 411, 412 are at or slightly above the height of the microchannels 410 in the interface layer 402. This configuration causes the fluid from the inlet passages 411 to easily flow from the passages 411 through the microchannels 410. In addition, this configuration causes fluid flowing through the microchannels to easily flow upward through the outlet passages 412 after flowing through the microchannels 410.

In the alternative embodiment, the intermediate layer 104 (FIG. 3B) is positioned between the manifold layer 406 and the interface layer 402, although not shown in the figures. The intermediate layer 104 (FIG. 3B) channels fluid flow to designated interface hot spot regions in the interface layer 402. In addition, the intermediate layer 104 (FIG. 3B) can be utilized to provide a uniform flow of fluid entering the interface layer 402. Also, the intermediate layer 104 is utilized to provide fluid to interface hot spot regions in the interface layer 402 to adequately cool hot spots and create temperature uniformity in the heat source 99. The inlet and outlet passages 411, 412 are positioned near or above hot spots in the heat source 99 to adequately cool the hot spots, although it is not necessary.

FIG. 7A illustrates an exploded view of the alternate manifold layer 406 with the an alternative interface layer 102 of the present invention. The interface layer 102 includes continuous arrangements of microchannel walls 110, as shown in FIG. 3B. In general operation, similar to the manifold layer 106 shown in FIG. 3B, fluid enters the manifold layer 406 at fluid port 408 and travels through the passage 414 and towards the fluid fingers or passages 411. The fluid enters the opening of the inlet fingers 411 and flows the length of the fingers 411 in the X-direction, as shown by the arrows. In addition, the fluid flows downward in the Z direction to the interface layer 402 which is positioned below to the manifold layer 406. As shown in FIG. 7A, the fluid in the interface layer 402 traverses along the bottom surface in the X and Y directions of the interface layer 402 and performs thermal exchange with the heat source 99. The heated fluid exits the interface layer 402 by flowing upward in the Z-direction via the outlet fingers 412, whereby the outlet fingers 412 channel the heated fluid to the passage 418 in the manifold layer 406 in the X-direction. The fluid then flows along the passage 418 and exits the heat exchanger by flowing out through the port 409.

The interface layer, as shown in FIG. 7A, includes a series of grooves 416 disposed in between sets of microchannels 410 which aid in channeling fluid to and from the passages 411, 412. In particular, the grooves 416A are located directly beneath the inlet passages 411 of the alternate manifold layer 406, whereby fluid entering the interface layer 402 via the inlet passages 411 is directly channeled to the microchannels adjacent to the groove 416A. Thus, the grooves 416A allow fluid to be directly channeled into specific designated flow paths from the inlet passages 411, as shown in FIG. 5. Similarly, the interface layer 402 includes grooves 416B which are located directly beneath the outlet passages 412 in the Z-direction. Thus, fluid flowing horizontally along the microchannels 410 toward the outlet passages are channeled horizontally to the grooves 416B and vertically to the outlet passage 412 above the grooves 416B.

FIG. 6A illustrates the cross section of the heat exchanger 400 with manifold layer 406 and interface layer 402. In particular, FIG. 6A shows the inlet passages 411 interwoven with the outlet passages 412, whereby fluid flows down the inlet passages 411 and up the outlet passages 412. In addition, as shown in FIG. 6A, the fluid flows horizontally through the microchannel walls 410 which are disposed between the inlet passages and outlet passages and separated by the grooves 416A, 416B. Alternatively, the microchannel walls are continuous (FIG. 3B) and are not separated by the microchannels 410. As shown in FIG. 6A, either or both of the inlet and outlet passages 411, 412 have a curved surface 420 at their ends at the location near the grooves 416. The curved surface 420 directs fluid flowing down the passage 411 towards the microchannels 410 which are located adjacent to the passage 411. Thus, fluid entering the interface layer 102 is more easily directed toward the microchannels 410 instead of flowing directly to the groove 416A. Similarly, the curved surface 420 in the outlet passages 412 assists in directing fluid from the microchannels 410 to the outer passage 412.

Figure 7B:
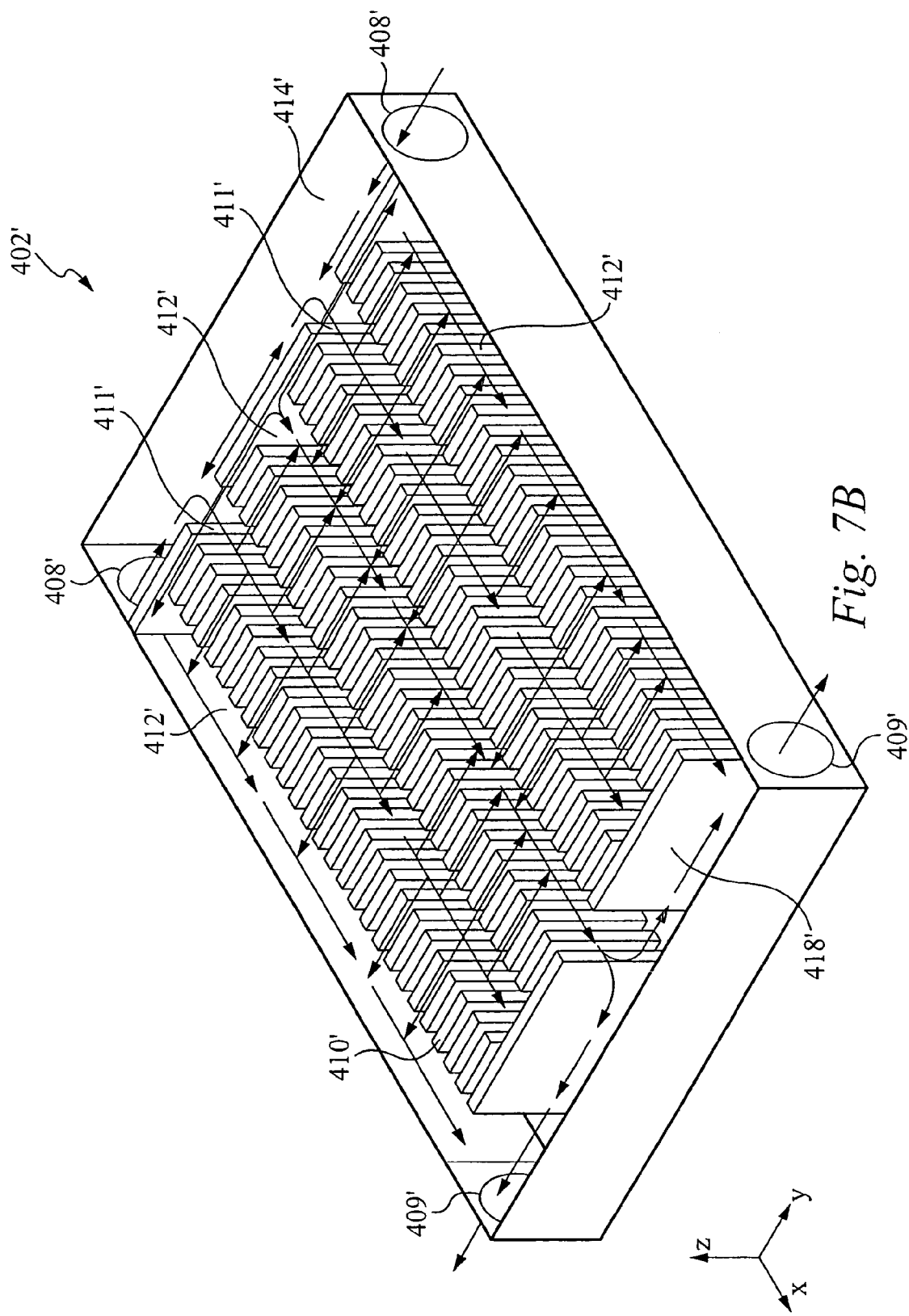
FIG. 7B illustrates a perspective view of an alternative embodiment of the interface layer.

In an alternative embodiment, as shown in FIG. 7B, the interface layer 402' includes the inlet passages 411' and outlet passages 412' discussed above with respect to the manifold layer 406 (FIGS. 8-9). In the alternative embodiment, the fluid is supplied directly to the interface layer 402' from the port 408'. The fluid flows along the passage 414' towards the inlet passages 411'. The fluid then traverses laterally along the sets of microchannels 410' and undergoes heat exchange with the heat source (not shown) and flows to the outlet passages 412'. The fluid then flows along the outlet passages 412' to passage 418', whereby the fluid exits the interface layer 402' by via the port 409'. The ports 408', 409' are configured in the interface layer 402' and are alternatively configured in the manifold layer 406 (FIG. 7A).

It is apparent to one skilled in the art that although all of the heat exchangers in the present application are shown to operate horizontally, the heat exchanger alternatively operates in a vertical position. While operating in the vertical position, the heat exchangers are alternatively configured such that each inlet passage is located above an adjacent outlet passage. Therefore, fluid enters the interface layer through the inlet passages and is naturally channeled to an outlet passage. It is also apparent that any other configuration of the manifold layer and interface layer is alternatively used to allow the heat exchanger to operate in a vertical position.

FIGS. 5A-8C illustrate top view diagrams of another alternate embodiment of the heat exchanger in accordance with the present invention. In particular, FIG. 8A illustrates a top view diagram of an alternate manifold layer 206 in accordance with the present invention. FIGS. 8B and 8C illustrate a top view of an intermediate layer 204 and interface layer 202. In addition, FIG. 9A illustrates a three tier neat exchanger utilizing the alternate manifold layer 206, whereas FIG. 9B illustrates a two-tier heat exchanger utilizing the alternate manifold layer 206.

Figure 8A:
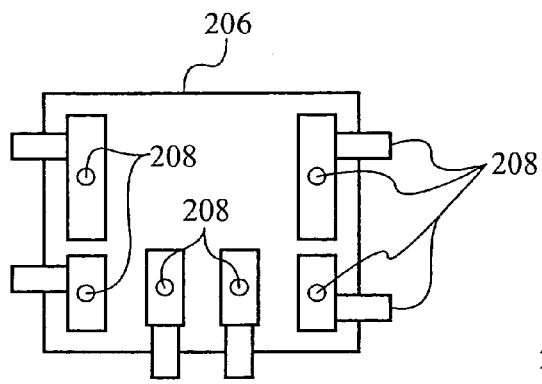
FIG. 8A illustrates a top view diagram of an alternate manifold layer in accordance with the present invention.
Figure 8B:
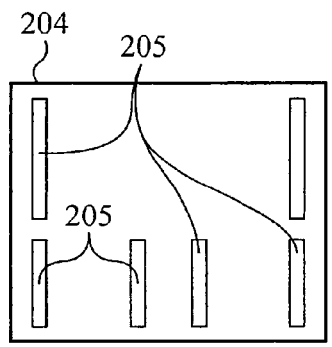
FIG. 8B illustrates a top view diagram of the interface layer in accordance with the present invention.
Figure 8C:
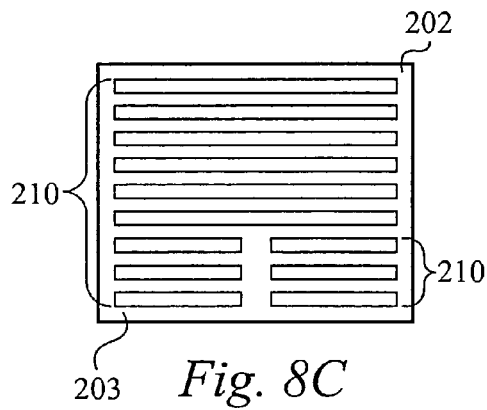
FIG. 8C illustrates a top view diagram of the interface layer in accordance with the present invention.
Figure 9A:
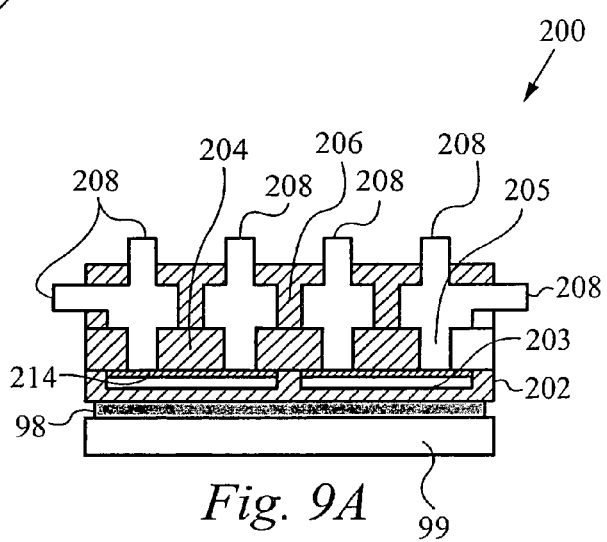
FIG. 9A illustrates a side view diagram of the alternative embodiment of the three tier heat exchanger in accordance with the present invention.
Figure 9B:
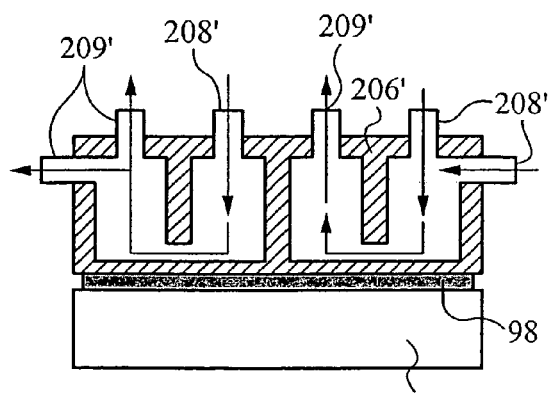
FIG. 9B illustrates a side view diagram of the alternative embodiment of the two tier heat exchanger in accordance with the present invention.

As shown in FIGS. 8A and 9A, the manifold layer 206 includes a plurality of fluid ports 208 configured horizontally and vertically. Alternatively, the fluid ports 208 are positioned diagonally or in any other direction with respect to the manifold layer 206. The fluid ports 208 are placed in selected locations in the manifold layer 206 to effectively deliver fluid to the predetermined interface hot spot regions in the heat exchanger 200. The multiple fluid ports 208 provide a significant advantage, because fluid can be directly delivered from a fluid port to a particular interface hot spot region without significantly adding to the pressure drop to the heat exchanger 200. In addition, the fluid ports 208 are also positioned in the manifold layer 206 to allow fluid in the interface hot spot regions to travel the least amount of distance to the exit port 208 such that the fluid achieves temperature uniformity while maintaining a minimal pressure drop between the inlet and outlet ports 208. Additionally, the use of the manifold layer 206 aids in stabilizing two phase flow within the heat exchanger 200 while evenly distributing uniform flow across the interface layer 202. It should be noted that more than one manifold layer 206 is alternatively included in the heat exchanger 200, whereby one manifold layer 206 routes the fluid into and out-of the heat exchanger 200 and another manifold layer (not shown) controls the rate of fluid circulation to the heat exchanger 200. Alternatively, all of the plurality of manifold layers 206 circulate fluid to selected corresponding interface hot spot regions in the interface layer 202.

The alternate manifold layer 206 has lateral dimensions which closely match the dimensions of the interface layer 202. In addition, the manifold layer 206 has the same dimensions of the heat source 99. Alternatively, the manifold layer 206 is larger than the heat source 99. The vertical dimensions of the manifold layer 206 are within the range of 0.1 and 10 millimeters. In addition, the apertures in the manifold layer 206 which receive the fluid ports 208 are within the range between 1 millimeter and the entire width or length of the heat source 99.

Figure 11:
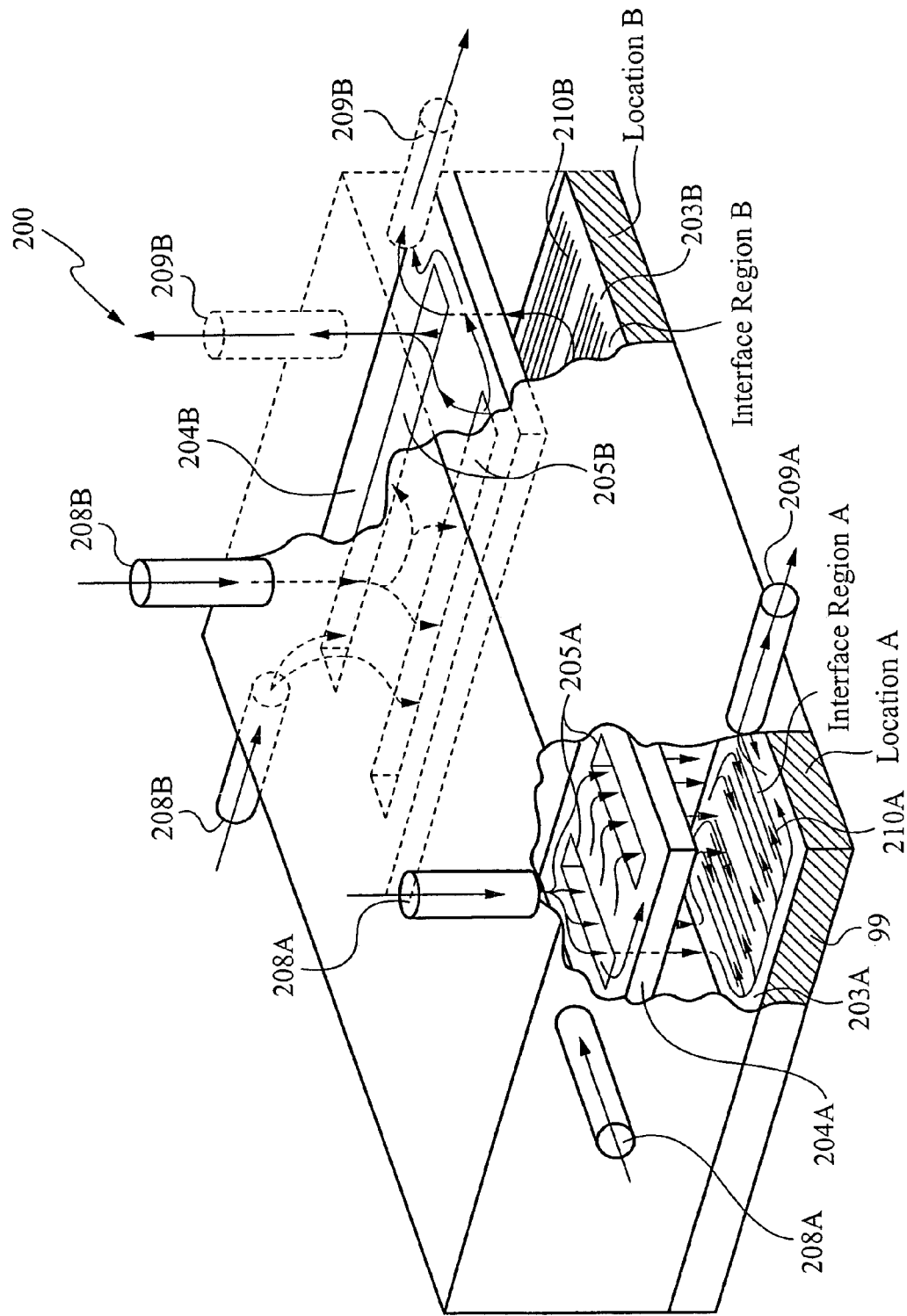
FIG. 11 illustrates a cut-away perspective view diagram of the alternate heat exchanger in accordance with the present invention.

FIG. 11 illustrates a broken-perspective view of a three tier heat exchanger 200 having the alternate manifold layer 200 in accordance with the present invention. As shown in FIG. 11, the heat exchanger 200 is divided into separate regions dependent on the amount of heat produced along the body of the heat source 99. The divided regions are separated by the vertical intermediate layer 204 and/or microchannel wall features 210 in the interface layer 202. However, it is apparent to one skilled in the art that the assembly shown in FIG. 11 is not limited to the configuration shown and is for exemplary purposes. The heat exchanger 200 is coupled to one or more pumps, whereby by one pump is coupled to the inlets 208A and another pump is coupled to the inlet 208B.

As shown in FIG. 3, the heat source 99 has a hot spot in location A and a warm spot, location B, whereby the hot spot in location A produces more heat than the warm spot in location B. It is apparent that the heat source 99 alternatively has more than one hot spot and warm spot at any location at any given time. In the example, since location A is a hot spot and more heat in location A transfers to the interface layer 202 above location A (designated in FIG. 11 as interface hot spot region A), more fluid and/or a higher rate of liquid flow is provided to interface hot spot region A in the heat exchanger 200 to adequately cool location A. It is apparent that although interface hot spot region B is shown to be larger than interface hot spot region A, interface hot spot regions A and B, as well as any other interface hot spot regions in the heat exchanger 200, can be any size and/or configuration with respect to one another.

Alternatively, as shown in FIG. 11, the fluid enters the heat exchanger via fluid ports 208A is directed to interface hot spot region A by flowing along the intermediate layer 204 to the inflow conduits 205A. The fluid then flows down the inflow conduits 205A in the Z-direction into interface hot spot region A of the interface layer 202. The fluid flows in between the microchannels 210A whereby heat from location A transfers to the fluid by conduction through the interface layer 202. The heated fluid flows along the interface layer 202 in interface hot spot region A toward exit port 209A where the fluid exits the heat exchanger 200. It is apparent to one skilled in the art that any number of inlet ports 208 and exit ports 209 are utilized for a particular interface hot spot region or a set of interface hot spot regions. In addition, although the exit port 209A is shown near the interface layer 202A, the exit port 209A is alternatively positioned in any other location vertically, including but not limited to the manifold layer 209B.

Similarly, in the example shown in FIG. 11, the heat source 99 has a warm spot in location B which produces less heat than location A of the heat source 99. Fluid entering through the port 208B is directed to interface hot spot region B by flowing along the intermediate layer 204B to the inflow conduits 205B. The fluid then flows down the inflow conduits 205B in the Z-direction into interface hot spot region B of the interface layer 202. The fluid flows in between the microchannels 210 in the X and Y directions, whereby heat generated by the heat source in location B is transferred into the fluid. The heated fluid flows along the entire interface layer 202B in interface hot spot region B upward to exit ports 209B in the Z-direction via the outflow conduits 205B in the intermediate layer 204 whereby the fluid exits the heat exchanger 200.

Alternatively, as shown in FIG. 9A, the heat exchanger 200 alternatively includes a vapor permeable membrane 214 positioned above the interface layer 202. The vapor permeable membrane 214 is in sealable contact with the inner side walls of the heat exchanger 200. The membrane is configured to have several small apertures which allow vapor produced along the interface layer 202 to pass therethrough to the port 209. The membrane 214 is also configured to be hydrophobic to prevent liquid fluid flowing along the interface layer 202 from passing through the apertures of the membrane 214. More details of the vapor permeable membrane 114 is discussed in co-pending U.S. application Ser. No. 10/366,128, filed Feb. 12, 2003 and entitled, "VAPOR ESCAPE MICROCHANNEL HEAT EXCHANGER" which is hereby incorporated by reference.

Figure 12B:
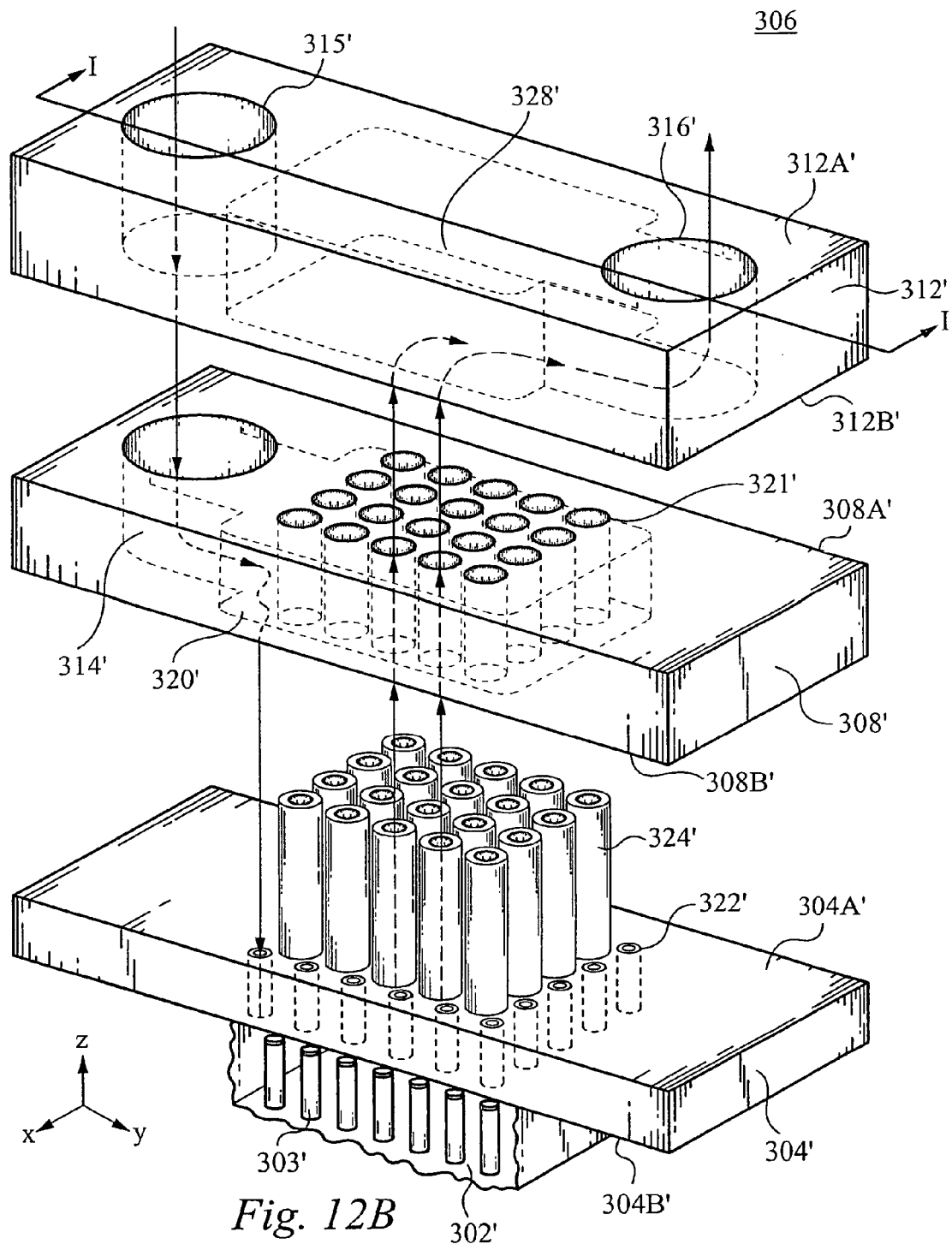
FIG. 12B illustrates an exploded view of an alternative heat exchanger in accordance with the present invention.

FIG. 12A illustrates an exploded view of an alternative heat exchanger 300 in accordance with the present invention. FIG. 12B illustrates an exploded view of an alternative heat exchanger 300' in accordance with the present invention. As shown in FIGS. 12A and 12B, the heat exchanger 300, 300' includes the interface layer 302, 302' and the manifold layer 306, 306' coupled thereto. As stated above, the heat exchanger 300, 300' is coupled to the heat source (not shown) or alternatively fully integrated within the heat source (e.g. embedded in a microprocessor). It is apparent to one skilled in the art that the interface layer 302, 302' is substantially enclosed, and is only shown exposed in FIG. 12A for exemplary purposes only. In one embodiment, the interface layer 302, 302' includes a plurality of pillars 303 disposed along the bottom surface 301. In addition, the pillars 303 alternatively has any shape, as discussed in relation to FIGS. 10A-10E and/or radially distributed fins 303E. Again, the interface layer 302 alternatively has any other features as discussed above (e.g.

microchannels, roughened surfaces). The interface layer 302 as well as the features within the layer 302 also has the same thermal conductivity characteristics as discussed above. Although the interface layer 302 is shown as smaller compared to the manifold layer 306, it is apparent to one skilled in the art that the interface layer 302 and manifold layer 306 can be any other size with respect to each other and the heat source 99. The remaining features of the interface layer 302, 302' has the same characteristics as the interface layers described above and will not be discussed in any more detail.

Generally, the heat exchanger 300 minimizes the pressure drop within the heat exchanger using the delivery channels 322 in the manifold layer 306. The delivery channels 322 are vertically positioned within the manifold layer 306 and vertically provide fluid to the interface layer 302 to reduce the pressure drop in the heat exchanger 300. As stated above, pressure drop is created or increased in the heat exchanger 300 due to fluid flowing along the interface layer in the X and Y directions for a substantial amount of time and/or distance. The manifold layer 306 minimizes the flow in the X and Y directions by vertically forcing the fluid onto the interface layer 302 by the several delivery channels 322. In other words, several individual jets of fluid are applied directly onto the interface layer 302 from above. The delivery channels 322 are positioned an optimal distance from one another to allow fluid to flow minimally in the X and Y directions and vertically upward out of the interface layer 302. Therefore, the force of individual fluid paths from the optimally positioned channels 322 naturally cause the fluid to flow in an upward fluid path away from the interface layer 302. In addition, the individual channels 322 maximize the division of fluid flow among the several channels 322 in the interface layer 302, thereby reducing the pressure drop in the heat exchanger 300 while effectively cooling the heat source 99. In addition, the configuration of the heat exchanger 300 allows the heat exchanger 300 to be smaller in size than other heat exchangers, because fluid does not need to travel a large amount of distance in the lateral X and Y directions to adequately cool the heat source 99.

The manifold layer 306 shown in FIG. 12A includes two individual levels. In particular, the manifold layer 306 includes a level 308 and a level 312. The level 308 is coupled to the interface layer 302 and the level 312. Although FIG. 12A illustrates that the level 312 is positioned above the level 308, it is contemplated by one skilled in the art that the level 308 is alternatively positioned above the level 312. It is also apparent to one skilled in the art that any number of levels are alternatively implemented in accordance with the present invention.

The alternative manifold layer 306' shown in FIG. 12B includes three individual levels. In particular, the manifold layer 306' includes a circulation level 304', a level 308' and a level 312'. The circulation level 304' is coupled to the interface layer 302' as well as the level 308'. The level 308' is coupled to the circulation level 304' and the level 312'. Although FIG. 12B illustrates that the level 312' positioned above the level 308', it is contemplated by one skilled in the art that the level 308' is alternatively positioned above the level 312'. It is also apparent to one skilled in the art that any number of levels are alternatively implemented in accordance with the present invention.

Figure 12C:
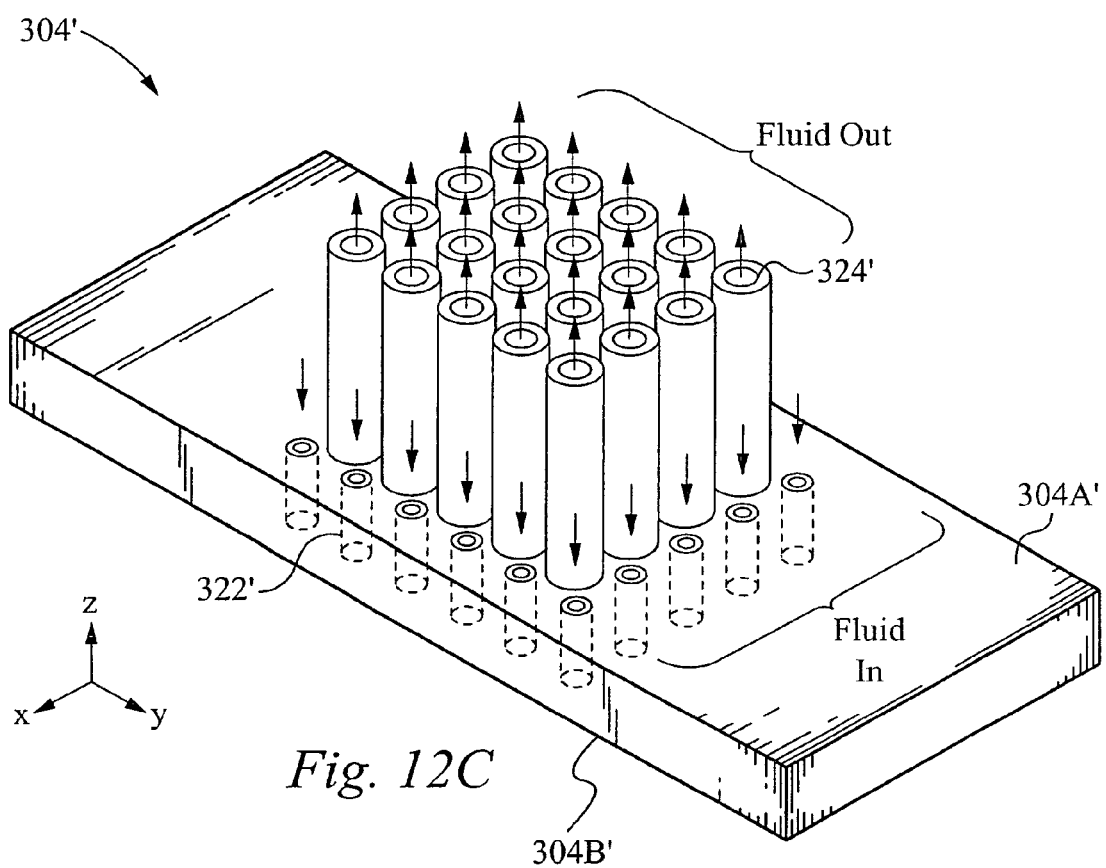
FIG. 12C illustrates a perspective view of the alternative circulation level in accordance with the present invention.

FIG. 12C illustrates a perspective view of the circulation level 304' in accordance with the present invention. The circulation level 304' includes a top surface 304A' and a bottom surface 304B'. As shown in FIGS. 12B and 12C, the circulation level 304' includes several apertures 322' which extend therethrough. In one embodiment, the openings of the apertures 322' are flush with the bottom surface 304B'. Alternatively, the apertures 322' extend beyond the bottom surface 304B' to apply fluid closer to the interface layer 302'. In addition, the circulation level 304' includes several apertures 324' which extend therethrough from the top surface 304A' to the bottom surface 304B' as well as protrude vertically as cylindrical protrusions in the Z-direction a predetermined distance. It is apparent to one skilled in the art that the apertures 322', 324' alternatively extend at an angle through the circulation level and do not need to be completely vertical. As stated above, in one embodiment, the interface layer 302' (FIG. 12B) is coupled to the bottom surface 304B' of the circulation level 304'. Thus, fluid enters the interface layer 302' by flowing only through the apertures 322' in the Z-direction and exits the interface layer 302' by flowing only through the apertures 324' in the Z-direction. As discussed below, fluid entering the interface layer 302' via the apertures 322' is kept separate from fluid exiting the interface layer 302' via the apertures 324' through the circulation level 304'.

Figure 12D:
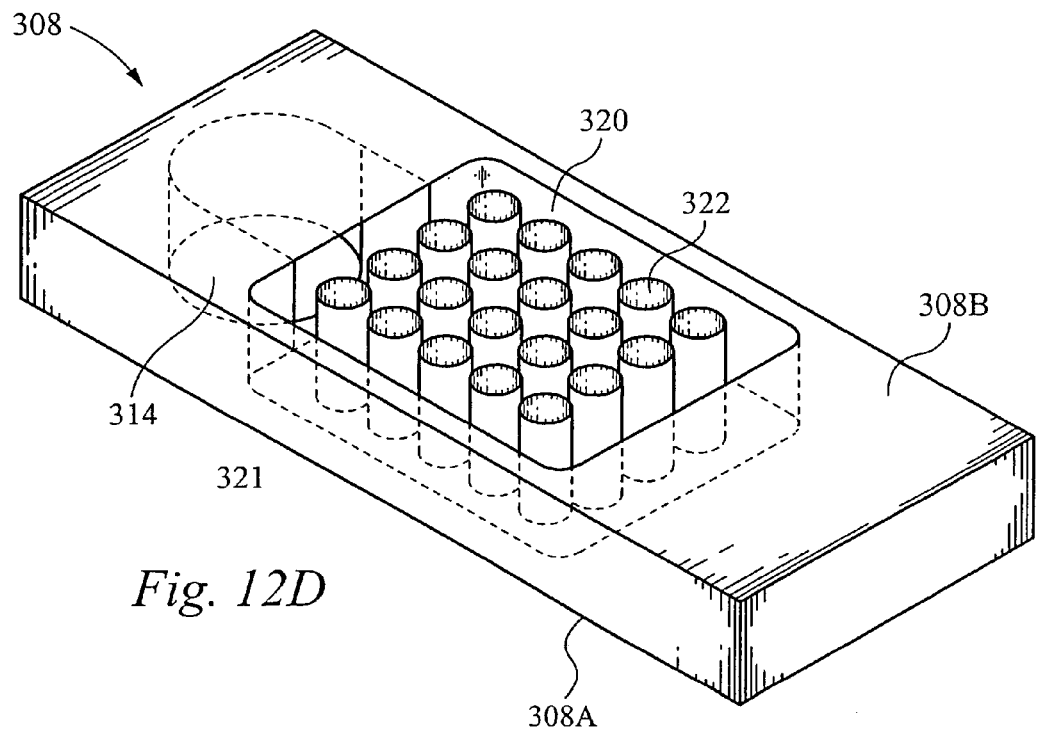
FIG. 12D illustrates a perspective view of the underside of the alternative inlet level in accordance with the present invention.
Figure 12E:
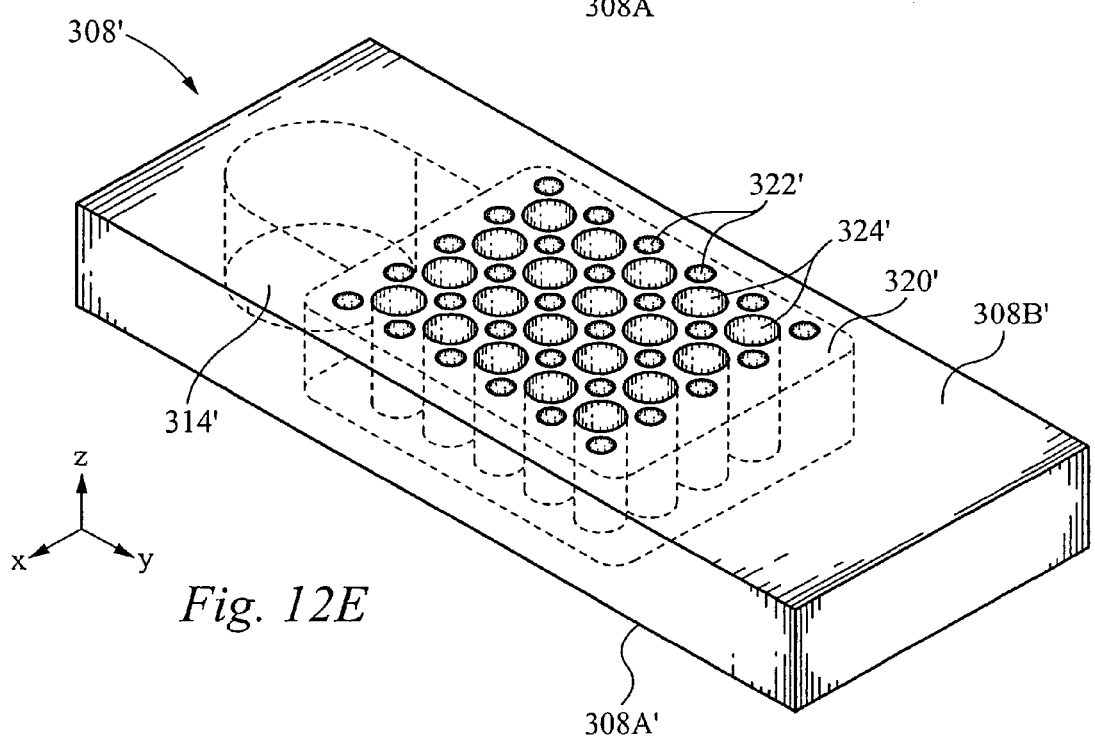
FIG. 12E illustrates a perspective view of the underside of an alternative inlet level in accordance with the present invention.
Figure 12F:
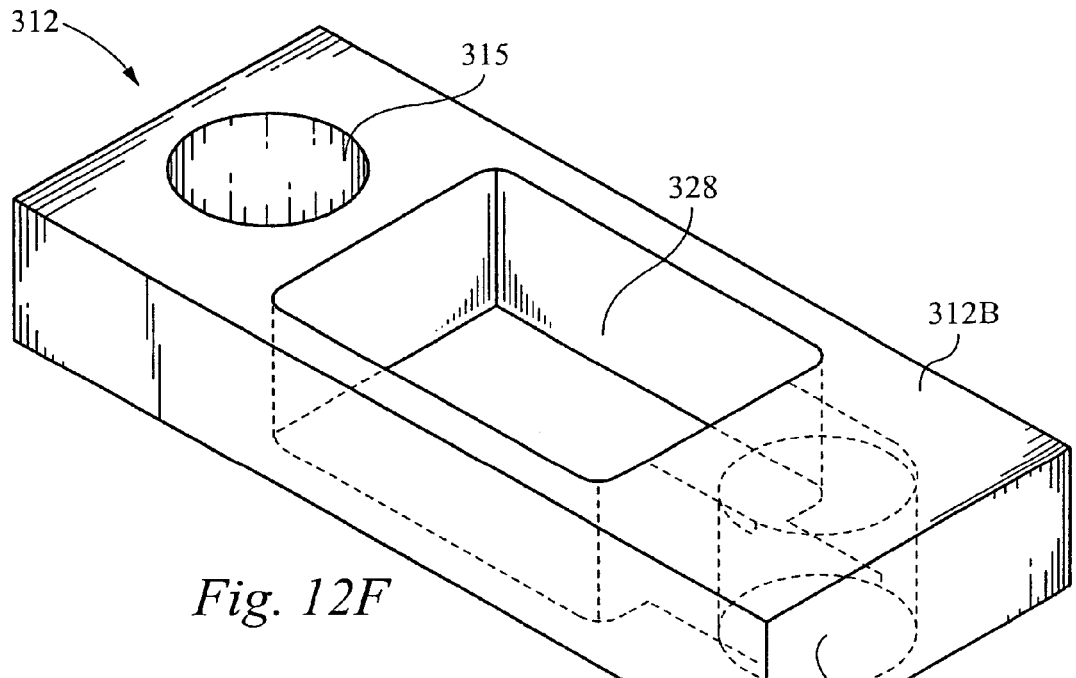
FIG. 12F illustrates a perspective view of the underside of the alternative outlet level in accordance with the present invention.
Figure 12G:
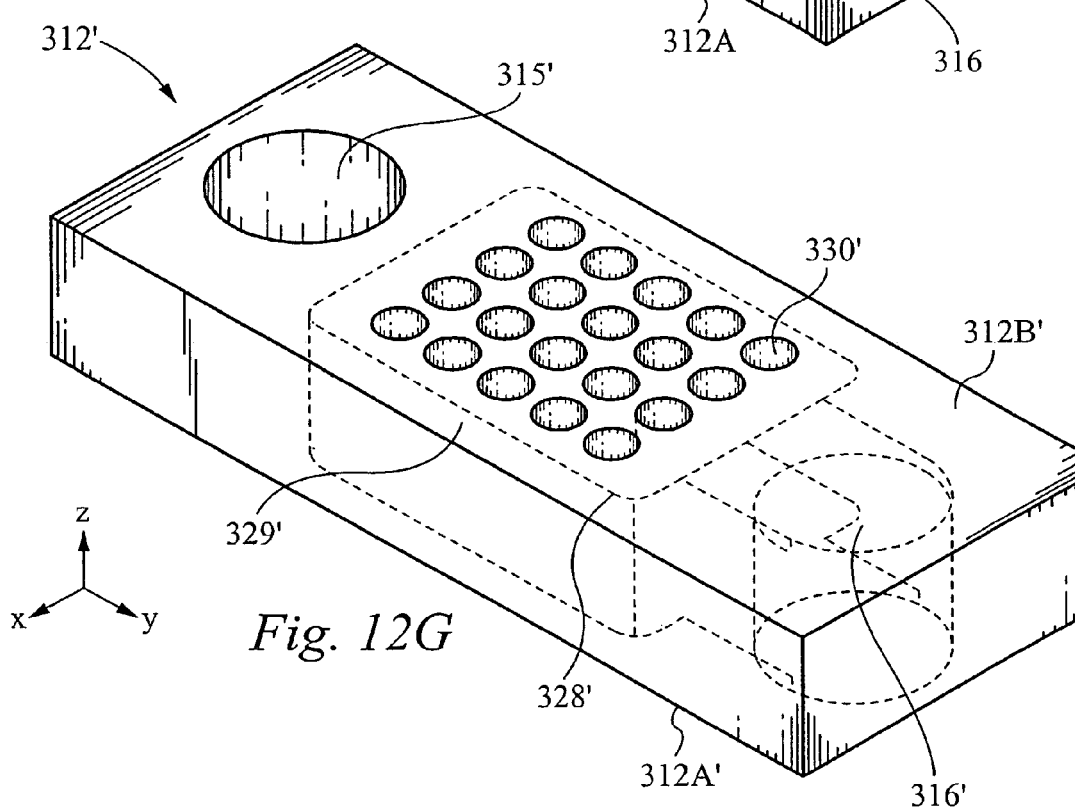
FIG. 12G illustrates a perspective view of the underside of an alternative outlet level in accordance with the present invention.

As shown in FIG. 12C, a portion of the apertures 324' have cylindrical members extending from the top surface 304A' in the Z-direction from the circulation level 304', such that fluid flows through the apertures 324' directly to the corridor 326' in the level 312' (FIGS. 12F and 12G). The cylindrical protrusions are circular as in FIG. 12C, but alternatively has any other shape. Along the interface layer 302', however, the fluid flows from each aperture 322' to the adjacent apertures 324' in the lateral and vertical directions. In one embodiment, the apertures 322' and the apertures 324' are thermally insulated from one another so that heat from the heated fluid exiting the interface layer 302' through the manifold layer 306' does not propagate to the cooled fluid flowing to the interface layer 302' through the manifold layer 306'.

FIG. 12D illustrates an alternative embodiment of the level 308 in accordance with the present invention. As shown in FIG. 12D, the level 308 includes a top surface 308A and a bottom surface 308B. The bottom surface 308B of the level 308 is coupled directly to the interface layer 302, as shown in FIG. 12A. The level 308 includes a recessed corridor 320 which includes several fluid delivery channels 322 which deliver fluid to the interface layer 302. The recessed corridor 320 is in sealable contact with the interface layer 302, wherein fluid exiting the interface layer 302 flows around and between the channels 322 in the corridor 320 and out through the port 314. It should be noted that fluid exiting the interface layer 302 does not enter the delivery channels 322.

FIG. 12E illustrates a perspective view of the underside of alternative embodiment of the level 308' in accordance with the present invention. The level 308' includes a top surface 308A' and a bottom surface 308B', whereby the bottom surface of the level 308B' is coupled directly to the circulation level 304' (FIG. 12C). The level 308' includes a port 314', a corridor 320' and a plurality of apertures 322', 324' in the bottom surface 308B'. It is apparent to one skilled in the art that the level 308' includes any number of ports and corridors. The apertures 322', 324' in FIG. 12E are configured to face the circulation level 304'. In particular, as shown in FIG. 12E, the apertures 322' direct fluid entering the corridor 320' to flow into the interface layer 302', whereas the apertures 324' direct fluid from the interface layer 302' to flow to the level 312'. The apertures 324' extend completely through the corridor 320' in the level 308'. The apertures 324' are individualized and separated, such that fluid flowing through the apertures 324' does not mix or come into contact with the fluid flowing through the cylinders associated with the apertures 324'. The apertures 324' are also individualized to ensure that fluid entering through each aperture 324' flows along the fluid path provided by the aperture 324'. In one embodiment, the apertures 324' are vertically configured. Therefore, the fluid is channeled vertically through a substantial portion of the manifold layer 306'. It is apparent that the same applies to the apertures 322', especially in the case in which the level is positioned between the interface layer and the level.

Although the apertures or holes 322 are shown as having the same size, the apertures 322 can have different or varying diameters along a length. For instance, the holes 322 closer to the port 314 can have a smaller diameter to restrict fluid flow therethrough. The smaller holes 322 thus force the fluid to flow down the apertures 322 which are further away from the port 314. This variation in the diameters in the holes 322 allow a more uniform distribution of fluid into the interface layer 302. It is apparent to one skilled in the art that the hole 322 diameters are alternatively varied to address cooling in known interface hot spot regions in the interface layer 302. It is apparent to one skilled in the art that the above discussion is applicable to the apertures 324', whereby the dimensions of the apertures 324' vary or are different to accommodate uniform outflow from the interface layer 302.

In the alternative embodiment, the port 314 provides fluid to the level 308 and to the interface layer 302. The port 314 in FIG. 12D extends from the top surface 308A through a portion of the body of the level 308 to the corridor 320. Alternatively, the port 314 extends to the corridor 320 from the side or the bottom of the level 308. In one embodiment, the port 314 is coupled to the port 315 in the level 312 (FIGS. 12A-12B). The port 314 leads to the corridor 320 which is enclosed, as shown in FIG. 12C, or recessed, as in FIG. 12D. The corridor 320 serves to channel fluid to the port 314 from the interface layer 302. The corridor 320 alternatively channels fluid from the port 314 to the interface layer 302.

As shown in FIGS. 12F and 12G, the port 315 in the level 312 is aligned with and in communication with the port 314. In relation to FIG. 12A, fluid enters the heat exchanger 300 via port 316 and flows through the corridor 328 down to the delivery channels 322 in the level 308 eventually to the interface layer 302. In relation to FIG. 12B, fluid alternatively enters the heat exchanger 300' enters via the port 315' and flows through the port 314' in the level 308' and eventually to the interface layer 302'. The port 315 in FIG. 12F extends from the top surface 312A through the body of the level 312. Alternatively, the port 315 extends from a side of the level 312. Alternatively, the level 312 does not include the port 315, whereby the fluid enters the heat exchanger 300 via the port 314 (FIGS. 12D and 12E). In addition, the level 312 includes a port 316 which channels the fluid to the corridor 328'. It is apparent to one skilled in the art that the level includes any number of ports and corridors. The corridor 328 channels fluid to the delivery channels 322 and eventually to the interface layer 302.

FIG. 12G illustrates a perspective underside view of an alternative embodiment of the level 312' in accordance with the present invention. The level 312' is coupled to the level 308' in FIG. 12E. As shown in FIG. 12F, the level 312' includes a recessed corridor area 328' within the body which is exposed along the bottom surface 312B'. The recessed corridor 328' is in communication with the port 316', whereby fluid travels directly from the recessed corridor 328' to the port 316'. The recessed corridor 328' is positioned above the top surface 308A' of the level 308' to allow fluid to freely travel upward from the apertures 324' to the corridor 328'. The perimeter of the recessed corridor 320' and bottom surface 312B' is sealed against the top surface 308A' of the level 312' such that all of the fluid from the apertures 324' flows to the port 316' via the corridor 328'. Each of the apertures 330' in the bottom surface 319B' is aligned with and in communication with a corresponding aperture 321' in the level 308' (FIG. 12E), whereby the apertures 330' are positioned flush with the top surface 308A' of the level 308' (FIG. 12E). Alternatively, the apertures 330 have a diameter slightly larger than the diameter of the corresponding aperture 324', whereby the apertures 324' extend through the apertures 330' into the corridor 328'.

Figure 12H:
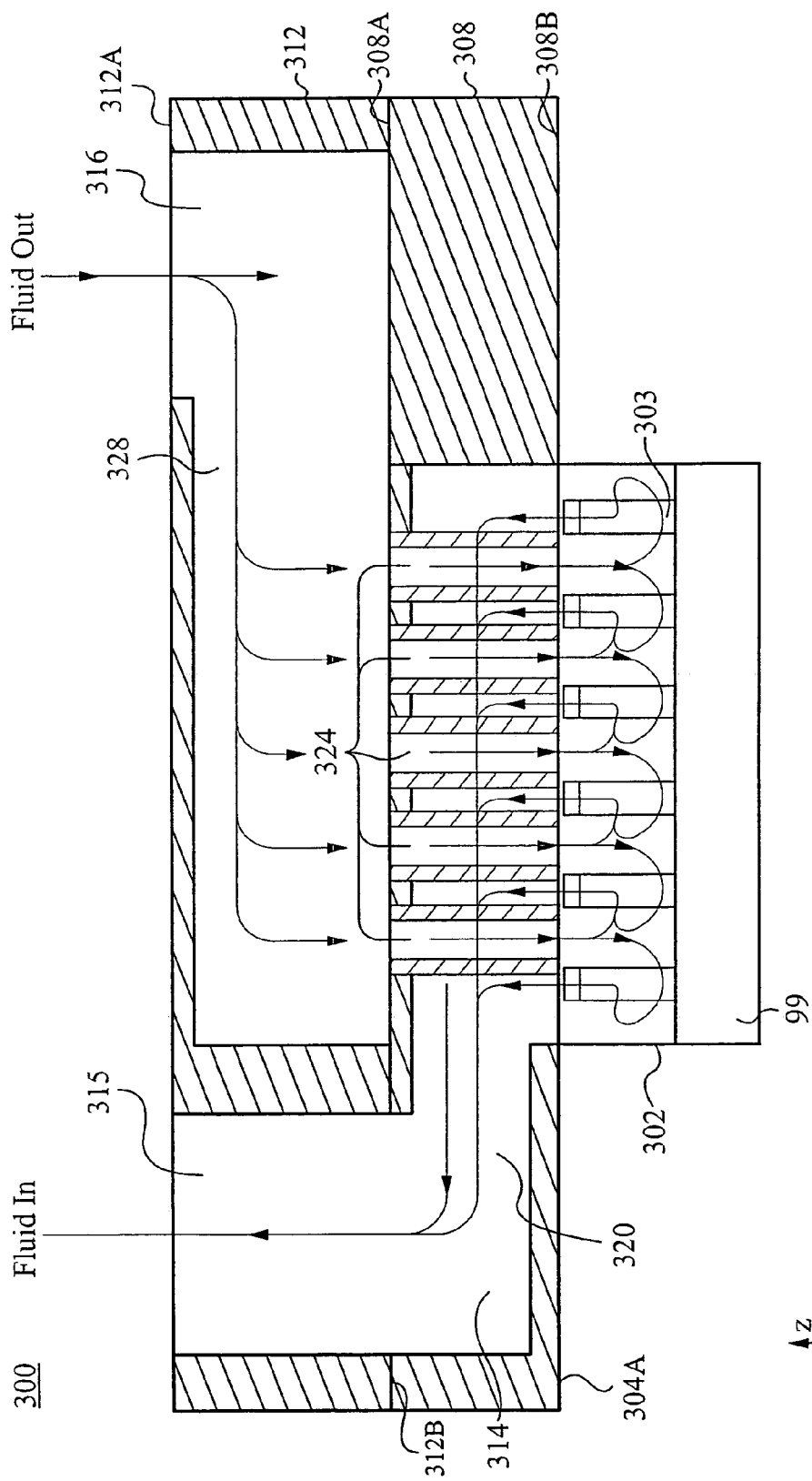
FIG. 12H illustrates a cross sectional view of the alternative heat exchanger in accordance with the present invention.

FIG. 12H illustrates a cross sectional view of the heat exchanger in FIG. 12A along lines H-H in accordance with the present invention. As shown in FIG. 12H, the interface layer 302 is coupled to a heat source 99. As stated above, the heat exchanger 300 is alternatively integrally formed with the heat source 99 as one component. The interface layer 302 is coupled to the bottom surface 308B of the level 308. In addition, the level 312 is coupled to the level 308, whereby the top surface 308A of the level 308 is sealed against the bottom surface 312B of the level 312. The perimeter of the corridor 320 of the level 308 is in communication with the interface layer 302. In addition, the corridor 328 in the level 312 is in communication with the apertures 322 in the level 308. The bottom surface 312B of the level 312 is sealed against the top surface 308A of the level 308 such that fluid does not leak between the two levels 308, 312.

Figure 12I:
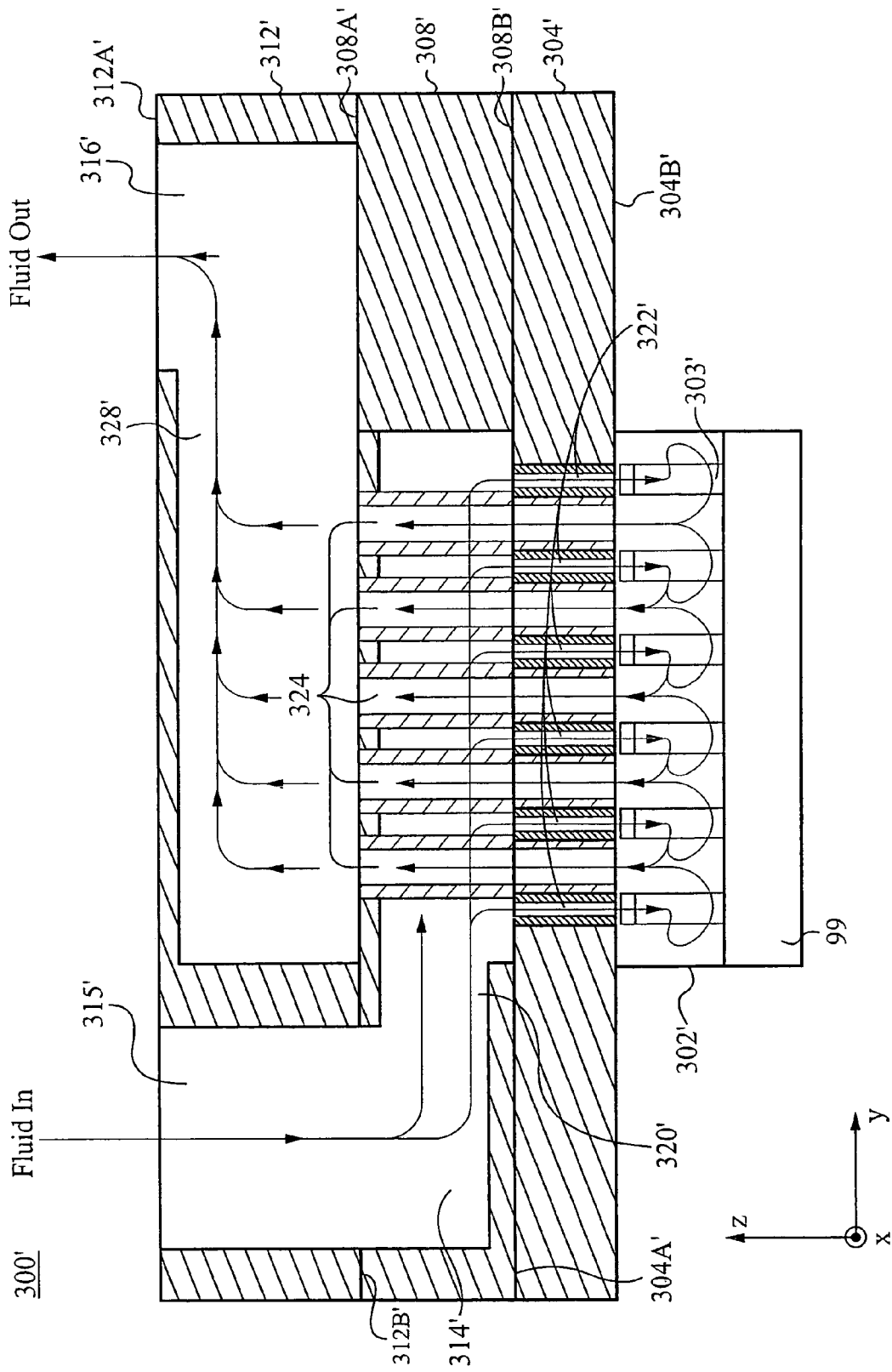
FIG. 12I illustrates a cross sectional view of the alternative heat exchanger in accordance with the present invention.

FIG. 12I illustrates a cross sectional view of the alternative heat exchanger in FIG. 12B along lines I-I in accordance with the present invention. As shown in FIG. 12I, the interface layer 302' is coupled to a heat source 99'. The interface layer 302' is coupled to the bottom surface 304B' of the circulation level 304'. Also, the circulation level 304 is coupled to the level 308', whereby the top surface 304A' of the circulation level 304' is sealed against the bottom surface 308B' of the level 308'. In addition, the level 312' is coupled to the level 308', whereby the top surface 308A' of the level 308' is sealed against the bottom surface 312B' of the level 312'. The perimeter of the corridor 320' of the level 308' is in communication with the apertures in the top surface 304A' of the circulation level 304' such that fluid does not leak between the two levels. In addition, the perimeter of the corridor 328' in the level 312' is in communication with the apertures in the top surface 308A' of the circulation level 308' such that fluid does not leak between the two levels.

In the operation of the heat exchanger 300, as shown by the arrows in FIGS. 12A and 12H, cooled fluid enters the heat exchanger 300 through the port 316 in the level 312'. The cooled fluid travels down the port 316 to the corridor 328 and flows downward to the interface layer 302 via the delivery channels 322. The cooled fluid in the corridor 320 does not mix or come into contact with any heated fluid exiting the heat exchanger 300. The fluid entering the interface layer 302 undergoes thermal exchange with and absorbs the heat produced in the heat source 99. The apertures 322 are optimally arranged such that the fluid travels the least amount of distance in the X and Y direction in the interface layer 302 to minimize the pressure drop in the heat exchanger 300 while effectively cooling the heat source 99. The heated fluid then travels upward in the Z-direction from the interface layer 302 to the corridor 320 in the level 308. The heated fluid exiting the manifold layer 306 does not mix or come into contact with any cooled fluid entering the manifold layer 306. The heated fluid, upon entering the corridor 320 flows to the ports 314 and 315 and exits the heat exchanger 300. It is apparent to one skilled in the art that the fluid alternatively flows opposite the way shown in FIGS. 12A and 12H without departing from the scope of the present invention.

In the alternative operation, as shown by the arrows in FIGS. 12B and 12I, cooled fluid enters the heat exchanger 300' through the port 316' in the level 312'. The cooled fluid travels down the port 315' to the port 314' in the level 308'. The fluid then flows into the corridor 320' and flows downward to the interface layer 302' via the apertures 322' in the circulation level 304'. However, the cooled fluid in the corridor 320' does not mix or come into contact with any heated fluid exiting the heat exchanger 300'. The fluid entering the interface layer 302' undergoes thermal exchange with and absorbs the heat produced in the heat source 99. As discussed below, the apertures 322' and apertures 324' are arranged such that the fluid travels the optimal closest distance along the interface layer 302' from each aperture 322' to an adjacent aperture 324' to reduce the pressure drop therebetween while effectively cooling the heat source 99. The heated fluid then travels upward in the Z-direction from the interface layer 302' through the level 308' via the several apertures 324' to the corridor 328' in the level 312'. The heated fluid does not mix or come into contact with any cooled fluid entering the manifold layer 306' as it travels up the apertures 324'. The heated fluid, upon entering the corridor 328' in the level 312' flows to the port 316' and exits the heat exchanger 300'. It is apparent to one skilled in the art that the fluid alternatively flows opposite the way shown in FIGS. 12B and 12I without departing from the scope of the present invention.

In the manifold layer 306, the apertures 322 are arranged such that the distance which the fluid flows in the interface layer 302 is minimized while adequately cooling the heat source 99. In the alternative manifold layer 306', the apertures 322' and apertures 324' are arranged such that the distance which the fluid flows in the interface layer 302' is minimized while adequately cooling the heat source 99. Specifically, the and apertures 322', 324' provide substantially vertical fluid paths, such that the flow is minimize in the X and Y lateral directions in the heat exchanger 300'. Thus, the heat exchanger 300, 300' greatly reduces the distance that the fluid must flow to adequately cool the heat source 99, which in turn, greatly reduces the pressure drop generated within the heat exchanger 300, 300' and system 30, 30' (FIGS. 2A-2B). The specific arrangement and cross-sectional sizes of the apertures 322 and/or apertures 324 depend on a variety of factors, including, but not limited to, flow conditions, temperature, heat generated by the heat source 99 and fluid flowrate. It is noted that although the following discussion relates to apertures 322 and 324, it is apparent that the discussion also applies to only apertures 322 or apertures 324.

The apertures 322, 324 are spaced apart from each other an optimal distance whereby the pressure drop is minimized as the heat source 99 is adequately cooled to a desired temperature. The arrangement and optimal distance of the apertures 322 and/or apertures 324 in the embodiment also allows independent optimization of the apertures 322, 324 and fluid paths, in general, through the interface layer 302 by changing the dimensions and locations of the individual apertures. In addition, the arrangement of the apertures in the embodiment also significantly increases the division of total flow entering the interface layer as well as the amount of area cooled by the fluid entering through each aperture 322.

Figure 13:
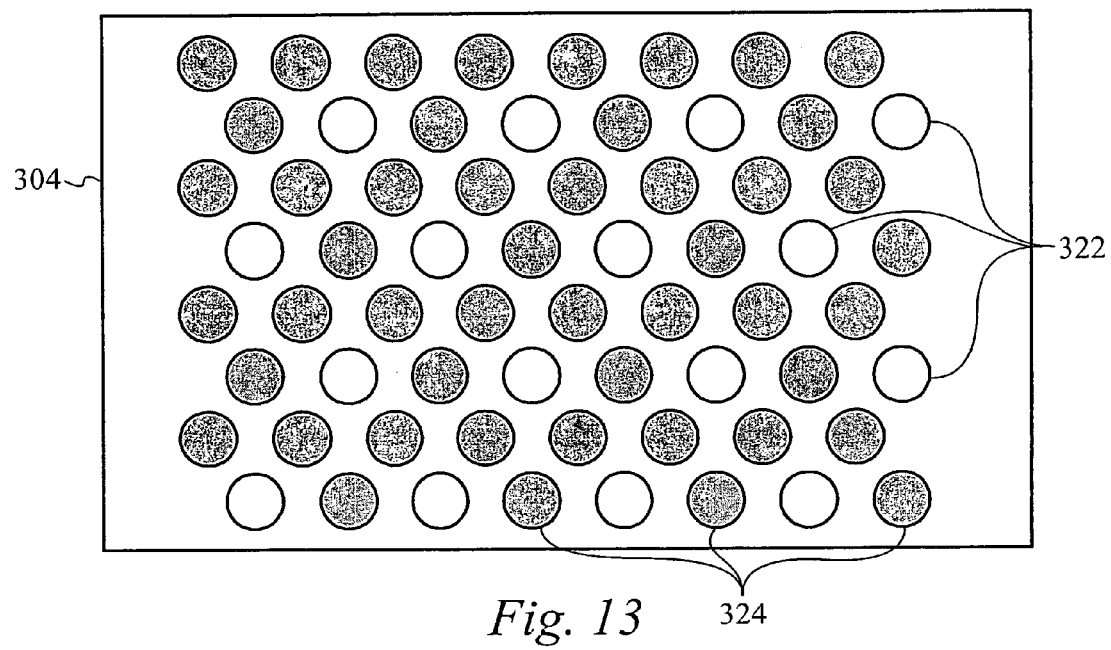
FIG. 13 illustrates a top view of the circulation level having an arrangement of inlet and outlet apertures for single phase fluid flow in accordance with the present invention.
Figure 14:
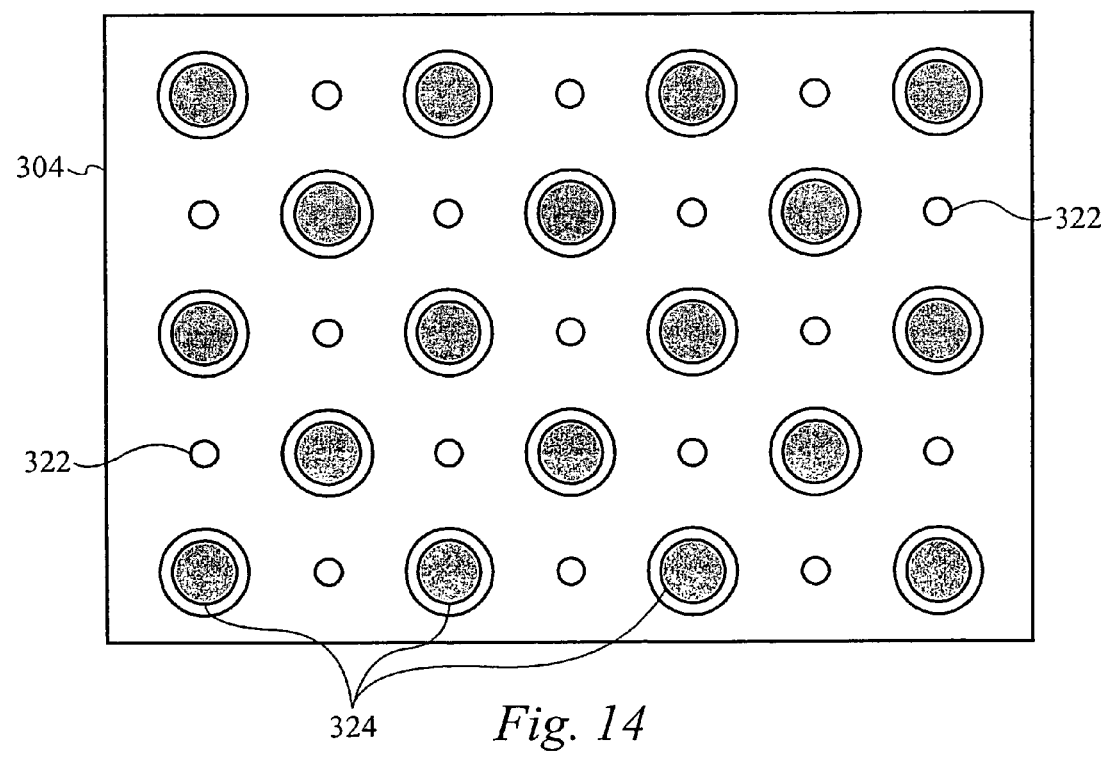
FIG. 14 illustrates a top view of the circulation level having an arrangement of inlet and outlet apertures for two phase fluid flow in accordance with the present invention.

In one embodiment, the apertures 322, 324 are disposed in an alternating configuration or a 'checkerboard' pattern in the manifold layer 306, as shown in FIGS. 13 and 14. Each of the apertures 322, 324 are separated by the least amount of distance that the fluid must travel in the checkerboard pattern. However, the apertures 322, 324 must be separated a distance large enough from each other to provide the cooling liquid to the interface layer 302 for a sufficient amount of time. As shown in FIGS. 13 and 14, one or more of the apertures 322 are disposed adjacent to a corresponding number of apertures or vice versa such that the fluid entering the interface layer 302 travels the least amount of distance along the interface layer 302 before exiting the interface layer 302. Thus, as shown in the figures, the apertures 322, 324 are radially distributed around each other to assist the fluid in traveling the least amount of distance from any aperture 322 to the closest aperture 324. For example, as shown in FIG. 13, fluid entering the interface layer 302 via one specific aperture 322 experiences the path of least resistance to an adjacent aperture 324. In addition, the apertures 322, 324 are circular in shape, although the apertures can have any other shape.

In addition, as stated above, although the apertures 324 shown in the figures protrude from the circulation level 304 or level 308, 312 as a cylindrical member, the apertures alternatively do not protrude from any of the levels in the manifold layer 306. The manifold layer 306 has rounded surfaces around the areas where fluid changes direction to aid in reducing the pressure drop in the heat exchanger 300.

The optimal distance configuration as well as the dimensions of the apertures 322, 324 depend on the amount of temperature that the fluid is exposed to along the interface layer 302. It is also important that the cross sectional dimensions for the fluid paths in the apertures 322, 324 are large enough to reduce pressure drop in the heat exchanger 300. For the case in which fluid experiences only single-phase flow along the interface layer 302, each aperture 322 is surrounded by several adjacent apertures 324 in a symmetrical hexagonal arrangement, as shown in FIG. 13. In addition, for single-phase flow, the number of apertures are approximately equal in the circulation level 304. Additionally, for single-phase flow, the apertures 322, 324 are the same diameter. It is apparent to one skilled in the art that other arrangements as well as any ratio of apertures 322, 324 are alternatively contemplated.

For the case in which the fluid experiences two-phase flow along the interface layer 302, non-symmetric arrangements of the apertures 322, 324 are used to accommodate acceleration of the two-phase fluid. However, symmetric arrangements of the apertures 322, 324 are also contemplated for two-phase flow. For instance, the apertures 322, 324 can be symmetrically arranged in the circulation level 304, whereby the apertures 324 have larger openings than the apertures 322. Alternatively, the hexagonal symmetrical arrangement shown in FIG. 13 are used in the circulation level 304 for two-phase flow, whereby more apertures 324 are present in the circulation level 304 than apertures 322.

It is should be noted that the apertures 322, 324 in the circulation level can alternatively be arranged to cool hot spots in the heat source 99. Thus, for example, two apertures 322 are alternatively positioned immediately next to each other in the circulation level 304, whereby both apertures 322 are positioned near or above an interface hot spot region. It is apparent that the appropriate number of apertures 324 are positioned adjacent to both apertures 322 to reduce the pressure drop in the interface layer 302. Therefore, the two apertures 322 supply cool fluid to the interface hot spot region to compel the interface hot spot region, discussed above, to be a uniform, substantially equal temperature.

As stated above, the heat exchanger 300 has significant advantages over other heat exchangers. The configuration of the heat exchanger 300 is alternatively utilized with a modest-performance pump due to the reduction of pressure drop caused by the vertical fluid paths. In addition, the configuration of the heat exchanger 300 allows independent optimization of the inlet, and fluid paths along the interface layer 302. Additionally, the separate levels allow a customizable design foundation to optimize the uniformity of heat transfer, reduction of pressure drop and dimensions of the individual components therein. The configuration of the heat exchanger 300 also reduces the pressure drop in systems in which the fluid undergoes two phase flow and thereby can be used in single phase and two phase systems. Further, as discussed below, the heat exchanger accommodates many different manufacturing methods and allows adjustment of component geometry for tolerance purposes.

Figure 18:
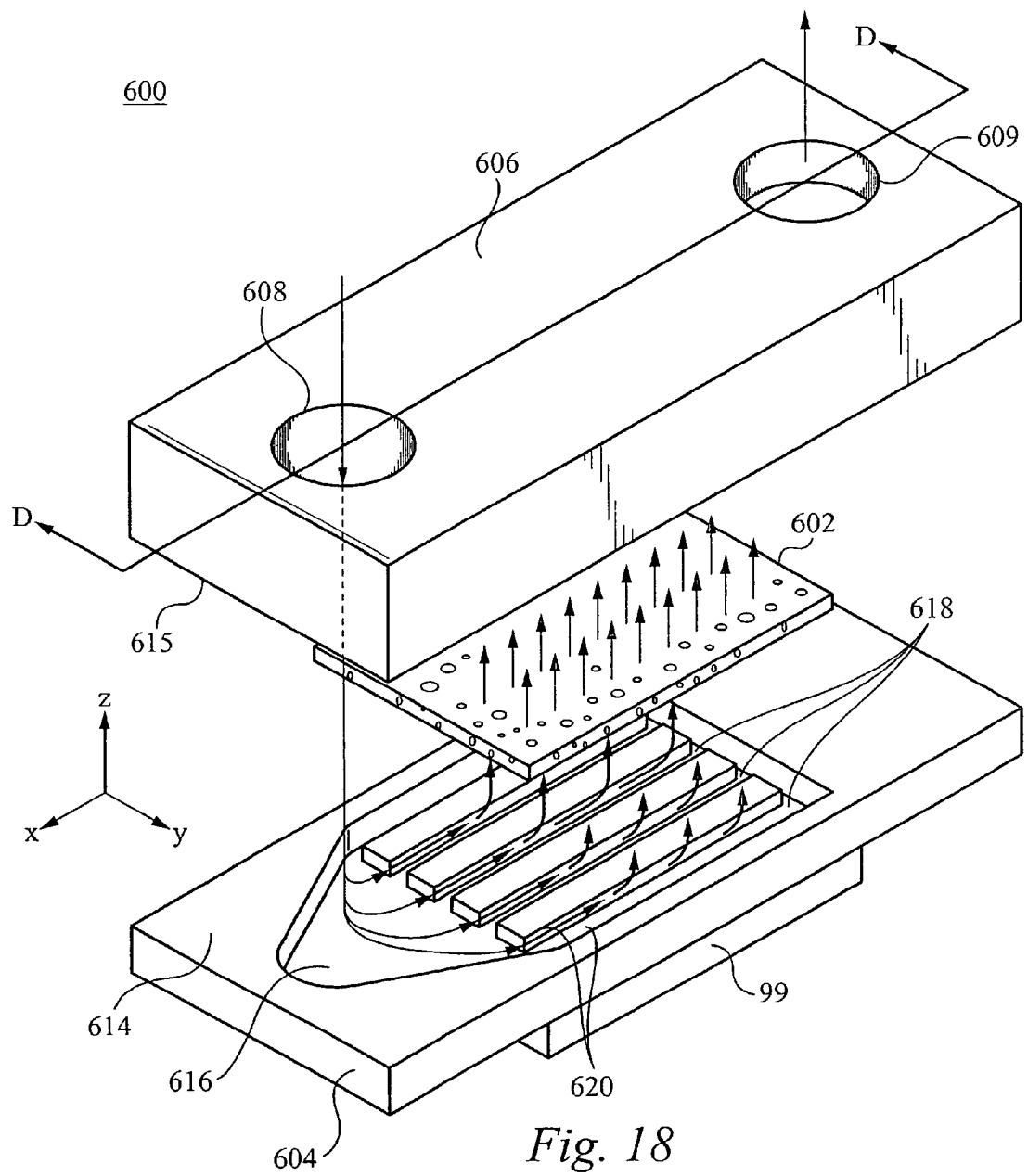
FIG. 18 illustrates an exploded view of a heat exchanger in accordance with the present invention.
Figure 19:
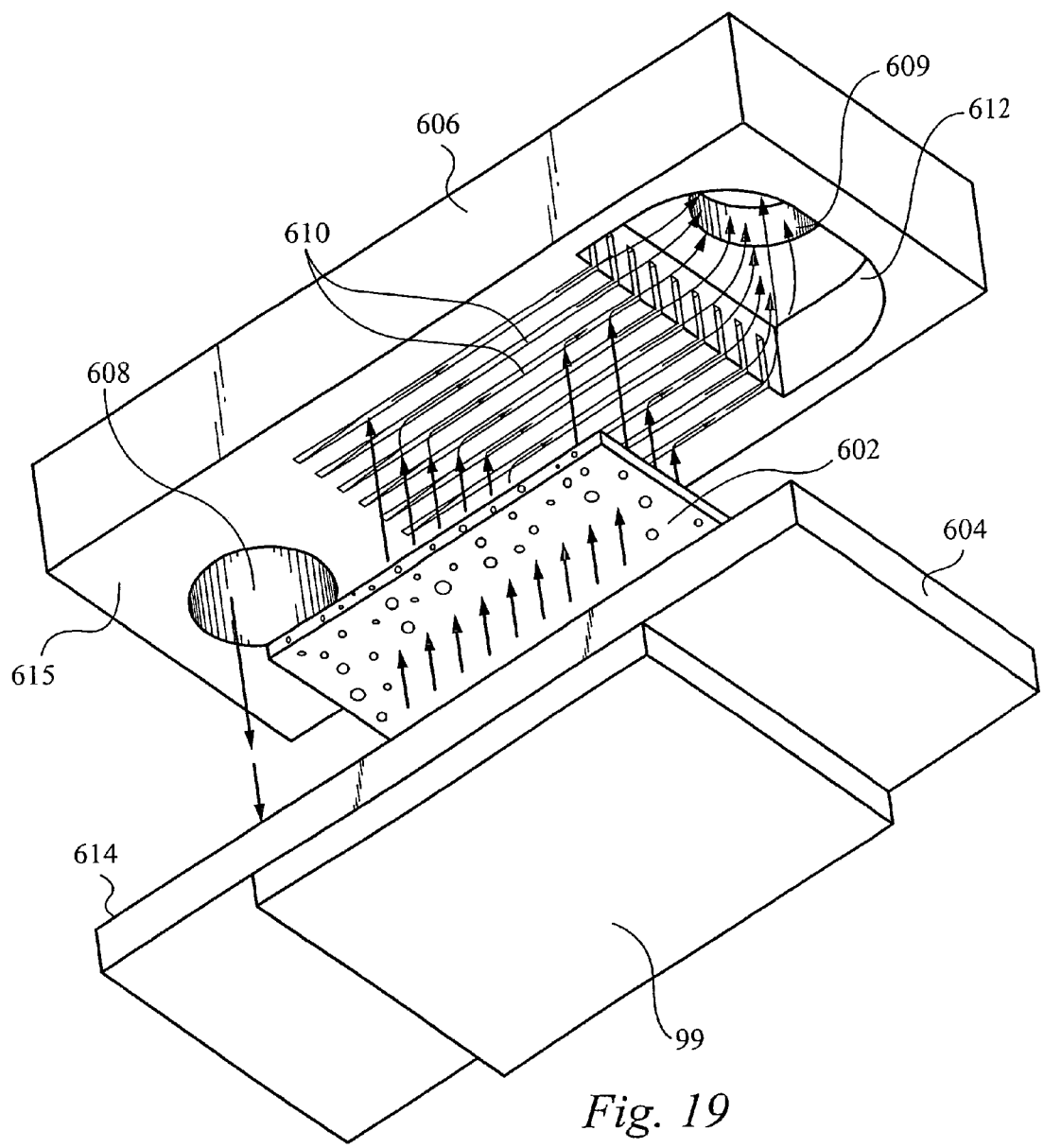
FIG. 19 illustrates an exploded view of a heat exchanger in accordance with the present invention.

FIG. 18 illustrates a perspective view of the heat exchanger of an embodiment of the present invention. As shown in FIG. 18, the heat exchanger 600 includes a bottom manifold layer 604, an interface layer 602 and a top manifold layer 606. The top manifold layer 606 is coupled to the bottom manifold layer 604, whereby the interface layer 602 is positioned in between the top and bottom manifold layers 604,606. As shown in FIGS. 18 and 19, the top manifold layer 606 preferably includes two apertures 608, 609 which extend therethrough. In particular, the inlet aperture 608 channels preferably cooled fluid into the heat exchanger 600 and the outlet aperture 609 channels warm or hot fluid from the heat exchanger 600. It should be noted that although one inlet and outlet aperture 608, 609 is shown in FIGS. 18 and 19, any number of inlet and outlet apertures 608, 609 are alternatively contemplated. In addition, although the inlet and outlet apertures 608, 609 are shown to be vertically configured in the top manifold 606, the apertures 608, 609 are alternatively configured horizontally and/or diagonally. In addition, the top manifold 606 includes several outlet fluid channels 610 which are in communication with the outlet chamber 612 and the outlet aperture 609. Although the fluid channels 610 show in FIG. 19 are straight and parallel to one another, it is contemplated that the fluid channels 610 are alternatively configured in any pattern and have any appropriate shape.

Figure 20:
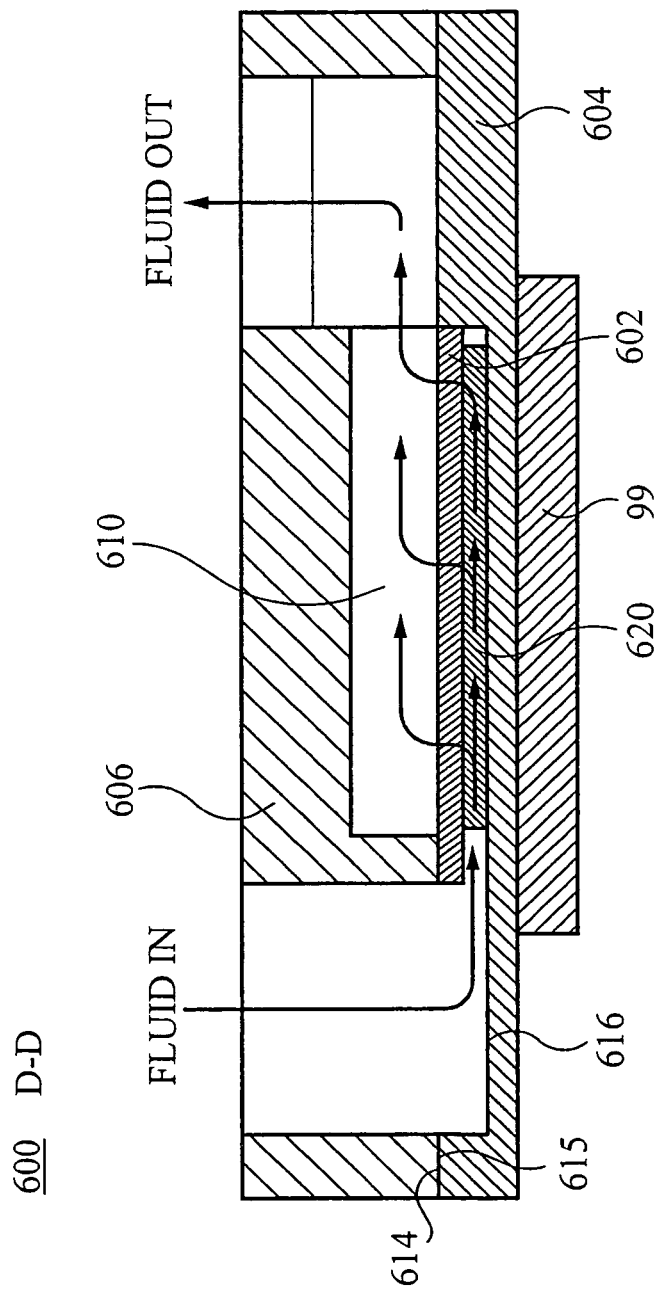
FIG. 20 illustrates a cross-sectional view of a heat exchanger in accordance with the present invention.

The bottom manifold layer 604 includes a top surface 614 which mates to the bottom surface 615 (FIG. 19) of the top manifold 606. The bottom manifold layer 604 includes a recess area 616 from the top surface 614 into the body of the bottom manifold layer 604. The recess 616 has an appropriate depth to accept the interface layer 602, whereby the interface layer 602 is preferably flush with the top surface 615 when coupled to the bottom manifold layer 604, as shown in FIG. 20. As shown in FIG. 18, the recess area 616 includes a raised surface 620 having several fluid channels 618 configured in parallel with one another in the raised surface 620. The raised surface 620 protrudes upward from the bottom surface of the recess area 616 an appropriate distance such that the bottom surface of the interface layer 602 is in contact with the raised surface 620. The bottom manifold layer 604 as well as the raised surface 620 is made of a material having a high thermal conductivity, such that heat generated by the heat source 99 transfers directly through the raised surface 620 to the interface layer 602. In addition, fluid within the recess area 616 flows along the fluid channels 618 through the raised surface 620 and absorbs the heat in the recessed area 616, wherein the temperature of the fluid increases due to thermal exchange in the recess area 616.

The higher temperature fluid flows from the fluid channels 618 to the interface layer 602. The interface layer 602 passes the fluid from the recess area 616 in the bottom manifold layer 604 to the fluid channels 610 (FIG. 19) in the top manifold layer 602. The interface layer 602 is also in contact with the raised conductive surface 620 of the bottom manifold layer 604. The interface layer 602 provides a thermal exchange environment where the fluid is able to adequately absorb the heat from the heat source 99. Thus, the interface layer 602 is preferably a microporous structure as discussed above, whereby the interface layer 602 has a high surface volume characteristic. Alternatively, the interface layer 602 includes microchannels (not shown), pillars (not shown) or any combination thereof.

It should be noted that although FIGS. 18-20 illustrate that fluid enters and exits the heat exchanger 600 via the top manifold layer 606, the fluid alternatively enters and exits through the bottom manifold layer 604 or a combination of the top and bottom manifold layers 604, 606. For example, in an alternative embodiment, the fluid enters the heat exchanger 600 from underneath the bottom manifold layer 604, whereby the fluid exits the heat exchanger 600 via the aperture 609 in the top manifold layer 606.

The operation of the heat exchanger 600 will now be discussed in relation to FIGS. 18-20. The cooled fluid enters the heat exchanger 600 via the inlet port 608. As stated above, the bottom surface 615 of the top manifold layer 606 is mated in contact with the top surface 614 of the bottom manifold layer 604. Thus, the fluid flows in the Z direction directly from the top manifold layer 606 to the recess area 616 in the bottom manifold layer 604. Upon reaching the recess area 616, the fluid travels in the X direction along the recess area 616 toward the fluid grooves 618 which are disposed within the raised heat exchange surface 620. In regard to FIG. 20, the interface layer 602 is positioned in contact with the raised heat exchange surface 620, whereby heat is transferred from the raised heat exchange surface 620 to the interface layer 602. As stated above, the raised heat exchange surface 620 as well as the bottom manifold layer 604 itself have an appropriate thermal conductivity to allow sufficient heat transfer to occur from the heat source 99 to the interface layer 602. Therefore, the heat from the heat source 99 conducts to the interface layer 602, whereby the cooled fluid travels through the fluid grooves 618 and performs some thermal exchange with the heated raised heat exchange surface 620. The fluid travels from the fluid grooves 618 in the Z direction to the interface layer 602, whereby the fluid further performs thermal exchange with the interface layer 602. As stated above, the interface layer 602 is preferably a microporous structure which has a large surface to volume characteristic which absorbs the fluid and heat from the bottom surface manifold 604 to allow the fluid to sufficiently remove the heat from the heat source 99. The heated fluid then flows along the fluid channels 610 to the outlet chamber 612 and exits the heat exchanger 606 via the outlet port 609.

Figure 1A:
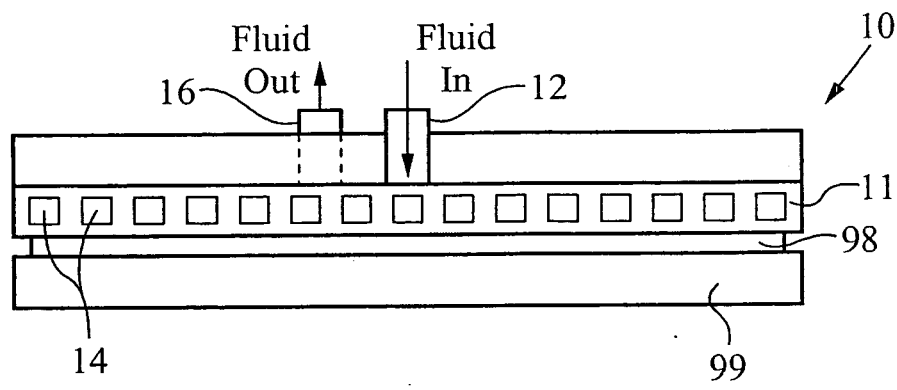
FIG. 1A illustrates a side view of a conventional heat exchanger.
Figure 1B:
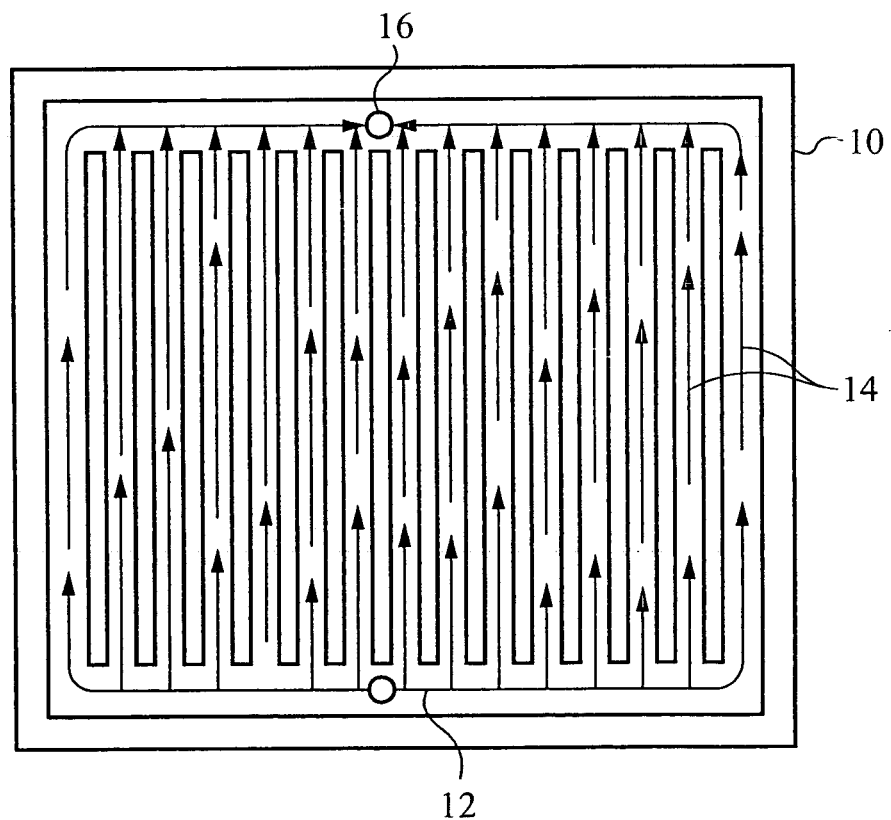
FIG. 1B illustrates a top view of the conventional heat exchanger.
Figure 1C:
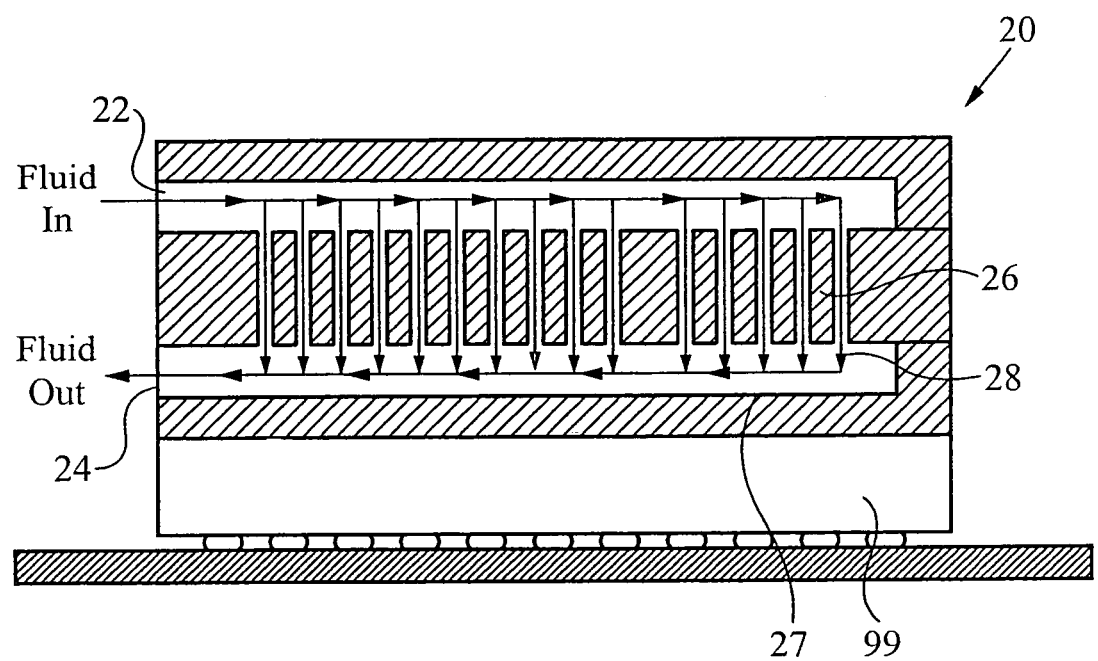
FIG. 1C illustrates a side view diagram of a prior art multi-level heat exchanger.

The details of how the heat exchanger 100 as well as the individual layers in the heat exchanger 100 are fabricated and manufactured are discussed below. The following discussion applies to the preferred and alternative heat exchangers of the present invention, although the heat exchanger 100 in FIG. 3B and individual layers therein are expressly referred to for simplicity. It is also apparent to one skilled in the art that although the fabrication/manufacturing details are described in relation to the present invention, the fabrication and manufacturing details also alternatively apply to conventional heat exchangers as well as two and three-tier heat exchangers utilizing one fluid inlet port and one fluid port as shown in FIGS. 1A-1C.

Preferably, the interface layer has a coefficient of thermal expansion (CTE) which is approximate or equal to that of the heat source 99. Thus, the interface layer preferably expands and contracts accordingly with the heat source 99. Alternatively, the material of the interface layer 302 has a CTE which is different than the CTE of the heat source material. An interface layer 302 made from a material such as Silicon has a CTE that matches that of the heat source 99 and has sufficient thermal conductivity to adequately transfer heat from the heat source 99 to the fluid. However, other materials are alternatively used in the interface layer 302 which have CTEs that match the heat source 99.

The interface layer preferably has a high thermal conductivity for allowing sufficient conduction to pass between the heat source 99 and fluid flowing along the interface layer 302 such that the heat source 99 does not overheat. The interface layer is preferably made from a material having a high thermal conductivity of 100 W/m-K. However, it is apparent to one skilled in the art that the interface layer 302 has a thermal conductivity of more or less than 100 W/m-K and is not limited thereto.

To achieve the preferred high thermal conductivity, the interface layer is preferably made from a semiconductor substrate, such as Silicon. Alternatively, the interface layer is made from any other material including, but not limited to, single-crystalline dielectric materials, metals, aluminum, nickel and copper, Kovar, graphite, diamond, composites and any appropriate alloys. An alternative material of the interface layer 302 is a patterned or molded organic mesh.

Figure 15:
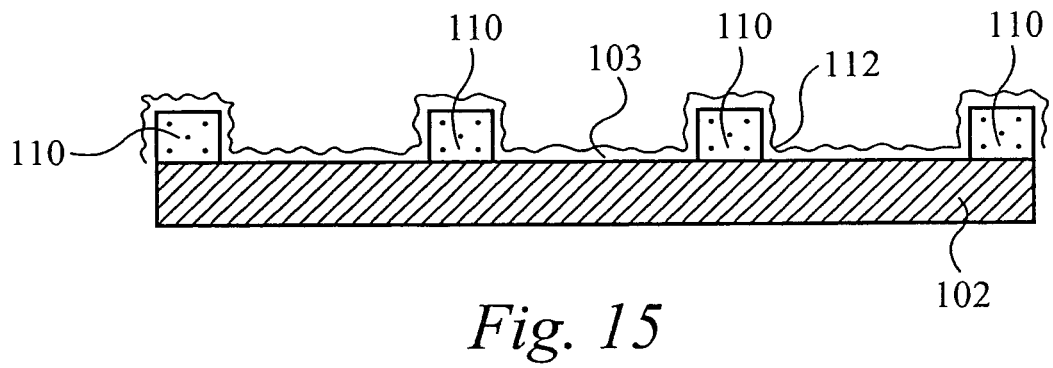
FIG. 15 illustrates a side view diagram of the interface layer of the heat exchanger having a coating material applied thereon in accordance with the present invention.

As shown in FIG. 15, it is preferred that the interface layer is coated with a coating layer 112 to protect the material of the interface layer as well as enhance the thermal exchange properties of the interface layer. In particular, the coating 112 provides chemical protection that eliminates certain chemical interactions between the fluid and the interface layer 302. For example, an interface layer 302 made from aluminum is etched by the fluid coming into contact with it, whereby the interface layer 102 would deteriorate over time. The coating 112 of a thin layer of Nickel, approximately 25 microns, is thus electroplated over the surface of the interface layer 302 to chemically pacify any potential reactions without significantly altering the thermal properties of the interface layer 302. It is apparent that any other coating material with appropriate layer thickness is contemplated depending on the material(s) in the interface layer 302.

The interface layer 302 is formed by an etching process using a Copper material coated with a thin layer of Nickel to protect the interface layer 302. Alternatively, the interface layer 302 is made from Aluminum, Silicon substrate, plastic or any other appropriate material. The interface layer 302 being made of materials having poor thermal conductivity are also coated with the appropriate coating material to enhance the thermal conductivity of the interface layer 302. One method of electroforming the interface layer is by applying a seed layer of chromium or other appropriate material along the bottom surface of the interface layer 302 and applying electrical connection of appropriate voltage to the seed layer. The electrical connection thereby forms a layer of the thermally conductive coating material 112 on top of the interface layer 302. The electroforming process also forms feature dimensions in a range of 10-100 microns. The interface layer 302 is formed by an electroforming process, such as patterned electroplating. In addition, the interface layer is alternatively processed by photochemical etching or chemical milling, alone or in combination, with the electroforming process. Standard lithography sets for chemical milling are used to process features in the interface layer 302. Additionally, the aspect ratios and tolerances are enhanceable using laser assisted chemical milling processes.

The pillars 303 discussed above are manufactured a variety of methods. However, it should be noted that the pillars 303 are manufactured to have a high thermal conductivity. In one embodiment, the pillars 303 are made with a highly conductive material such as Copper. However, other materials, such as Silicon are contemplated by one skilled in the art. The pillars 303 are manufactured by various means including, but not limited to, electroforming, EDM wire manufacturing, stamping, MIM and machining. In addition, cross-cutting with saws and/or milling tools can also produce the desired configuration in the interface layer 302. For an interface layer 302 made of Silicon, the pillars 303 would be manufactured by methods such as plasma etching, sawing, lithographic patterning and various wet etching depending on the desired aspect ratio of pillars 303 in the interface layer 302. The radially distributed rectangular fins 303E (FIG. 10E) can be manufactured by lithographic patterning whereby plasma etching or electroplating methods are employed within the lithographically defined molds.

In the alternative embodiment, microchannel walls 110 used in the interface layer 102 are made of Silicon. The microchannel walls 110 are alternatively made of any other materials including, but not limited to, patterned glass, polymer, and a molded polymer mesh. Although the microchannel walls 110 are made from the same material as that of the bottom surface 103 of the interface layer 102, the microchannel walls 110 are alternatively made from a different material than that of the rest of the interface layer 102.

In the alternative embodiment, the microchannel walls 110 have thermal conductivity characteristics of at least 10 W/m-K. Alternatively, the microchannel walls 110 have thermal conductivity characteristics of more than 10 W/m-K. It is apparent to one skilled in the art that the microchannel walls 110 alternatively have thermal conductivity characteristics of less than 10 W/m-K, whereby coating material 112 is applied to the microchannel walls 110, as shown in FIG. 15, to increase the thermal conductivity of the wall features 110. For microchannel walls 110 made from materials already having a good thermal conductivity, the coating 112 applied has a thickness of at least 25 microns which also protects the surface of the microchannel walls 110. For microchannel walls 110 made from material having poor thermal conductivity characteristics, the coating 112 has a thermal conductivity of at least 50 W/m-K and is more than 25 microns thick. It is apparent to one skilled in the art that other types of coating materials as well as thickness dimensions are contemplated.

To configure the microchannel walls 110 to have an adequate thermal conductivity of at least 10 W/m-K, the walls 110 are electroformed with the coating material 112 (FIG. 15), such as Nickel or other metal, as discussed above. To configure the microchannel walls 110 to have an adequate thermal conductivity of at least 50 W/m-K, the walls 110 are electroplated with Copper on a thin metal film seed layer. Alternatively, the microchannel walls 110 are not coated with the coating material.

The microchannel walls 110 are formed by a hot embossing technique to achieve a high aspect ratio of channel walls 110 along the bottom surface 103 of the interface layer 102. The microchannel wall features 110 are alternatively fabricated as Silicon structures deposited on a glass surface, whereby the features are etched on the glass in the desired configuration. The microchannel walls 110 are alternatively formed by a standard lithography techniques, stamping or forging processes, or any other appropriate method. The microchannel walls 110 are alternatively made separately from the interface layer 102 and coupled to the interface layer 102 by anodic or epoxy bonding. Alternatively, the microchannel features 110 are coupled to the interface layer 102 by conventional electroforming techniques, such as electroplating.

There are a variety of methods that can be used to fabricate the intermediate layer 104. The intermediate layer is made from Silicon. It is apparent to one skilled in the art that any other appropriate material is contemplated including, but not limited to glass, laser-patterned glass, polymers, metals, glass, plastic, molded organic material or any composites thereof. Alternatively, the intermediate layer 104 is formed using plasma etching techniques. Alternatively, the intermediate layer 104 is formed using a chemical etching technique. Other alternative methods include machining, etching, extruding and/or forging a metal into the desired configuration. The intermediate layer 104 is alternatively formed by injection molding of a plastic mesh into the desired configuration. Alternatively, the intermediate layer 104 is formed by laser-drilling a glass plate into the desired configuration.

The manifold layer 306 is manufactured by a variety of methods. In one embodiment, the manifold layer 306 is manufactured as one entire piece. Alternatively, the manifold layer 306 is manufactured as separate components shown in FIG. 12 which are then coupled together. The manifold layer 306 can be fabricated is an injection molding process utilizing plastic, metal, polymer composite or any other appropriate material, whereby each layer is made from the same material. Alternatively, as discussed above, each layer is made from a different material. The manifold layer 306 is alternatively generated using a machined or etched metal technique. It is apparent to one skilled in the art that the manifold layer 306 is manufactured utilizing any other appropriate method.

The intermediate layer 104 is coupled to the interface layer 102 and manifold layer 106 to form the heat exchanger 100 using a variety of methods. The interface layer 102, intermediate layer 104 and manifold layer 106 are coupled to one another by an anodic, adhesive or eutectic bonding process. The intermediate layer 104 is alternatively integrated within features of the manifold layer 106 and interface layer 102. The intermediate layer 104 is coupled to the interface layer 102 by a chemical bonding process. The intermediate layer 104 is alternatively manufactured by a hot embossing or soft lithography technique, whereby a wire EDM or Silicon master is utilized to stamp the intermediate layer 104. The intermediate layer 104 is then alternatively electroplated with metal or another appropriate material to enhance the thermal conductivity of the intermediate layer 104, if needed.

Alternatively, the intermediate layer 104 is formed along with the fabrication of the microchannel walls 110 in the interface layer 102 by an injection molding process. Alternatively, the intermediate layer 104 is formed with the fabrication of the microchannel walls 110 by any other appropriate method. Other methods of forming the heat exchanger include, but are not limited to soldering, fusion bonding, eutectic Bonding, intermetallic bonding, and any other appropriate technique, depending on the types of materials used in each layer.

Figure 16:
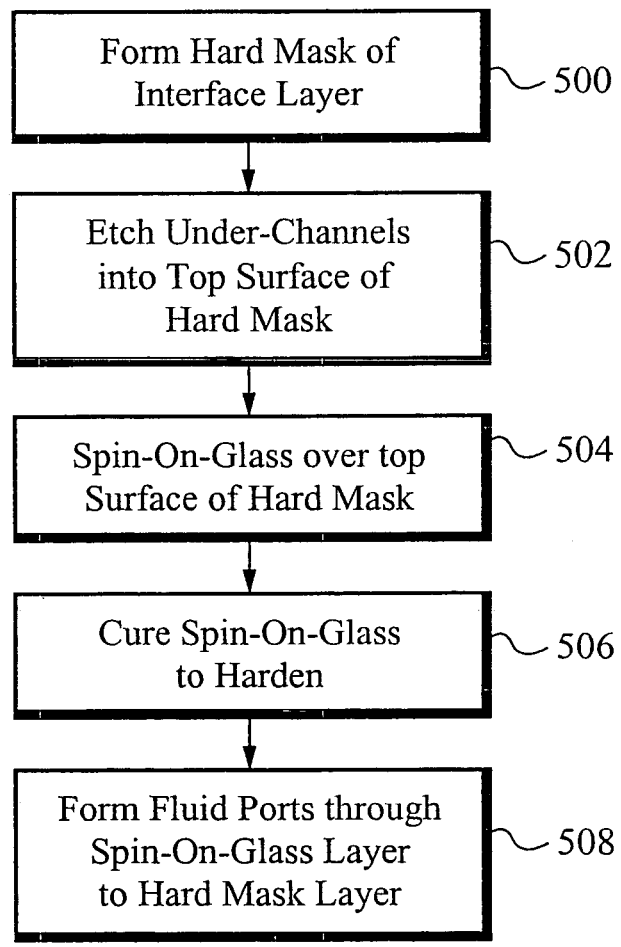
FIG. 16 illustrates a flow chart of an alternative method of manufacturing the heat exchanger in accordance with the present invention.

Another alternative method of manufacturing the heat exchanger of the present invention is described in FIG. 16. As discussed in relation to FIG. 16, an alternative method of manufacturing the heat exchanger includes building a hard mask formed from a silicon substrate as the interface layer (step 500). The hard mask is made from silicon dioxide or alternatively spin-on-glass. Once the hard mask is formed, a plurality of under-channels are formed in the hard mask, wherein the under-channels form the fluid paths between the microchannel walls 110 (step 502). The under-channels are formed by any appropriate method, including but not limited to HF etching techniques, chemical milling, soft lithography and xenon difluoride etch. In addition, enough space between each under-channel must be ensured such that under-channels next to one another do not bridge together. Thereafter, spin-on-glass is then applied by any conventional method over the top surface of the hard mask to form the intermediate and manifold layers (step 504). Following, the intermediate and manifold layers are hardened by a curing method (step 506). Once the intermediate and manifold layers are fully formed and hardened, one or more fluid ports are formed into the hardened layer (step 508). The fluid ports are etched or alternatively drilled into the manifold layer. Although specific methods of fabricating the interface layer 102, the intermediate layer 104 and manifold layer 106 are discussed herein, other known methods known in art to manufacture the heat exchanger 100 are alternatively contemplated.

Figure 17:
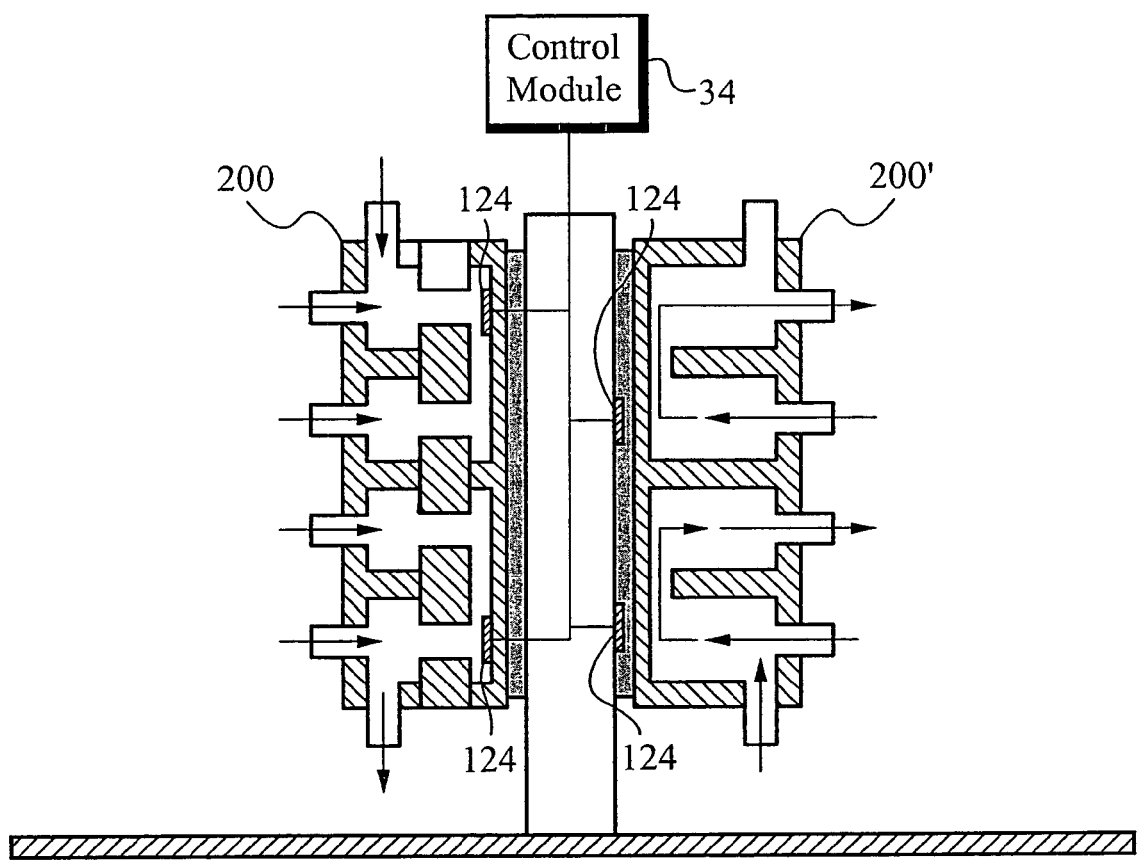
FIG. 17 illustrates a schematic of an alternate embodiment of the present invention having two heat exchangers coupled to a heat source.

FIG. 17 illustrates an alternative embodiment of the heat exchanger of the present invention. As shown in FIG. 6, two heat exchangers 200, 200' are coupled to one heat source 99. In particular, the heat source 99, such as an electronic device, is coupled to a circuit board 96 and is positioned upright, whereby each side of the heat source 99 is potentially exposed. A heat exchanger of the present invention is coupled to one exposed side of the heat source 99, whereby both heat exchangers 200, 200' provide maximum cooling of the heat source 99. Alternatively, the heat source is coupled to the circuit board horizontally, whereby more than one heat exchanger is stacked on top of the heat source 99 (not shown), whereby each heat exchanger is electrically coupled to the heat source 99. More details regarding this embodiment are shown and described in co-pending U.S. patent application Ser. No. 10/072,137, filed Feb. 7, 2002, entitled "POWER CONDITIONING MODULE" which is hereby incorporated by reference.

As shown in FIG. 17, the heat exchanger 200 having two layers is coupled to the left side of the heat source 99 and the heat exchanger 200' having three layers is coupled to the right side of the heat source 99. It is apparent to one skilled in the art that the heat exchangers are coupled to the sides of the heat source 99. It is also apparent to one skilled in the art that the alternative embodiments of the heat exchanger 200' are alternatively coupled to the sides of the heat source 99. The alternative embodiment shown in FIG. 17 allows more precise hot spot cooling of the heat source 99 by applying fluid to cool hot spots which exist along the thickness of the heat source 99. Thus, the embodiment in FIG. 17 applies adequate cooling to hot spots in the center of the heat source 99 by exchanging heat from both sides of the heat source 99. It is apparent to one skilled in the art that the embodiment shown in FIG. 17 is used with the cooling system 30 in FIGS. 2A-2B, although other closed loop systems are contemplated.

As stated above, the heat source 99 alternatively has characteristics in which the locations of one or more of the hot spots change due to different tasks required to be performed by the heat source 99. To adequately cool the heat source 99, the system 30 alternatively includes a sensing and control module 34 (FIGS. 2A-2B) which dynamically changes the amount of flow and/or flow rate of fluid entering the heat exchanger 100 in response to a change in location of the hot spots.

In particular, as shown in FIG. 17, one or more sensors 124 are placed in each interface hot spot region in the heat exchanger 200 and/or alternatively the heat source 99 at each potential hot spot location. Alternatively, a plurality of heat sources are uniformly placed in between the heat source and heat exchanger and/or in the heat exchanger itself. The control module 38 (FIG. 2A-2B) is also coupled to one or more valves in the loop 30 which control the flow of fluid to the heat exchanger 100. The one or more valves are positioned within the fluid lines, but are alternatively positioned elsewhere. The plurality of sensors 124 are coupled to the control module 34, whereby the control module 34 is preferably placed upstream from heat exchanger 100, as shown in FIG. 2. Alternatively, the control module 34 is placed at any other location in the closed loop system 30.

The sensors 124 provide information to the control module 34 including, but not limited to, the flow rate of fluid flowing in the interface hot spot region, temperature of the interface layer 102 in the interface hot spot region and/or heat source 99 and temperature of the fluid. For example, referring to the schematic in FIG. 17, sensors positioned on the interface 124 provide information to the control module 34 that the temperature in a particular interface hot spot region in heat exchanger 200 is increasing whereas the temperature in a particular interface hot spot region in heat exchanger 200' is decreasing. In response, the control module 34 increases the amount of flow to heat exchanger 200 and decreases the amount of flow provided to heat exchanger 200'. Alternatively, the control module 34 alternatively changes the amount of flow to one or more interface hot spot regions in one or more heat exchangers in response to the information received from the sensors 118. Although the sensors 118 are shown with the two heat exchangers 200, 200' in FIG. 17, it is apparent that the sensors 118 are alternatively coupled with only one heat exchanger.

In an alternative embodiment, the heat exchanger 100 of the present invention is coupled to a thermoelectric device 97, as shown in FIG. 2A, whereby the thermoelectric device 97 is coupled to the heat source 99. The thermoelectric device 97 has the same dimensions of the heat source 99 and is coupled to a power source 96 which operates the thermoelectric device 97. The thermoelectric device 97 serves to depress the junction temperature below the hottest surface of the heat exchanger 100 and is alternatively used to reduce temperature differences across the heat source 99. The thermoelectric device 97 is alternatively utilized to aid in cooling one or more hot spots in the heat source 99. In one embodiment, the thermoelectric device 97 is formed integrally within the heat exchanger 100 as part of the interface layer 102. In another embodiment, the thermoelectric device 97 is formed integrally within the heat source or microprocessor 99. It is apparent to one skilled in the art that the thermoelectric device 97 is of any conventional type thermoelectric device 97 appropriate for use with the heat source 99 and heat exchanger 100. It is also apparent to one skilled in the art that the thermoelectric device 97 is utilized with any of the heat exchangers discussed and described in the present application.

Figure 21:
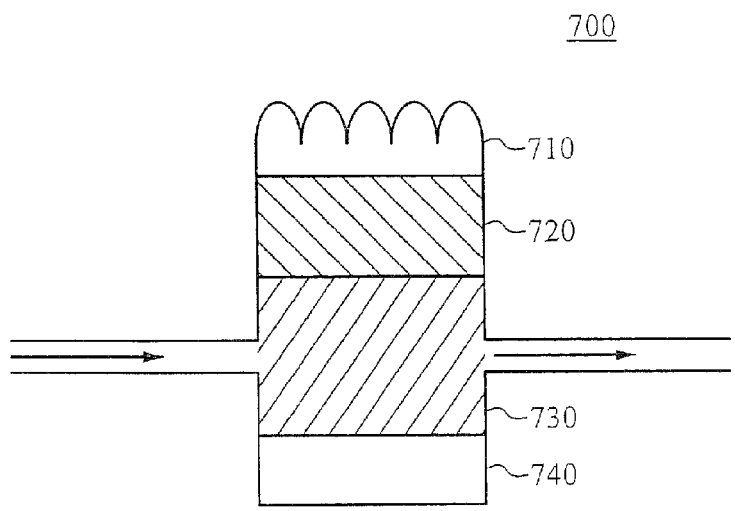
FIG. 21 illustrates a system for cooling an electric device in accordance with the present invention.

Referring now to FIG. 21, the present invention includes a system for cooling an heat producing device 740. The system includes a pump (not shown) that passes fluid through a fluid heat exchanger 730. The fluid heat exchanger 730 is thermally coupled with the heat producing device 740. Further, a thermoelectric device 720 is thermally coupled with the fluid heat exchanger 730 and also thermally coupled with a heat rejector 710.

The thermoelectric device 720 has a cooling portion and a heating portion. The thermoelectric device 720 takes electrical energy from a power source (not shown) and converts it into a temperature differential between the heating portion and the cooling portion. This differential tends to equilibrate: to maintain the temperature differential the heat absorbed into the cooling portion must be dissipated—and heat emitted from the heating portion replaced. Electrical and thermal mechanisms within the thermoelectric device act to move heat absorbed into the cooling portion to the heating portion and vice versa. In the system 700 the heating portion is in thermal contact with the heat rejector 710 and the cooling portion is in thermal contact with the fluid heat exchanger 730.

During operation, heat is generated within the heat producing device 740. At least some of the heat generated in the heat producing device 740 is dissipated into the fluid heat exchanger 730. Fluid passing through the fluid heat exchanger absorbs a portion of the heat from the fluid heat exchanger 730. Another portion of the heat is conducted into the cooling portion of the thermoelectric device 720. Some of the heat conducted into the cooling portion is moved by the thermoelectric device 720 into its heating portion. Other portions of the heat conducted into the cooling portion are dissipated through other means. Because the heating portion and the heat rejector 710 are in thermal contact, heat from the heating portion flows into the heat rejector 710 and is dissipated into the surrounding ambient environment.

Figure 22:
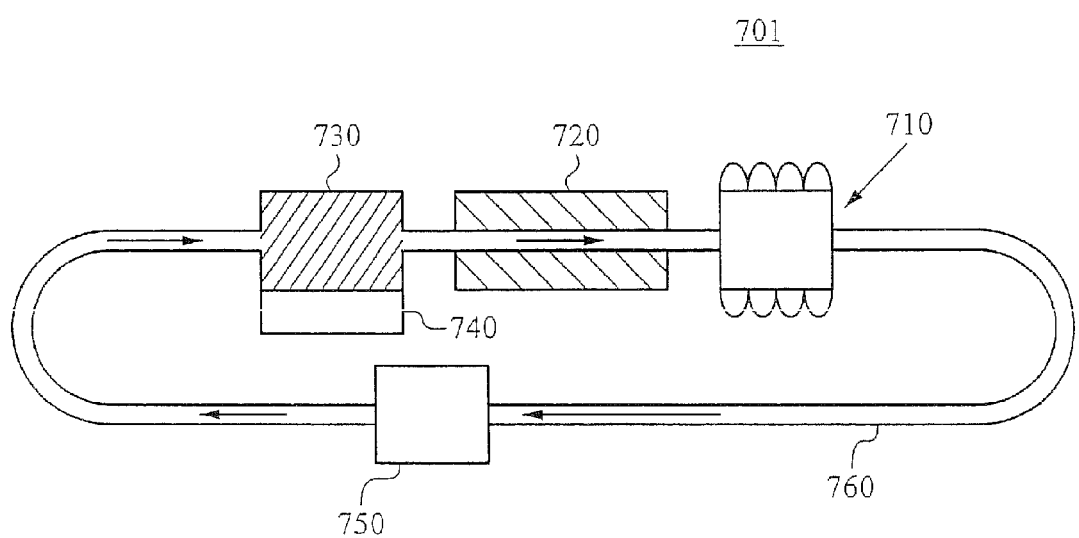
FIG. 22 illustrates a cooling system incorporating the present invention.

Now referring to FIG. 22, the present invention also presents a system 701 including a fluid heat exchanger 730, a fluid conduit structure, 760, coupled with the fluid heat exchanger 730, a pump 750, coupled with the fluid conduit structure and configured to pass a fluid therethrough and further through the fluid heat exchanger, and a heat rejector 710, coupled with the fluid conduit structure and thermally coupled with the fluid contained therein. Further, the system contains a thermoelectric device 720, coupled with the fluid conduit structure and thermally coupled with the fluid contained therein.

The system 701 works to cool a heat producing device 740, which is preferably thermally coupled with the fluid heat exchanger 730. Some heat produced within the heat producing device is conducted into the fluid heat exchanger 730 and from there into the fluid flowing through the conduit structure 760. Fluid flowing through the conduit structure 760 is thermally contacted by a cooling portion of the thermoelectric device 720. As described above, heat is dissipated from the cooling portion of the thermoelectric device 720 to a heating portion of the thermoelectric device.

In the system 701 some heat is conducted from the fluid within the conduit structure 760 into the cooling portion of the thermoelectric device 760. Heat is moved from the cooling portion to the heating portion and from there is dissipated into the ambient via radiative and convective means.

Heat transfer and dissipation largely depend on temperature differentials. Thus the efficiency of cooling devices which rely on heat transfer—heat rejectors, heat exchangers, and the like—depend largely on the extent to which sufficient temperature differentials can be maintained between the object of cooling and the device in question. In the embodiments of the present invention, thermoelectric devices are employed to maintain sufficient temperature differentials to allow efficient cooling.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:
1. A system for cooling a heat source, comprising:
 a. a fluid heat exchanger;
 b. a pump, coupled with the fluid heat exchanger and configured to pass a fluid therethrough;
 c. a thermoelectric device having a cooling portion and a heating portion and configured so that at least a portion of the cooling portion is in direct conductive thermal contact with the fluid heat exchanger to cool the fluid heat exchanger; and, d. a heat rejector configured to be in direct conductive thermal contact with at least a portion of the heating portion of the thermoelectric device.

2. The system of claim 1, wherein the thermoelectric device and the fluid heat exchanger are integrally formed.

3. The system of claim 1, wherein the thermoelectric device and the fluid heat exchanger are modularly formed and coupled with one another.

4. The system of claim 1, wherein the heat exchanger comprises a manifold region for fluid delivery and a microscaled region.

5. The system of claim 4, wherein the microscaled region comprises one of the following: microchannels, micropillars, a microlattice, and a microporous region.

6. The system of claim 1, wherein the thermoelectric device and the heat rejector are integrally formed.

7. The system of claim 1, wherein the thermoelectric device and the heat rejector are modularly formed and coupled with one another.

8. The system of claim 1, wherein the thermoelectric device, the heat rejector, and the fluid heat exchanger are integrally formed.

9. The system of claim 1, wherein the pump is one of the following: an ionic pump and an electromechanical pump.

10. The system of claim 1, wherein the thermoelectric device is positioned so the fluid heat exchanger is between it and the heat source, when the system is configured to cool the heat source.

11. The system of claim 1, wherein the fluid heat exchanger, the thermoelectric device and the heat rejector form a stacked assembly where the thermoelectric device is positioned between the fluid heat exchanger and the heat rejector.

12. The system of claim 1, wherein heat from the heat source flows into the fluid heat exchanger to the heat rejector via the thermoelectric device.

13. A system for cooling an electronic device, comprising:
a. a fluid heat exchanger;
b. a pump, coupled with the fluid heat exchanger and configured to pass a fluid therethrough;
c. a first thermoelectric device having a cooling portion and a heating portion and configured so that at least a portion of the cooling portion is in direct conductive thermal contact with the fluid heat exchanger to cool the fluid heat exchanger;
d. a heat rejector configured to be in direct conductive thermal contact with at least a portion of the heating portion of the first thermoelectric device; and
e. a second thermoelectric device having a cooling portion and a heating portion and configured so that at least a portion of the heating portion is in direct conductive thermal contact with the fluid heat exchanger to heat the fluid heat exchanger and so that at least a portion of the cooling portion is in contact with a portion of the electronic device to cool the portion of the electronic device.

14. The system of claim 13, wherein the first thermoelectric device and the fluid heat exchanger are integrally formed.

15. The system of claim 13, wherein the first thermoelectric device and the fluid heat exchanger are modularly formed and coupled with one another.

16. The system of claim 13, wherein the second thermoelectric device and the fluid heat exchanger are integrally formed.

17. The system of claim 13, wherein the second thermoelectric device and the fluid heat exchanger are modularly formed and coupled with one another.

18. The system of claim 13, wherein the first thermoelectric device and the heat rejector are integrally formed.

19. The system of claim 13, wherein the first thermoelectric device and the heat rejector are modularly formed and coupled with one another.

20. The system of claim 13, wherein the heat exchanger comprises a manifold region for fluid delivery and a microscaled region.

21. The system of claim 20, wherein the microscaled region comprises one of the following: microchannels, micropillars, microlattice, and a microporous region.

22. The system of claim 13, wherein the first thermoelectric device, the second thermoelectric device, the heat rejector, and the fluid heat exchanger are integrally formed.

23. The system of claim 13, wherein the pump is on of the following: an ionic pump and an electromechanical pump.

24. The system of claim 13, wherein the thermoelectric device is positioned between the fluid heat exchanger and the electronic device, when the system is configured to cool an electronic device.

25. The system of claim 13, wherein the fluid heat exchanger is positioned between the thermoelectric device and the heat rejector.

26. A system for cooling an electronic device, comprising:
a. a fluid heat exchanger;
b. a fluid conduit structure, coupled with the fluid heat exchanger;
c. a pump, coupled with the fluid conduit structure and configured to pass a fluid therethrough and further through the fluid heat exchanger;
d. a heat rejector, coupled with the fluid conduit structure and thermally coupled with the fluid contained therein; and
e. a thermoelectric device coupled to the fluid conduit structure such that a first conduit of the fluid conduit structure is coupled between the fluid heat exchanger and the thermoelectric device and a second conduit of the fluid conduit structure is coupled between the thermoelectric device and the heat rejector, wherein the thermoelectric device is thermally coupled with the fluid heat exchanger and thermally coupled with the fluid contained therein.

27. The system of claim 26, wherein the thermoelectric device and the conduit structure are integrally formed.

28. The system of claim 26, wherein the thermoelectric device and the conduit structure are modularly formed and coupled with one another.

29. The system of claim 26, wherein the heat exchanger comprises a manifold region for fluid delivery and a microscaled region.

30. The system of claim 29, wherein the microscaled region comprises one of the following: microchannels, micropillars, a microlattice, and a microporous region.

31. The system of claim 26, wherein the pump is one of the following: an ionic pump and an electromechanical pump.

32. The system of claim 26, wherein the thermoelectric device is thermally coupled to a heat-rejecting structure.

33. The system of claim 26, wherein the thermoelectric device is thermally coupled to a heat exchanger.

34. A microprocessor cooling system, comprising:
a. a fluid heat exchanger directly and conductively thermally coupled with a microprocessor;

b. a thermoelectric device directly and conductively thermally coupled with the fluid heat exchanger and thermally coupled with the microprocessor via the fluid heat exchanger;
c. a heat rejector thermally coupled with both the fluid heat exchanger and with the thermoelectric device;
d. a pump configured to pass fluid through the fluid heat exchanger; and
e. a heat transmitting path extending from the microprocessor to the fluid heat exchanger before extending towards the thermoelectric device.

35. The microprocessor cooling system of claim 34, wherein the fluid heat exchanger, the heat rejector and the thermoelectric device are integrally formed.

36. The microprocessor cooling system of claim 34, wherein the fluid heat exchanger, the heat rejector and the thermoelectric device are modularly formed and coupled with one another.

37. The microprocessor cooling system of claim 34, wherein the heat exchanger comprises a manifold region for fluid delivery and a microscaled region.

38. The microprocessor cooling system of claim 37, wherein the microscaled region comprises one of the following: microchannels, micropillars, a microlattice, and a microporous region.

* * * * *